US006789263B1

(12) United States Patent
Shimada et al.

(10) Patent No.: US 6,789,263 B1
(45) Date of Patent: Sep. 7, 2004

(54) DATA CONVERSION METHOD AND APPARATUS

(75) Inventors: Takao Shimada, Yokohama (JP); Naoko Iwami, Machida (JP); Tomohisa Kohiyama, Yokohama (JP); Mitsuo Hayashi, Koshigaya (JP); Yasuyuki Kuwahara, Hadano (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 08/878,259

(22) Filed: Jun. 18, 1997

Related U.S. Application Data

(63) Continuation-in-part of application No. 08/633,311, filed on Apr. 15, 1996.

(30) Foreign Application Priority Data

| May 17, 1995 | (JP) | ............................................ 7-118673 |
| Jun. 27, 1995 | (JP) | ............................................ 7-160972 |
| Jul. 18, 1995 | (JP) | ............................................ 7-181550 |
| Jun. 20, 1996 | (JP) | ............................................ 8-159487 |

(51) Int. Cl.$^7$ ............................................ H04N 7/173
(52) U.S. Cl. .................... 725/119; 725/95; 725/105; 725/37; 709/246
(58) Field of Search ................................ 725/119, 118, 725/120, 114, 116, 91, 93, 97, 98, 105, 121, 95; 709/219, 203, 206, 207, 246; H04N 7/16, 7/173

(56) References Cited

U.S. PATENT DOCUMENTS

| 4,574,305 A | * | 3/1986 | Campbell et al. ........... 725/119 |
| 5,729,281 A | * | 3/1998 | Utsumi et al. .............. 725/119 |
| 6,049,821 A | * | 4/2000 | Theriault et al. ........... 709/203 |
| 6,185,625 B1 | * | 2/2001 | Tso et al. .................... 709/247 |

FOREIGN PATENT DOCUMENTS

| JP | 57174769 | 10/1982 |
| JP | 63086655 | 4/1988 |
| JP | 7044687 | 2/1995 |
| JP | 8006875 | 1/1996 |
| JP | 8083157 | 3/1996 |

OTHER PUBLICATIONS

T. Berners–Lee, et al., *The Wordl–Wide Web*, Communication of the ACM, vol. 37, No. 8, Aut. 1994, pp. 76–82.
L. Lemay, *Teach Yourself More Web Publishing with HTML in a Week*, Appendix D, Dec. 1995, pp. 506–519.
M. E. S. Morris, *HTML for Fun and Profit*, SunSoft Press, A Prentice Hall Title, 1995, pp. 207–212.

* cited by examiner

*Primary Examiner*—Chris Grant
(74) *Attorney, Agent, or Firm*—Sofer & Haroun, LLP

(57) ABSTRACT

A data conversion apparatus included an information input device, a holder for holding information designating a method of the conversion processing from input portion when the kind of the input information is examined and is judged as predetermined data for executing a data conversion processing, a convertor for executing the data in accordance with a predetermined rule, a synthesizer for generating new data by combining the input information with a predetermined data content, and an information output device for outputting the new data so generated. When the kind of the data is screen configuration data describing configuration of the screen output of an information processing unit, the predetermined rule adds a display area of the screen configuration and converts it to a screen configuration data capable of displaying a plurality of screen configurations on the same screen.

23 Claims, 39 Drawing Sheets

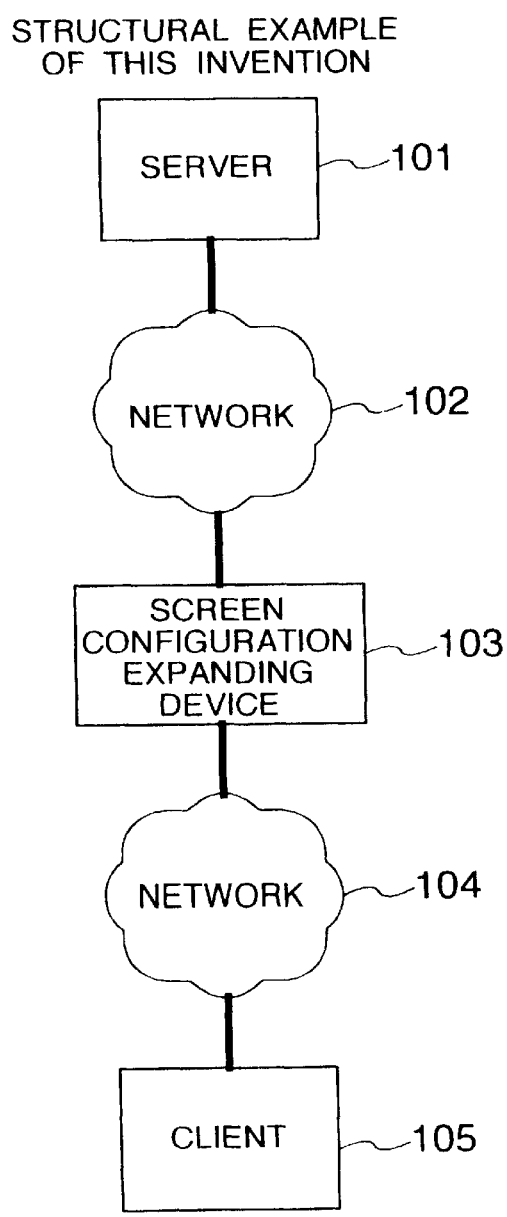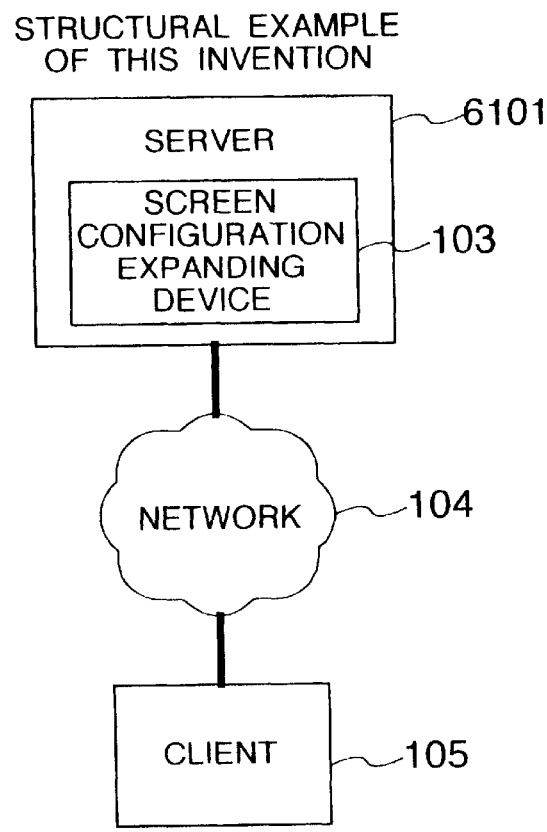

EXAMPLE OF CONSTRUCTION OF SCREEN CONFIGURATION EXPANDING DEVICE

EXAMPLE OF FUNCTIONAL BLOCK OF
SCREEN CONFIGURATION EXPANDING DEVICE

FIG. 5
EXAMPLE OF SCREEN CONFIGURATION DATA

```
<CENTER>
CLASSIC CAR MUSEUM <BR>
SUPER-SPORTS 20 <BR>
</CENTER>
O×PASS OF EARLY SUMMER WAS PHOTOGRAPHED
DURING DRIVING. <BR>
THE IMAGE CAN BE VIEWED BY SELECTING BUTTON. <BR>
<IMG SRC="pictA.gif"><BR>
<A HREF="pictB.gif">RUNNING SCENE 1</A>
<A HREF="pictC.gif">RUNNING SCENE 2</A>
<BR>
<A HREF="next.html">
CONTINUED TO NEXT PAGE</A>
```

DISPLAY EXAMPLE 1 OF CLIENT SCREEN

DISPLAY EXAMPLE 2 OF CLIENT SCREEN

FIG. 8
EXAMPLE OF EXPANDED SCREEN CONFIGURATION DATA

```
<CENTER>
CLASSIC CAR MUSEUM <BR>
SUPER-SPORTS 20 <BR>
</CENTER>
O×PASS OF EARLY SUMMER WAS PHOTOGRAPHED
DURING DRIVING.<BR>
THE IMAGE CAN BE VIEWED BY SELECTING BUTTON. <BR>
```
```
<IMG SRC="pictA. small. gif">
```
```
<A HREF="pictB. gif" >RUNNING SCENE 1</A>
```
```
<A HREF="pictB. small. gif" >
small</A>
```
```
<A HREF="pictC. gif">RUNNING SCENE 2</A>
```
```
<A HREF="pictB. small. gif" >
small</A>
```
```
<BR>
<A HREF="next. html" >
CONTINUED TO NEXT PAGE</A>
```

DISPLAY EXAMPLE 1 OF CLIENT SCREEN UTILIZING DATA CONVERTING DEVICE

DISPLAY EXAMPLE 2 OF CLIENT SCREEN UTILIZING DATA CONVERTING DEVICE

FIG. 11
EXAMPLE OF SCREEN CONFIGURATION TEMPLATE
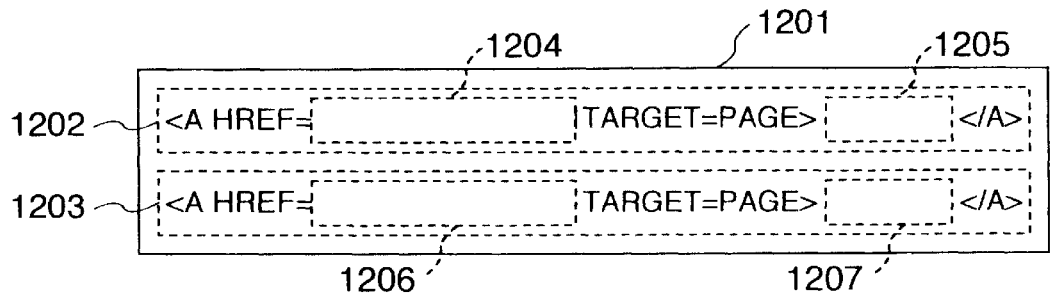
FIG. 12
EXAMPLE OF SETTING MANAGEMENT TABLE
| SET NO. | UI BUTTON NAME | PAGE REFERENCE EXPANDER | CONFIGU-RATION EXPANDER | IMAGE REFERENCE EXPANDER |
|---|---|---|---|---|
| 1 | NORMAL | . p-normal | . normal | NIL |
| 2 | QUICK | . p-quick | . quick | . small |
FIG. 13
EXAMPLE OF ADDITIONAL SCREEN CONFIGURATION DATA
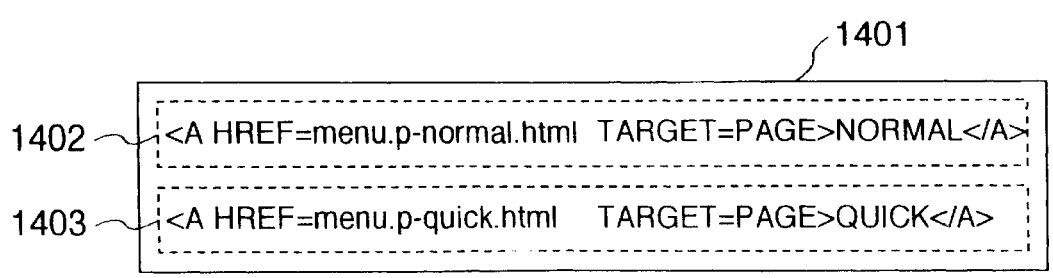

DISPLAY EXAMPLE OF ADDITIONAL SCREEN CONFIGURATION DATA

EXAMPLE OF SCREEN CONFIGURATION TEMPLATE

EXAMPLE OF EXPANDED SCREEN CONFIGURATION DATA

EXAMPLE OF CONVERTED SCREEN CONFIGURATION DATA
(QUICK MODE)

EXAMPLE 1 OF CLIENT SCREEN

EXAMPLE 2 OF CLIENT SCREEN

EXAMPLE OF CONVERTED SCREEN CONFIGURATION DATA
(NORMAL MODE)

EXAMPLE 3 OF CLIENT SCREEN

DISPLAY EXAMPLE 4 OF CLIENT SCREEN

EXAMPLE 6 OF CLIENT SCREEN

EXAMPLE 7 OF CLIENT SCREEN

EXAMPLE 8 OF CLIENT SCREEN

EXAMPLE 9 OF CLIENT SCREEN

EXAMPLE 10 OF CLIENT SCREEN

EXAMPLE 11 OF CLIENT SCREEN

PROCESSING FLOWCHART OF SCREEN CONFIGURATION EXPANDING DEVICE

FLOWCHART OF COMMAND ANALYSIS PROCESSING

FLOWCHART OF CONFIGURATION EXPANDING PROCESSING

FLOWCHART OF REPLY DATA GENERATION PROCESSING

FLOWCHART OF CONFIGURATION EXPANDING FRAME GENERATION

FLOWCHART OF UI GENERATION

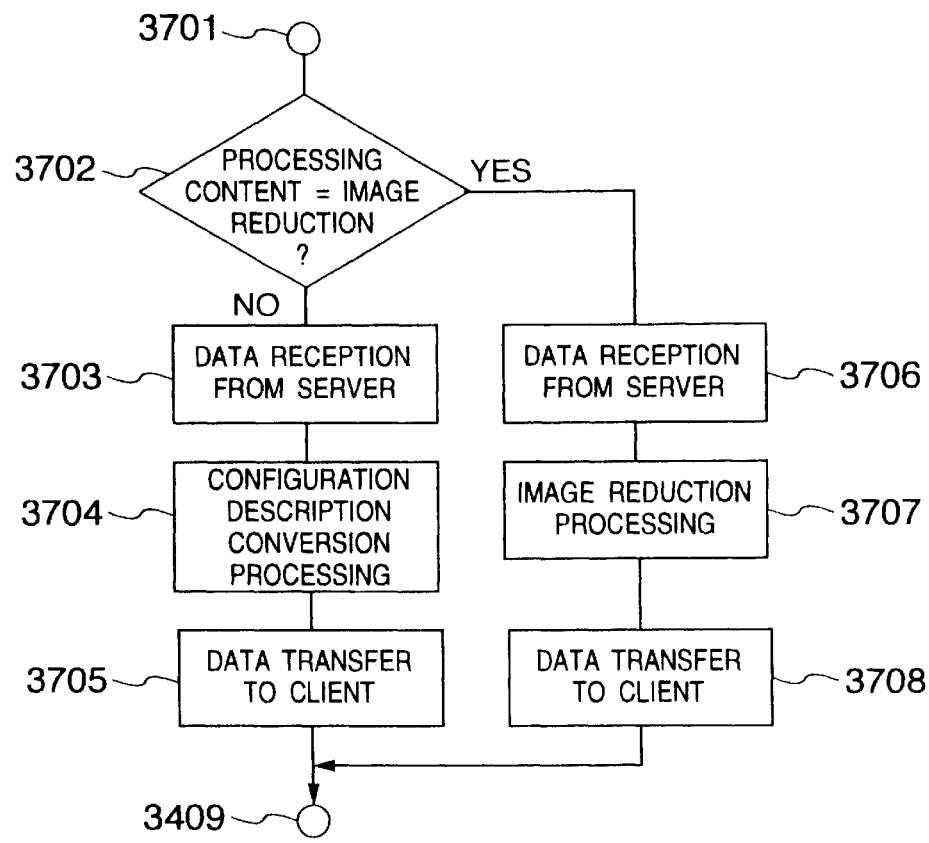

FIG. 38
EXAMPLE OF PROCESSING OBJECT TABLE

| OBJECT DATA IDENTIFIER | EXPANDER | CLASSIFICATION | PROCESSING OBJECT | PARAMETER |
|---|---|---|---|---|
| .html | .normal | GENERATION | CONFIGURATION EXPANDED FRAME GENERATION | p-normal |
| .html | /.quick | GENERATION | CONFIGURATION EXPANDED FRAME GENERATION | p-quick |
| .html | .ui | GENERATION | UI FRAME GENERATION | NIL |
| .html | .p-normal | CONVERSION | CONFIGURATION DESCRIPTION CONVERSION | p-normal |
| .html | .p-quick | CONVERSION | CONFIGURATION DESCRIPTION CONVERSION | p-quick |
| .gif | .small | CONVERSION | IMAGE REDUCTION | 1/2 |

FIG. 39
EXAMPLE OF UI SETTING TABLE

| NUMBER | INSERTED IDENTIFIER | BUTTON NAME |
|---|---|---|
| 1 | .p-normal | NORMAL |
| 2 | .p-quick | QUICK |

(4001, 4002, 4003, 4004)

FIG. 40
EXAMPLE OF CONVERSION RULE TABLE

| TAG NAME | ATTRIBUTE | OBJECT DATA IDENTIFIER | INSERTED EXPANDER |
|---|---|---|---|
| A | HREF | .html | [P1] |
| A | HREF | .gif | [P2] |
| IMG | SRC | .gif | [P3] |

(4101, 4102, 4103, 4104, 4105)

FIG. 41
EXAMPLE OF CONVERSION PARAMETER TABLE

| MODE | [P1] | [P1] | [P1] |
|---|---|---|---|
| .p-quick | .quick | .small | .small |
| .p-normal | .normal | NIL | NIL |

(4201, 4202, 4203, 4204)

EXAMPLE OF BUTTON TEMPLATE

PROCESSING SEQUENCE

FIG. 45
EXAMPLE OF PROCESSING OBJECT TABLE

| OBJECT DATA IDENTIFIER | EXPANDER | CLASSIFICATION | PROCESSING CONTENT | PARAMETER |
|---|---|---|---|---|
| .html | .normal | GENERATION | CONFIGURATION EXPANDED FRAME GENERATION | .p-normal |
| .html | NIL / .quick | GENERATION | CONFIGURATION EXPANDED FRAME GENERATION | .p-quick |
| .gif | .thumb | GENERATION | THUMB NAIL BUTTON GENERATION | NIL |
| .html | .ui | GENERATION | UI FRAME GENERATION | NIL |
| .html | .p-normal | CONVERSION | CONFIGURATION DESCRIPTION CONVERSION | .p-normal |
| .html | .p-quick | CONVERSION | CONFIGURATION DESCRIPTION CONVERSION | .p-quick |
| .gif | .small | CONVERSION | IMAGE RADUCTION | 1/2 |

FIG. 46
EXAMPLE OF CONVERSION PARAMETER TABLE

| MODE | [P1] | [P1] | [P1] |
|---|---|---|---|
| .p-quick | .quick | .thumb | .small |
| .p-normal | .normal | NIL | NIL |

4701, 4702, 4703, 4704

FIG. 47
EXAMPLE OF CONVERTED SCREEN CONFIGURATION DATA
(QUICK MODE)

4801

```
<CENTER>
CLASSIC CAR MUSEUM <BR>
SUPER-SPORTS 20 <BR>
</CENTER>
O× PASS OF EARLY SUMMER WAS PHOTOGRAPHED
DURING DRIVING.<BR>
THE IMAGE CAN BE VIEWED BY SELECTING BUTTON.<BR>
```
— 502

```
<IMG SRC="pictA.small.gif">
```
— 802

```
<A HREF="pictB.thumb.gif">
RUNNING SCENE 1 </A>
```
— 4802

```
<A HREF="pictC.thumb.gif">
RUNNING SCENE 2 </A>
```
— 4803

```
<BR>
<A HREF="next.quick.html">
TO NEXT PAGE </A>
```
— 1804

507, 508, 509

FLOWCHART OF RESPONSE DATA GENERATION PROCESSING

FIG. 49
EXAMPLE OF THUMB NAIL TIMPLATE

5001

ORIGINAL IMAGE CAN BE VIEWED BY SELECTING IMAGE <BR>
<A HREF=[x1]><IMG SRC=[x2]></A>

5002   5003

FIG. 50
EXAMPLE OF THUMB NAIL BUTTON
SCREEN CONFIGURATION DATA

5101

ORIGINAL IMAGE CAN BE VIEWED BY SELSCTING IMAGE <BR>
<A HREF=pictB.gif><IMG SRC=pictB.small.gif></A>

5102

FIG. 51
EXAMPLE OF UI SETTING TABLE

5201

| NO. | INSERTION EXPANDER | BUTTON NAME |
|---|---|---|
| | | |
| 1 | .p-normal | NORMAL |
| 2 | .p-quick | QUICK |
| 3 | .list | LIST |

4002, 4003, 4004, 5202

FIG. 52
EXAMPLE OF PROCESSING OBJECT TABLE

| OBJECT DATA IDENTIFIER | EXPANDER | CLASSIFICATION | PROCESSING CONTENT | PARAMETER |
|---|---|---|---|---|
| .html | .normal | GENERATION | CONFIGURATION EXPANDED FRAME GENERATION | p-normal |
| .html | NIL / .quick | GENERATION | CONFIGURATION EXPANDED FRAME GENERATION | p-quick |
| .html | .ui | GENERATION | UI FRAME GENERATION | NIL |
| .html | .p-normal | CONVERSION | CONFIGURATION DESCRIPTION CONVERSION | p-normal |
| .html | .p-quick | CONVERSION | CONFIGURATION DESCRIPTION CONVERSION | p-quick |
| .gif | .small | CONVERSION | SCREEN REDUCTION | 1/2 |
| .gif | .tiny | CONVERSION | SCREEN REDUCTION | 1/4 |
| .html | .list | CONVERSION | LIST PAGE CONVERSION | NIL |

EXAMPLE OF SCREEN CONFIGURATION DATA

EXAMPLE OF LIST PAGE TEMPLATE

EXAMPLE OF THUMB NAIL TEMPLATE

EXAMPLE OF THUMB NAIL SCREEN CONFIGURATION DATA

FIG. 57
EXAMPLE OF PROCESSING OBJECT TABLE

| OBJECT DATA IDENTIFIER | EXPANDER | CLASSIFICATION | PROCESSING CONTENT | PARAMETER |
|---|---|---|---|---|
| . html | . p-normal | CONVERSION | CONFIGURATION DESCRIPTION CONVERSION | . p-normal |
| . html | NIL / . p-quick | CONVERSION | CONFIGURATION DESCRIPTION CONVERSION | . p-quick |
| . gif | . small | CONVERSION | IMAGE REDUCTION | 1/2 |

5801, 3902, 3906, 5802, 3908

FIG. 58
EXAMPLE OF SCREEN CONFIGURATION DATA

```
< A HREF=menu.p-normal.html>NORMAL</A>
< A HREF=menu.p-quick.html>QUICK</A>
< B R >
< C E N T E R >
CLASSIC CAR MUSEUM < B R >
SUPER-SPORTS 20 < B R >
< / C E N T E R >
O×PASS OF EARLY SUMMER WAS PHOTOGRAPHED
DURING DRIVING.< B R >
THE IMAGE CAN BE VIEWED BY SELECTING BUTTON.< B R >
< I M G   S R C = " p i c t A .  s m a l l .  g i f " >
< A   H R E F = " p i c t B .  s m a l l .  g i f " >
RUNNING SCENE 1 < / A >
< A   H R E F = " p i c t C .  s m a l l .  g i f " >
RUNNING SCENE 2 < / A >
< B R >
< A   H R E F = " n e x t .  h t m l " >
CONTINUED TO NEXT PAGE < / A >
```

EXAMPLE OF CLIENT SCREEN

DATA CONVERSION METHOD AND APPARATUS

CROSS REFERENCE TO RELATED APPLICATIONS

This application is a continuation-in-part of co-pending application Ser. No. 08/633,311 entitled as MULTIMEDIA DATA PROCESSING SYSTEM IN NETWORK filed by T. Shimada et al. on Apr. 15, 1996, the contents of which are incorporated herein by reference.

BACKGROUND OF THE INVENTION

This invention relates to a data converting device for converting the size, etc, of inputted data. More particularly, the present invention relates to a data converting device functioning as a relay for relaying multimedia data transmitted through a plurality of kinds of transmission media, such as image, speech data, sound-attached moving-picture data etc, a data transmission method, and an information storage medium storing a data conversion function.

In network systems in general, services are offered among a plurality of information processing units connected to the network.

In this case, the information processing unit on the service requesting side is referred to as a "client" and the information processing unit on the service offering side, a "server".

T. Berners-Lee et al., "Communications of ACM", Vol. 37, No. 8, pp. 76–82(1994) published by ACM Press describes an example of multimedia network systems for describing screen configuration mainly by character strings in a wide area network system.

Such a multimedia network system has spread in world-wide networks and access to world-wide information can be acquired by making access to the servers in the world.

The capacity of data handled in the multimedia network system, such as static images, moving images, speech, and so forth, is by far greater than that of texts.

Therefore, when the multimedia network system is utilized in the environment having a small network transmission capacity, the problem develops in that an extremely long time is necessary for the data transfer.

When the amount of data transmitted from the server to the client is reduced, the data access time can be reduced particularly when the transmission rate of the network is low, and the user can gain access to a greater amount of information within a predetermined time.

When the data converting device described above is used, the data access time can be reduced as a result of the reduction of the data transmission amount between the server and the client, but layout of the screen display is changed when button display is employed for indicating the reduction of a static image in the screen display, etc.

If layout of the screen display itself has information such as a table, such a change of layout means the loss of information and deteriorates appearance of the design. See FIG. 9 (902, 903 and 904). In FIG. 8, screen configuration data 801, description 802 of the image tag, and descriptions 803 and 804 of the anchor tags are shown.

To look up the screen display in accordance with original screen configuration information transmitted by the server, the user of the client must stop utilization of the data converting device. Because the method of stopping the utilization of the data converting device requires the change of setting of the client, this operation is much more complicated than the normal button selection operations, and another problem arises in that operation efficiency drops when the user frequently desires to switch the utilization and to stop the data converting device.

When a large number of buttons for looking up the static image are disposed in the screen display, the display area of the screen becomes lack of information, and still another problem occurs in that the screen display becomes redundant for the user who seldom makes access to the additional buttons.

SUMMARY OF THE INVENTION

It is an object of the present invention to provide a data converting device which converts data transmitted from a server to data which considers performance of the client, a transmission medium connected to the client, etc, and causes the client to receive this data, a network system equipped with such a data converting device, and a data transmission method.

It is another object of the present invention to provide a data converting device which instructs a user of a client to control a conversion processing of multimedia data and enables the user to carry out the data conversion processing in accordance with this instruction, a network system equipped with such a network, and a data transmission method.

To accomplish the objects described above, a data relay apparatus connected between a server device and a client device includes a command analysis portion for analyzing a command inputted from the client device, which analysis portion reads out and stores conversion instruction information when the command contains the conversion instruction information instructing a predetermined data conversion processing; a request portion for deleting the conversion instruction information from the command and sending it to the server device; a detection portion for receiving data sent from the server device, which detection portion converts the data on the basis of the conversion instruction information stored and add the conversion instruction information to the reference address included in the description referring to a text data included in other data; and a transmission portion for transmitting the data and the result of the added information to the client device.

The conversion instruction information can contain a screen configuration command for instructing to divide the area of the screen displayed on the client device into a reception data display area for the data received from the server device and an operation area for the screen operation. The data relay apparatus can further contain a first expansion portion for expanding the display data from the server device on the reception data display area on the basis of the screen configuration command and a second expansion portion for expanding the operation buttons corresponding to another screen configuration command indicating contents of transformation on data in the operation area in accordance with the conversion instruction information on the basis of the screen configuration command from the client device. When the image data is contained in the response command, the conversion instruction information can be a deletion instruction command which instructs to delete a part of pixels of the image data in a predetermined pattern.

According to the present invention, there is also provided a data relay apparatus connected to a client device through a first network and to a server device through a second network, which includes means for analyzing a command inputted from the client device, means for separating conversion instruction information from the command when the command contains the conversion instruction information instructing a conversion processing; means for transmitting the command after deletion of the conversion instruction information to the server device; means for receiving data responding to the command after deletion of the conversion instruction information from the server device; means for generating a conversion command by converting the data on the basis of the conversion instruction information; and means for transmitting the conversion command with the conversion instruction information to the client device.

According to the present invention, there is further provided a data transmission method of a network system including a data relay apparatus connected to a client device connected through a first network and to a server device through a second network, wherein the data relay apparatus analyzes a command inputted from the client device, deletes conversion instruction information from the command when the command contains the conversion instruction information instructing a conversion processing, and transmits the command to the server device, the server device which receives the command after deletion of the conversion instruction information transmits data responding to the command after deletion of the conversion instruction information, and the data relay apparatus which receives the data converts the data to generate a conversion command on the basis of the conversion instruction information, and transmits the conversion command with the conversion instruction information to the client device.

According to the present invention, there is further provided an information storage medium storing a data conversion function for data relay for use in a data relay apparatus connected to a client device through a first network and to a server device through a second network, wherein the information storage medium stores a program having a function of analyzing a command inputted from the client device, a function of deleting conversion instruction information from the command when the command contains the conversion instruction information instructing a conversion processing to the command, and transmitting the command to the server device, a function of receiving a data responding to the command after removal of the conversion instruction information from the server device, a function of generating conversion data by converting the data on the basis of the conversion instruction information, and a function of transmitting the conversion command with the conversion instruction information to the client device.

According to the present invention, there is further provided a data converting device having information output means for outputting the data after the conversion processing described above is executed and data that is newly generated.

When the kind of data is screen configuration data describing configuration of a screen output of an information processing unit, a predetermined rule provides not only mere data conversion but list display, etc. so that efficiency of grasping the content of data can be improved.

Existing servers and clients can be as such utilized. When a new function or functions are added to the present invention, these servers and clients need not be changed, and the maintenance cost can be kept low, in consequence. Since a specific server is not necessary, utility by the screen configuration expansion by the present invention can be improved for all the pages of a large number of servers to which access can be made by everyone of the world.

BRIEF DESCRIPTION OF THE DRAWINGS

FIG. 1 is a block diagram showing an structural example of the present invention;

FIG. 4 is a block diagram showing a structural example of the present invention;

FIG. 5 shows an example of screen configuration data;

FIG. 8 shows an example of expanded screen configuration data;

FIG. 11 shows an example of a screen configuration template;

FIG. 12 shows an example of a setting management table;

FIG. 13 shows an example of additional screen configuration data;

FIG. 36 is a flowchart of a data conversion processing;

FIG. 37 shows an example of setting table;

FIG. 38 shows an example of a processing object table;

FIG. 39 shows an example of a UI setting table;

FIG. 40 shows an example of a conversion rule table;

FIG. 41 shows an example of a conversion parameter table;

FIG. 45 shows an example of a processing object table;

FIG. 46 shows an example of conversion parameters;

FIG. 47 shows an example of converted screen configuration data;

FIG. 49 shows an example of a thumb nail template;

FIG. 50 shows an example of a thumb nail button screen configuration data;

FIG. 51 shows an example of a UI setting table;

FIG. 52 shows an example of a processing object table;

FIG. 57 shows an example of a processing object table;

FIG. 58 shows an example of screen configuration data; and

DESCRIPTION OF THE PREFERRED EMBODIMENTS

Figure 2:
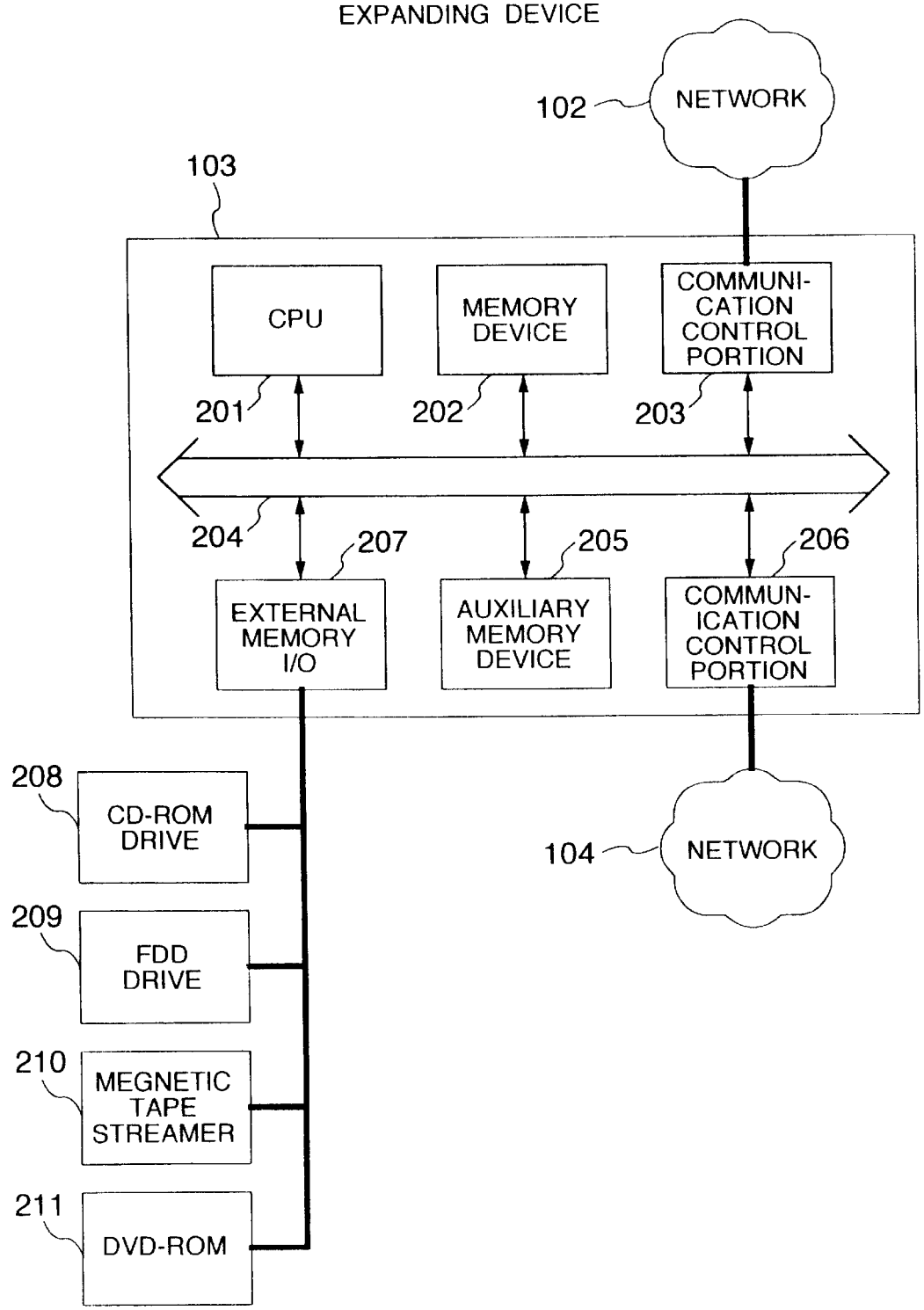
FIG. 2 is a block diagram showing an example of the construction of a screen configuration expanding device.

Hereinafter, preferred embodiments of the present invention will be explained with reference to the accompanying drawings.

(First Embodiment)

As shown in FIG. 1, a system according to the first embodiment comprises a server 101, networks 102 and 104, a screen configuration expanding device 103 and a client 105.

The server 101 is connected to the screen configuration expanding device 103 for effecting data conversion and relaying, through the network 102, and the client 105 is connected to the screen configuration expanding device 103 through the network 104. Data communication is made between the server 101 and the client 105 and in this instance, the screen configuration expanding device 103 executes expansion of the screen configuration and reduction of a data amount.

The term "expansion of the screen configuration" means the addition of a new screen display area to the screen configuration information which is received from the server 101 and contains data to be displayed and information on the configuration of the screen for displaying this data.

More concretely, expansion of the screen configuration in this embodiment means the addition of an interface, which accomplishes interactive communication between a user at the client 105 and the client screen, to the screen configuration information of the server 101.

The server 101 stores screen configuration data 501 for defining the screen configuration of the client screen display 601 as shown in FIG. 5.

Hereinafter, the content of the screen configuration data 501 will be explained with reference to the client 105 and the screen display 601.

Incidentally, the following explanation will be given as if the server 101 and the client 105 directly communicated with each other for simplification by omitting the explanation of the portions which execute communication through the screen configuration expanding device 103.

Figure 6:
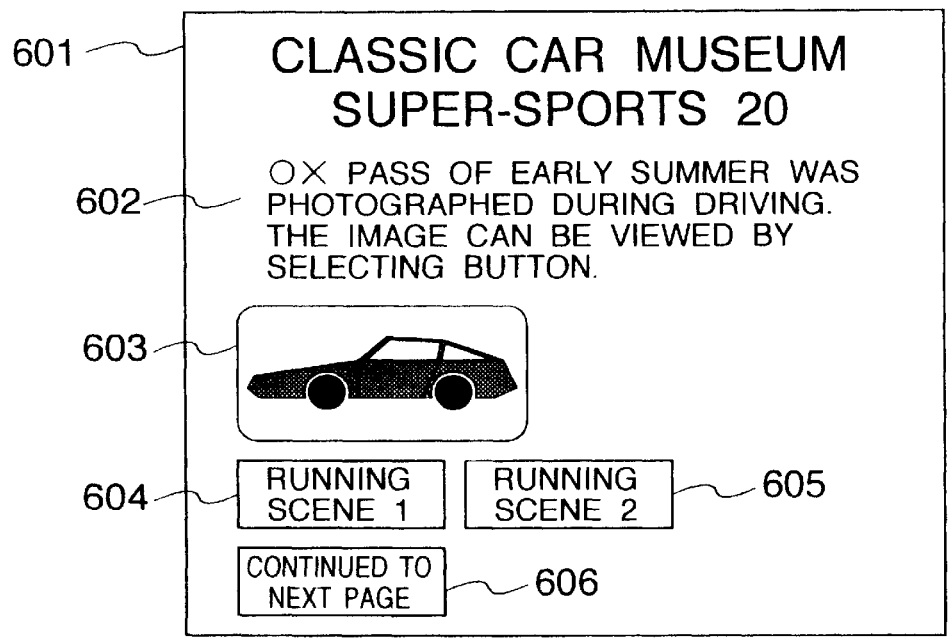
FIG. 6 shows an example 1 of client screen display.

In FIG. 5, descriptions at reference numerals 502, 503, 504, 505 and 506 correspond to reference numerals 602, 603, 604, 605 and 605 in FIG. 6, respectively.

The text partitioned by [<] and [>] in the screen configuration data is referred to as a "tag". This tag is used for putting an effect to the text, or for representing burying of the data other than the text such as a static image, or for describing burying of the button which can be operated by the user of the client 105.

The tag 507 [<CENTER>] and the tag 508 [</CENTER>] in the description 502 in FIG. 5 are the description for disposing the text between these two tags at the center at the time of screen display. The tag 509 [<BR>] is the description instructing line feed. Due to these tag descriptions, the description 502 is displayed on the screen of the client 105 such as the text 602 shown in FIG. 6.

[<IMG SRC="pictA, gif">] in the description 503 is a tag referred to as "imaging". Here, this tag describes that the data designated by [SRC=" "] is buried at this portion in the text. [pictA. gif] designated here is the address representing a static image. The client 105 requests the server 101 to transfer this pictA.gif, receives this data from the server 101 and displays it on the screen in succession to the text 602, so that the static image 603 is finally displayed on the screen of the client 105 as shown in FIG. 6.

Figure 7:
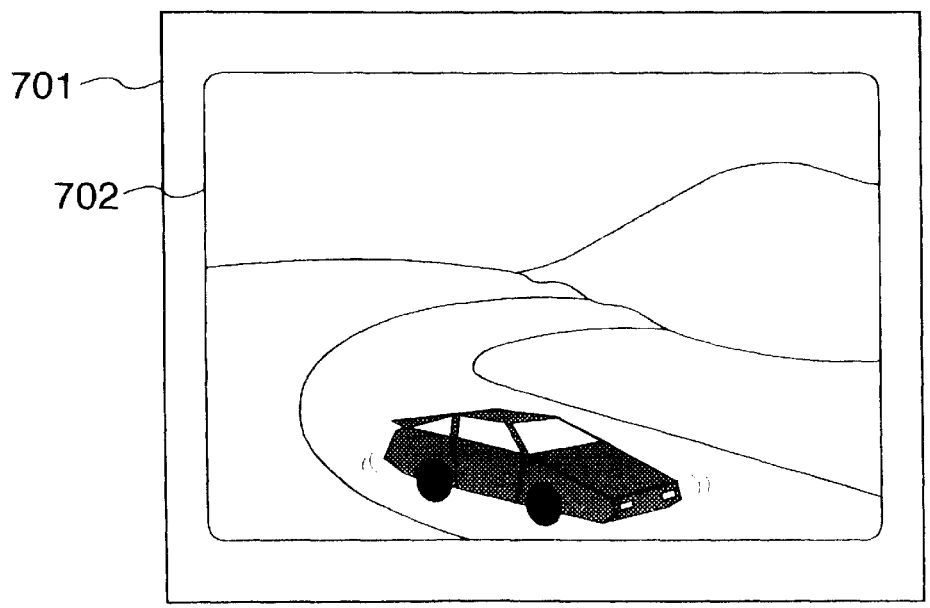
FIG. 7 shows an example 2 of the client screen display.
Figure 9:
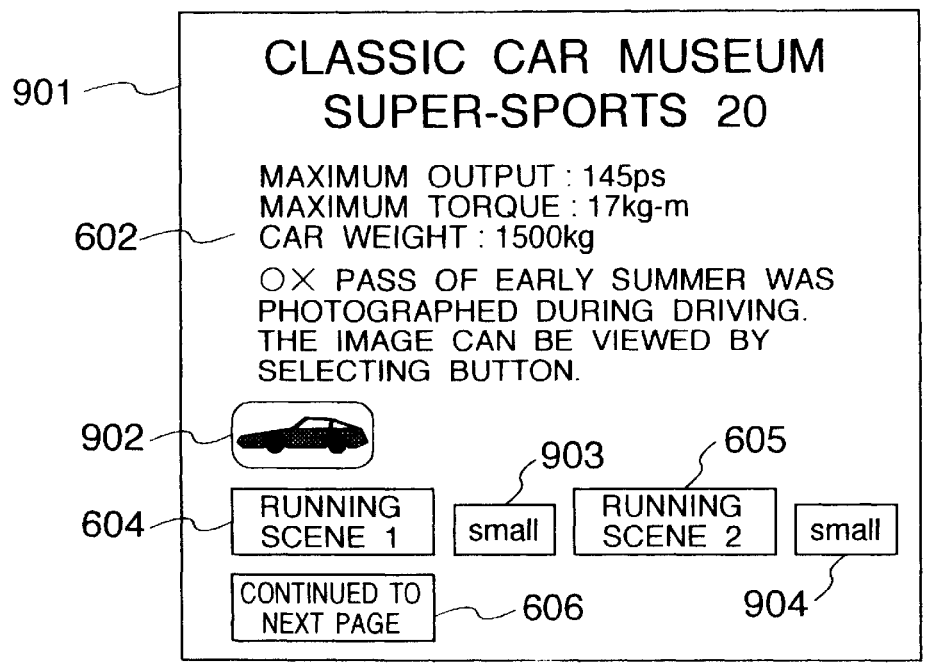
FIG. 9 shows an example 1 of client screen display utilizing a data converting device.

[<A HREF="pictB. gif">]0 and [</A>] in the description 504 are referred to as "anchor tags", and the portion encompassed by these tags becomes a button on the screen of the client 105. When the user clicks this button, the client 105 transmits the transfer request of the data designated by [HREF=" "] in the anchor tag to the server. [pictB. gif] is the address representing the static image 702. In the description 504, a text [running scene 1] encompassed by the anchor tags becomes the button 604 in FIG. 6 at the time of screen display. When the user selects this button, the client 105 transmits the transfer request of the static image 702 to the server 101, and displays finally the static image 702 as shown in FIG. 7.

The descriptions 505 and 506 are similar to the description 504, and are only different in that the content of the text and the address of the data to be looked up at the time of the display of the button are different.

Here, the address of the data which the description 506 looks up is [next. html] and this is the screen configuration data in the same way as 501.

In the multimedia network system described above, when the tail of the data address is [.gif], the data is the static image, and when the tail of the data address is [. html], the data is the screen configuration data.

Next, the explanation will be given on the communication method between the server and the client in the multimedia network system in this embodiment.

In this explanation, too, the explanation will be given on the assumption that the server 101 and the client 105 directly communicate with each other without passing through the screen configuration expanding device 103, for the purpose of simplification.

First, the client 105 transmits a command [GET menu.html] to the server 101.

Here, [menu. html] is the address designating the screen configuration data 501. Receiving this request, the server 101 transfers the screen configuration data 501 to the client 105. When the client 105 receives the screen configuration data 501, it analyzes this data.

The client 105 first analyzes the portion of the description 501 and displays the text on the screen. Next, the client 105 analyzes the portion of the description 503 and detects that other data are cited by the image tags and transmits a command [GET pictA.gif] requiring the transfer of [pictA.gif] to the server 101.

Receiving this request, the server 101 returns [pictA. gif], that is, the static image 702. Receiving this static image 702, the client 105 displays the static image 702 on the screen in succession to the text display 502.

Next, the client 105 analyzes the description 504, detects the anchor tags and display the button 604, i.e. [running scene 1].

Similarly, the client 105 analyzes the descriptions 505 and 506 and displays the buttons 605 and 606 on the screen.

As described above, the client 105 displays various data on the screen as 601 in FIG. 6 by the screen configuration data.

Next, the concrete construction of the screen configuration expanding device according to the presents invention will be explained.

The screen configuration expanding device 103 shown in FIG. 2 comprises a CPU 201 for executing a predetermined processing, a memory device 202 for storing necessary information, inclusive of a program for operating this CPU 201, a communication control portion 203 for controlling data communication between networks 102 and 104 and this expanding device 103, an auxiliary memory device 205, an external memory I/O 207 for reading out data from information storage media such as a CD-ROM 208, a FD 209, a magnetic tape 210, a DVD 211, etc, for storing the program for accomplishing the functions of the present invention, and a communication control portion 206, connected to the network 104, for receiving the program for accomplishing the functions of the present invention through the networks. These memory device 202, communication control portions 203, 206, auxiliary memory device 205 and external memory I/O 207 are controlled by the command and the data that are sent from the CPU 201 through a bus 204.

Figure 3:
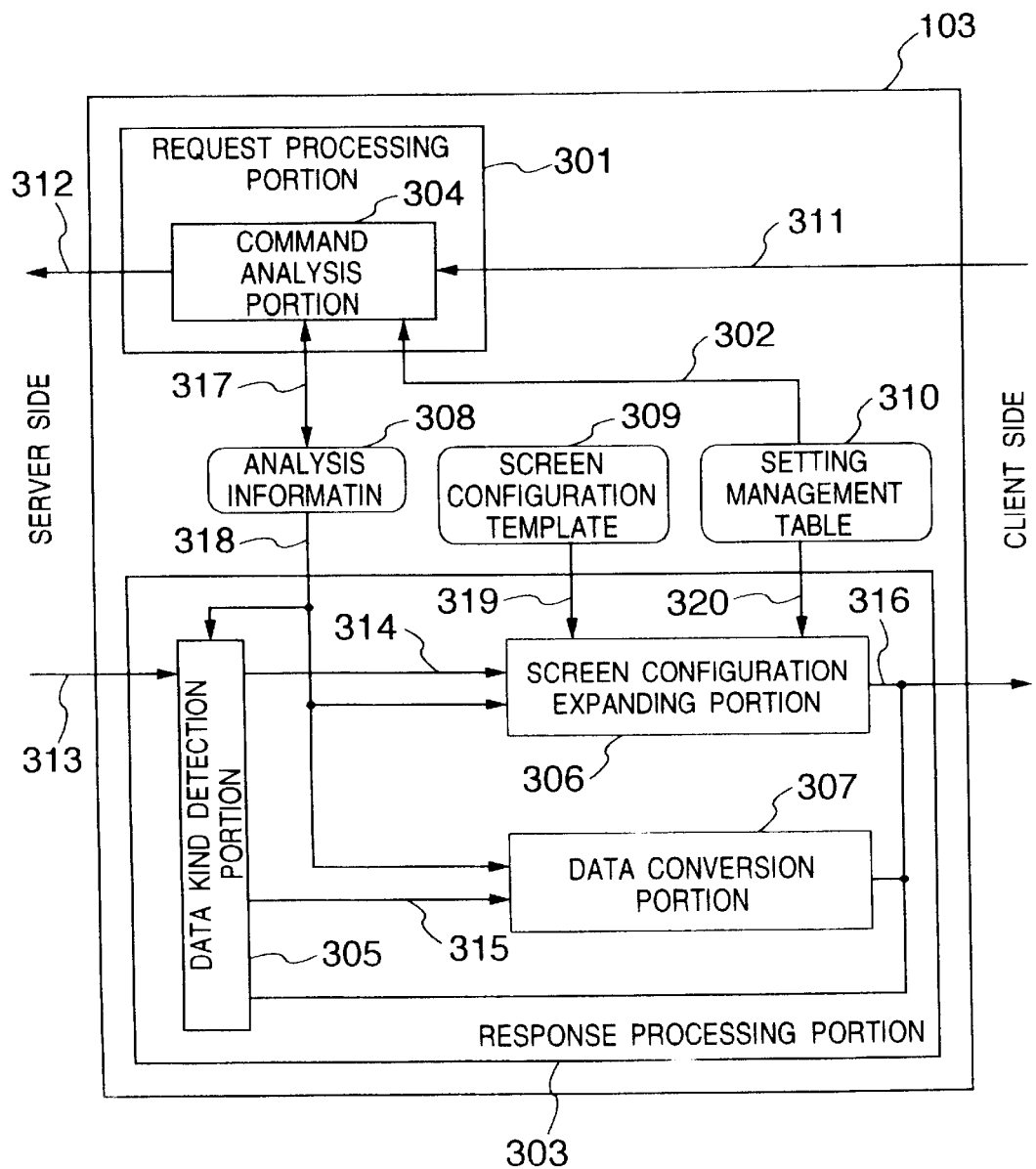
FIG. 3 is a functional block diagram showing an example of the screen configuration expanding device.

In FIG. 3, the screen configuration expanding device 103 comprises a request processing portion 301 and a response processing portion 303.

Reference numeral 301 denotes the request processing portion, which transfers the command sent from the client 105 to the server 101.

The request processing portion 301 comprises a command analysis portion 304.

The command analysis portion 304 analyzes the command 311 transferred from the client 105 and stores the result of this analysis as analysis information 308. The command analysis portion 304 executes conversion of the command, whenever necessary. The command analysis portion 304 transfers the command as the analyzed command 312 to the server 101.

After the command 312 is transferred to the server 101, the screen configuration expanding device 103 transfer its processing to the response processing portion 303.

When the request processing portion 301 does not transmit the command to the server 101 (this case will be explained later), the response processing portion 303 converts the data received from the server 101, whenever necessary, and transfers it to the client 105.

The response processing portion 303 comprises a data kind. detection portion 305, a screen configuration expanding portion 306 and a data conversion portion 307.

The data kind detection portion 305 receives the information which stipulates whether or not data conversion is to be made for the data sent thereto, from the analysis information portion 308, and decides whether or not to execute conversion for the data sent from the sever on the basis of this information.

When the data 313 is the screen configuration data, the data kind detection portion 305 delivers the data 313 as the data 314 the screen configuration expanding portion 306, and transfers the processing to the screen configuration expanding portion 306.

When the data 313 is the data kind which the conversion object, the data kind which is the conversion object, the data kind detection portion 305 delivers the data 313 as the data 315 to the data conversion portion 307, and transfer the processing to the data conversion portion 307.

The screen configuration expanding portion 306 executes any one of the following three Processing in accordance with the analysis result of the command analysis portion 304.

The first is a generation processing of the screen configuration data for generating new screen configuration data by using the screen configuration template 309.

The second is a conversation processing of the screen configuration data for changing the tag content in the screen configuration data when the screen configuration expanding portion 306 receives the screen configuration data 314 form the data kind detection portion 305.

These two processings will be described later. The screen configuration expanding portion 306 finally outputs any of the screen configuration data as the data 316.

The data conversion portion 307 is the portion that executes the image data conversion processing similar to that of the screen configuration expanding device 103 explained in this embodiment, and has therein the conversion expander table 1101.

Receiving the data 315 from the data kind detection portion 305, the data conversion portion 307 outputs the data 315 as the data 316 in accordance with the information of the analysis information 308.

The above explains the basic operation of the screen configuration expanding device 103.

The operation of the screen configuration expanding device 103 will be successively explained with reference to concrete examples.

First, the screen configuration template 309 and the content of the set management table 310 will be explained.

Figure 15:
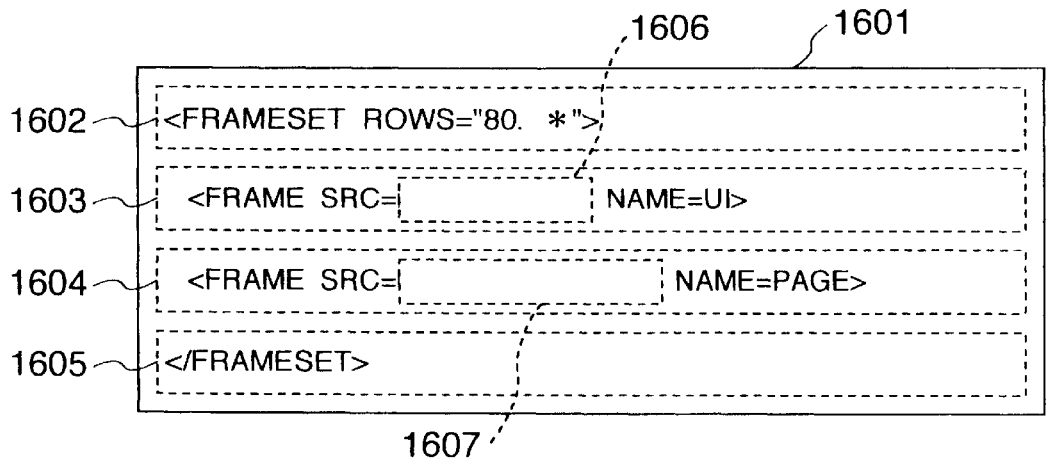
FIG. 15 shows an example of a screen configuration template.

In this embodiment, the screen configuration template 309 stores two templates shown in FIGS. 11 and 15.

In FIG. 11, reference numerals 1202 and 1203 denote incomplete anchor tag descriptions, and they have blank columns 1204, 1205 and 1206, 1207, respectively. When these blank columns are filled, the anchor tag descriptions become complete anchor tag descriptions.

Figure 16:
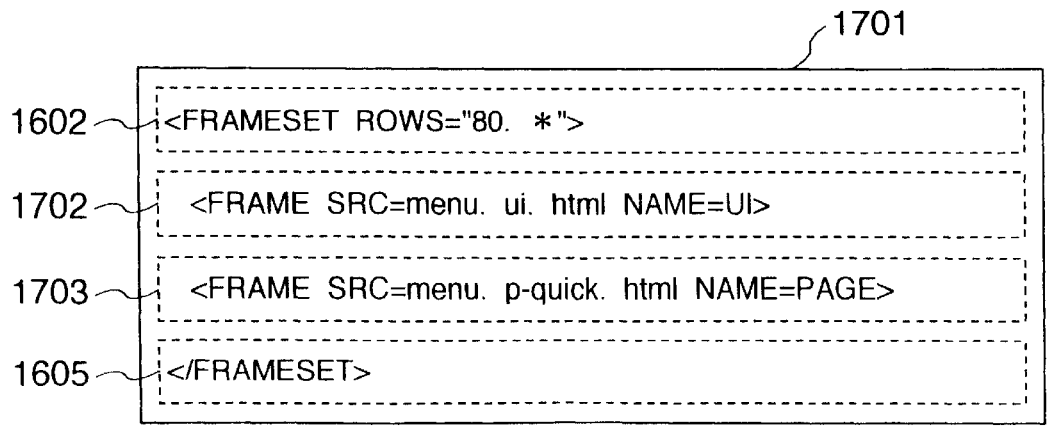
FIG. 16 shows an example of expanded screen configuration data.

In FIG. 16, reference numeral 1601 denotes the screen configuration template.

In FIG. 16, reference numerals 1602, 1603 and 1604 denote description for dividing the screen display of the client 105. They are described as the frame description in Lauta Lemay, "Teach Yourself More Web Publishing with HTML in a Week", Appendix D (1995), published by Prentice-Hall, Co.

First, the descriptions 1602 and 1605 describes that the client screen is divided into upper and lower two display areas.

The description 1603 is a description relating to the content of the upper area of the two display areas described above. Here, it describes that the content of the data address is to be displayed in this area. Further, this area is called "UI". This is one of the conversion instruction commands.

The description 1604, too, is a description similar to 1603. It describes that the name of the lower area is "PAGE". It does not become a complete description unless the blank column 1607 is filled.

In this embodiment, the content of the setting management table 310 is shown in FIG. 12.

Reference numeral 1301 denotes the content of the setting management table 310, reference numeral 1302 denotes the item content of the setting management table 310 and reference numerals 1303 and 1304 denote the table data of the setting management table 310.

The operation of the screen configuration expanding device 103 in this embodiment will be explained below on the basis of the premise condition described above.

First, the client 105 transmits the command [GET menu.html] to the screen configuration expanding device 103 (response command).

Receiving this command, the screen configuration expanding device 103 transfers the processing to the request processing portion 301. The request processing portion 301 receives this command as a command 311 and transfers the processing to the command analysis portion 304 so as to execute the analysis and conversion of the command. The command analysis portion 304 analyzes the data address designated by the command 311, separates the expander contained in the setting management table 310 from the data address and stores it in the analysis information 308. At this time, the command analysis portion 304 analyzes the tail of the data address, judges the data kind and stores it in the analysis information 308.

In this embodiment, the character strings [.gif], [.html], etc, at the end of the data addresses are not called the expander.

Further, the command analysis portion 304 collates the analysis information 308 with the information of the setting management table 310 and executes the processing in accordance with the following three rules.

(Rule 1)

When the data kind in the analysis information is the screen configuration data and the expander is ].ui], the processing is transferred from the request processing portion 301 to the response processing portion 303, and the processing is transferred to the screen configuration expanding portion 306 in order to generate the additional screen configuration data.

This generation of the additional screen configuration data will be described later.

(Rule 2)

The processing is transferred from the request processing portion 301 to the response processing portion 303, and to generate the expanded screen configuration data, the processing is transferred to the screen configuration expanding portion 306 of the response processing portion 303.

The expanded screen configuration data will be described later.

(Rule 3)

In the cases other than those described above, the command 312 requiring the data address of the analysis information 308 is transmitted to the server 101 and the processing is transferred 6 to the data type detection portion 305 of the response processing portion 303.

For example, since the content of the analysis information 308 is (address: menu. html, expander: nil, data kind: screen configuration data), this corresponds to the (Rule 2) described above.

Therefore, the request processing portion 301 transfers the processing to the response processing portion 303 and the screen configuration expanding port 306 starts generating the expanded screen configuration data.

The term "generation of the expanded screen configuration data" means that the screen configuration expanding portion 306 divides the display area of the screen of the client 105 into two from the information of the screen configuration template 309, the setting management table 310 and the analysis information 30 and generates the screen configuration data for displaying two screen configuration data.

Next, the generation processing of the expanded screen configuration data by the screen configuration expanding portion 306 will be explained.

First, the screen configuration expanding portion 306 takes out the expanded screen configuration template 1601 stored in the screen configuration template 309.

Further, the screen configuration expanding portion 306 describes the data address, which is the sum of the data address of the analysis information 308 and the expander [.ui] (which, in this embodiment, plays the role of the conversion instruction command for converting the command from the server by the relay device) in the blank column 1606, describes also the data address, which is the sum of the data address of the analysis information 308 and the page reference expander of any of the table data of the setting management table 301, in the blank column 1607, and outputs them as the data 316.

When the blank column 1607 is filled in this embodiment, the page reference expander of set No. 2 of the setting management table 1301 must be always added.

Because the data address of the analysis information 308 is [menu. tml] and the page reference expander of the set No. 2 of the setting management able 1301 is [.p-quick], the content of the data 316 is as shown in FIG. 16.

In FIG. 16, reference numeral 1701 denotes the expanded screen configuration data generated by the screen configuration expanding portion 306. Reference numerals 1702 and 1703 denote the descriptions generated when the screen configuration expanding portion 306 fills the blank columns of 1606 of 1603 and 1607 of 1604, respectively.

The screen configuration expanding portion 306 transfers the processing to the response processing portion 303.

Next, the response processing portion 303 transfers the data 316 to the client 105.

Receiving the data 316 as the screen configuration data 1701, the client 105 analyzes its content.

In order to completely display the content of the screen configuration data 1701 on the screen, the client 105 must receive at least the data to which reference is made by the descriptions 1702 and 1703.

First, the client 105 transmits the command [GET menu. ui. html] for requesting the transfer of [menu. ui. html] looked up by the description 1702 to the screen configuration expanding device 103.

Receiving this command, the screen configuration expanding device 103 analyzes this command by the command analysis portion 304 of the request processing portion 301 and obtains the analysis information 308 (the address: menu. html, the expander: .ui, the data kind; screen configuration data)

The request processing portion 301 transfers the processing to the response processing portion 303 in accordance with the (Rule 1) and on the basis of this result, and starts the generation processing of the additional screen configuration data by the screen configuration expanding potion 306.

The screen configuration expanding portion 306 takes out the additional screen configuration template 1202 from the screen configuration template 309.

Next, the screen configuration expanding portion 306 serially fills the addresses as the sum of the data address of the analysis information and the page reference expander of each set number of the setting management table 1301 into the blank columns 1204 and 1206.

Further, the screen configuration expanding portion 306 fills serially the UI button names of the data address setting management table 1301 of the analysis information into the blank columns 1205 and 1207.

In this way, the screen configuration expanding portion 306 fills the blank columns of the additional screen configuration template 1202 by the processing described above and outputs them as the data 316. Here, the data 316 has the content shown in FIG. 13.

Figure 14:
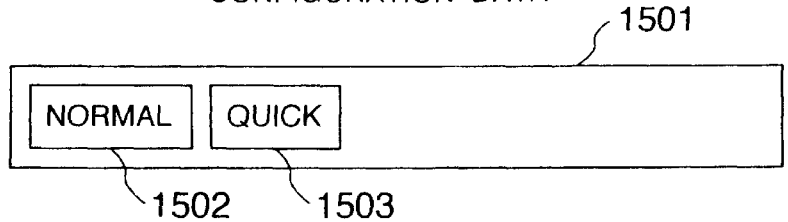
FIG. 14 shows a display example of the additional screen configuration data.

Referring to FIG. 14, reference numeral 1501 denotes client screen display by the screen configuration data 1401, and reference numerals 1502 and 1503 denote the button display by the anchor tag descriptions 1402 and 1403, respectively.

Next, the client 105 transmits the command [GET menu. p-quick. html] requesting the transfer of [menu. p-quick. html] to which reference is made by the description 1703, to the screen configuration expanding device 103.

Receiving this command, the screen configuration expanding device 103 transmits the command [menu. html] to the server 101 in accordance with the (Rule 3) as a result of the processing of the request processing portion 301, and transfers the processing to the response processing portion 303.

At this time, the content of the analysis information is (address: menu. html, expander: p-quick, data kind: screen configuration data).

Receiving the command [menu. html], the server 101 transmits the screen configuration data 501 to the screen configuration expanding device 103.

Receiving the screen configuration data 501, the screen configuration expanding device 103 first delivers the screen configuration data 501 to the screen configuration expanding portion 306 by the data kind detection portion.

The screen configuration expanding portion 306 executes the conversion processing of the screen configuration data in accordance with the following rules.
(Rule A)

The configuration expander whose page reference expander is the same as that of the analysis information 308 in the setting management table 1301 is added to the data address of those anchor tags which refer to the screen configuration data among all the anchor tags contained in the screen configuration data.
(Rule B)

The image reference expander whose page reference expander is the same as that of the expander of the analysis information in the setting management table 1301 is added to the data address of those anchor tags and image tags which refer to the screen configuration data among all the anchor tags and image tags contained in the screen configuration data 314.

Here, when the conversion data 314, that is, the screen configuration data 501, are converted in accordance with the rules described above, the result becomes as shown in FIG. 17.

Figure 17:
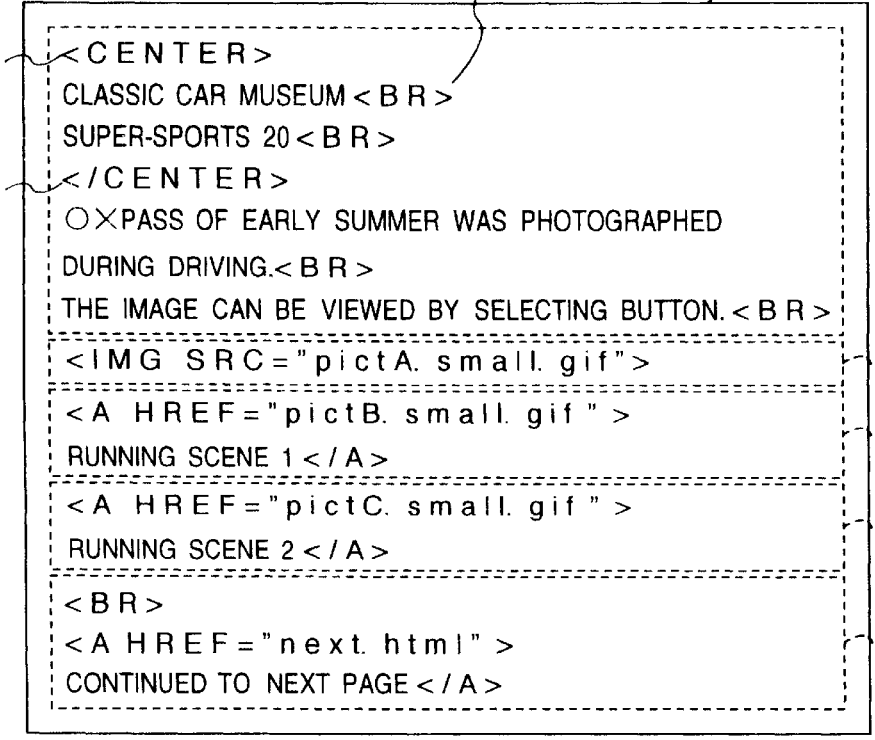
FIG. 17 shows an example of converted screen configuration data.

In FIG. 17, reference numeral 1801 denotes the screen configuration data, and reference numerals 1802, 1803 and 1804 denote the anchor tag descriptions, respectively.

The screen configuration expanding portion converts the data 314 in accordance with the rules described above and outputs them as the data 316.

The screen configuration expanding portion 306 transfers the processing to the response processing portion 303.

Next, the response processing portion 303 transfers the data 316 to the client 105.

Figure 19:
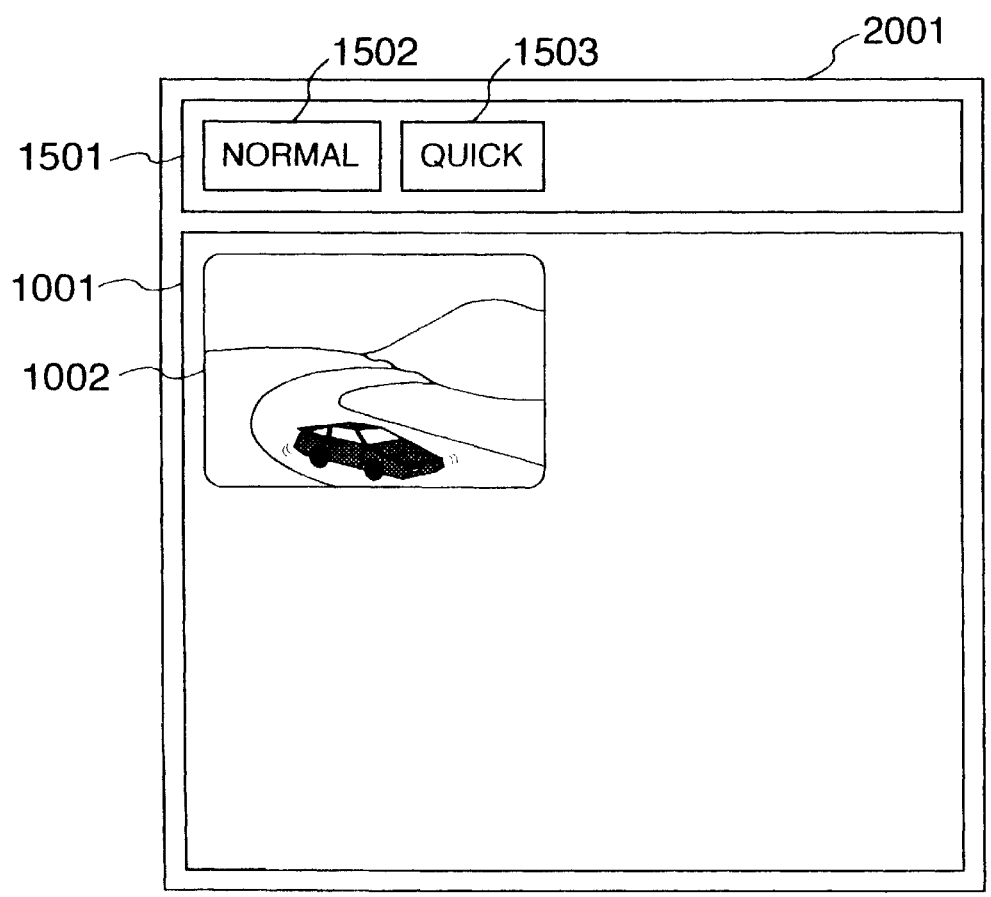
FIG. 19 shows another example of the client screen according to the present invention.

When receiving this data 316, that is, the screen configuration data 1801, the client 105 displays finally the content shown in FIG. 19 on the screen.

Figure 18:
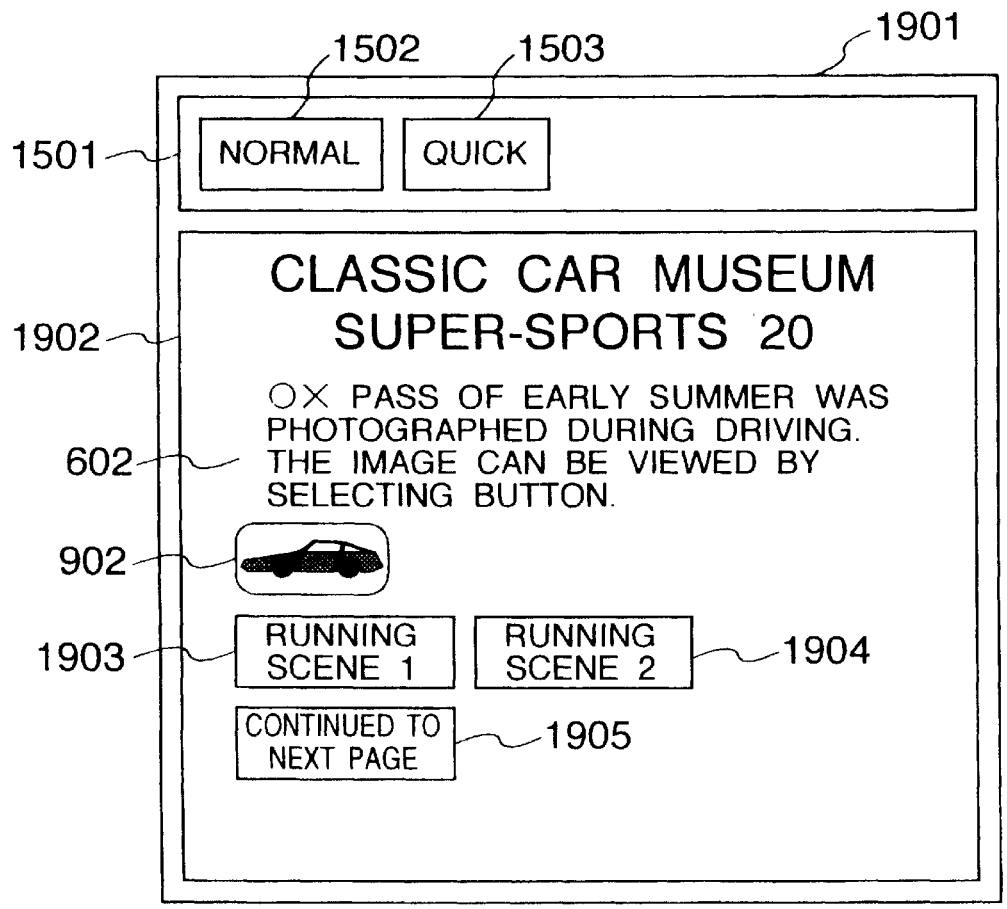
FIG. 18 shows an example of a client screen according to the present invention.

In FIG. 18, reference numeral 1901 denotes client screen display of the screen configuration data 1701, and reference numeral 1902 denotes client screen display of the screen configuration data 1801.

In FIG. 18, reference numerals 1903, 1904 and 1905 denote button displays by the anchor descriptions 1802, 1803 and 1804, respectively.

In FIG. 18, the process in which a static image 902 as a reduced image of the static image 603 is displayed in place of this static image 603 is the same as the operation of the screen configuration expanding device 103, and it is the result of the data conversion by the data conversion portion 307 in accordance with the information of the analysis information 308.

In this way, the processings when the client 105 transmits the command [GET menu. html] are all completed.

Next, when the user of the client 105 selects the button 1903 in the screen display 1901, the client 105 transmits [GET pictA.small. gif] to the screen configuration expanding device 103.

Figure 20:
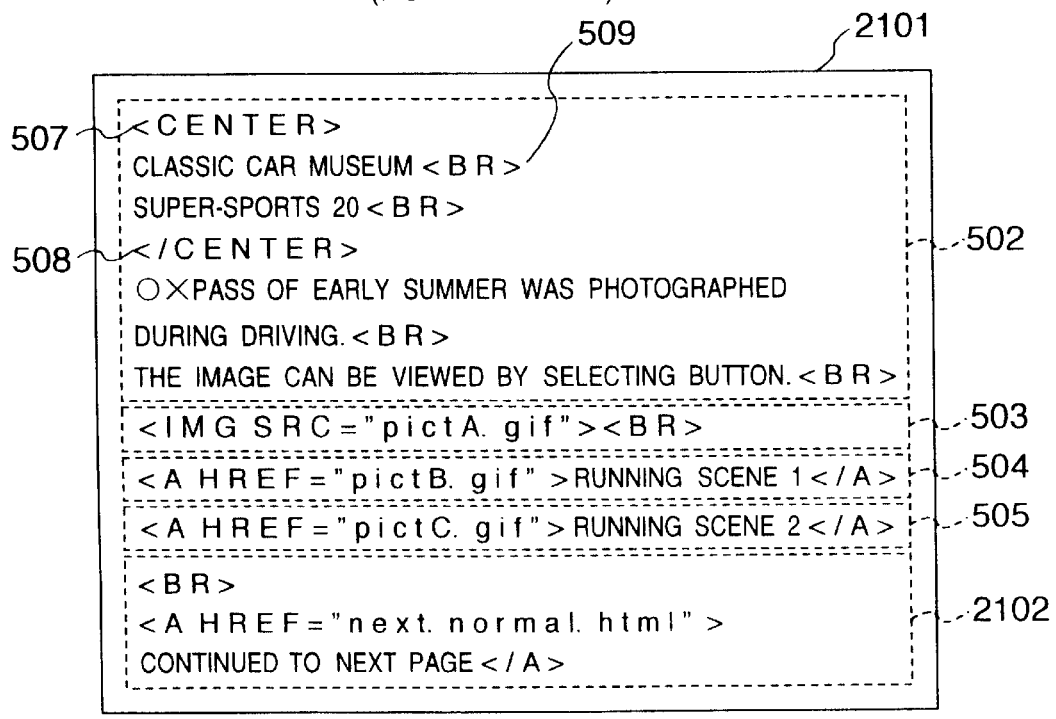
FIG. 20 shows an example of converted screen configuration data.

As a result, the content of FIG. 20 is finally displayed on the screen of the client 105.

In FIG. 19, reference numeral 2001 denotes the screen display of the client.

Figure 10:
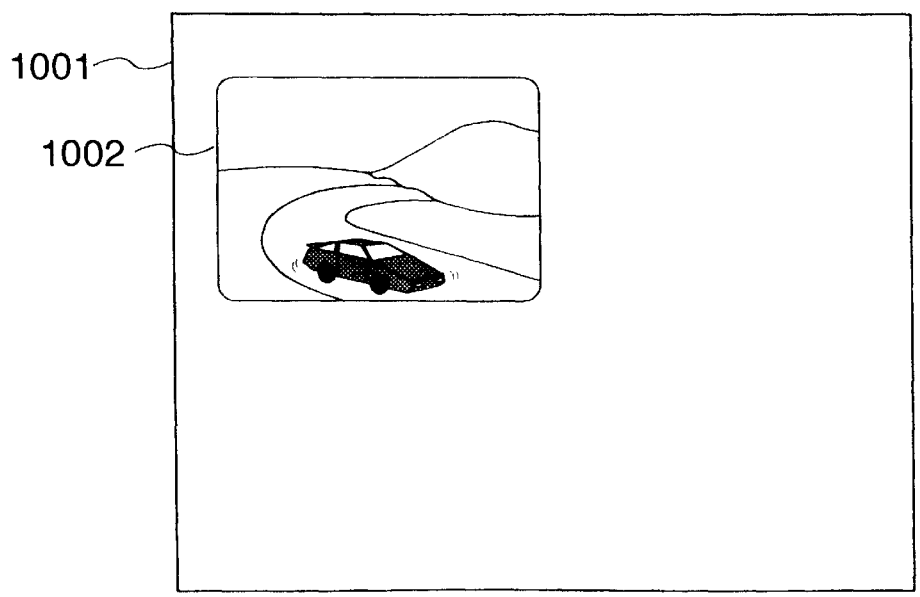
FIG. 10 shows an example 2 of client screen display utilizing the data converting device.

The screen display 2001 is entirely the same as the screen display of FIG. 10. It has the same content as when the button 903 in the screen display 901 is selected in the system utilizing the data converting device 401.

When the user of the client selects the button 1502 in the screen display 1901, the client 105 transmits the command [GET menu.p-normal.html] to the screen configuration expanding device 103.

As a result, the screen configuration expanding device 103 transmits the screen configuration data to the client 105 in accordance with the (Rule 3) in the same way as when it receives [GET menu.p-quick.html].

In FIG. 20, reference numeral 2101 denotes the screen configuration data and reference numeral 2102 denotes the anchor tag description.

Figure 22:
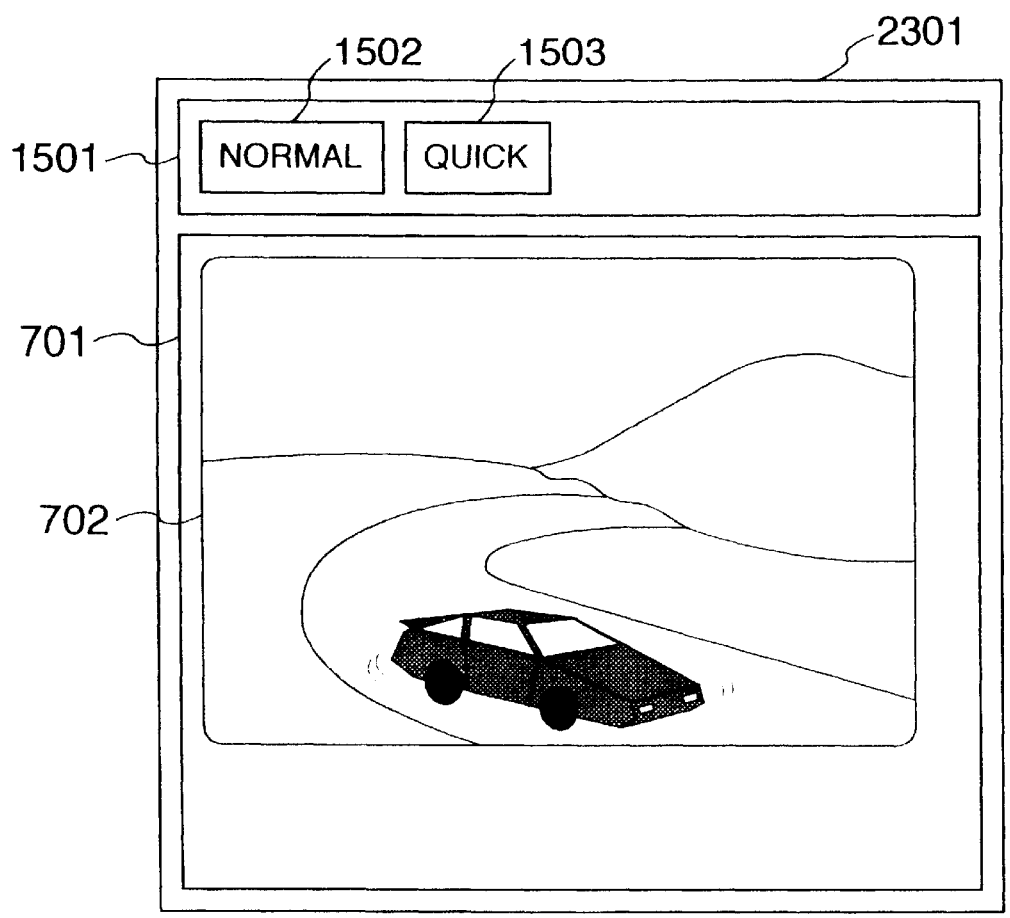
FIG. 22 shows still another example of the client screen according to the present invention.

Receiving the screen configuration data 2101, the client 105 finally displays the content of FIG. 22 on the screen.

Figure 21:
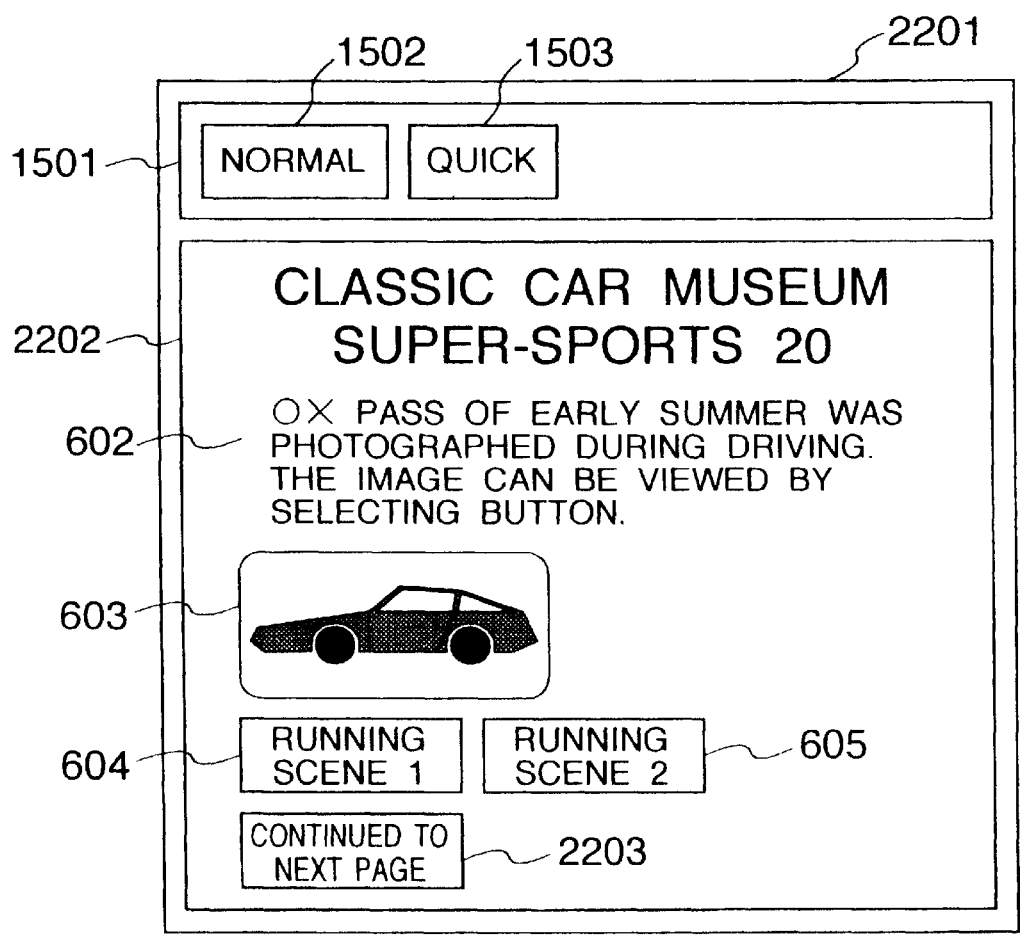
FIG. 21 shows another example of the client screen according to the present invention.

In FIG. 21, reference numeral 2201 denotes the client screen display, reference numeral 2202 denotes the screen display of the screen configuration data 2101 and reference numeral 2203 denotes the button display by the anchor tag description 2102.

The screen display 2202 in FIG. 21 is entirely the same in appearance as the screen display 601.

When the client user selects the button 604 in the screen display 2202, the client 105 finally displays the content of FIG. 22 on the screen.

In FIG. 22, reference numeral 2301 denotes the client screen display.

When the client user selects the button 1503 in the screen display 2202, the client 105 transmits the command [GET menu.p-quick.html].

Since this case is entirely the same as the case when the client 1501 transmits [GET menu.html], the final screen display of the client 105 is the same as the screen display 1901.

As described above, control can be made so that when the client 105 first gains access to the data or when the user selects the [QUICK] button, all the static images transferred to the client 105 are reduced, and when the user selects the [NORMAL] button, the static image data are not reduced in the same way as when the server 101 and the client 105 directly communicate with each other.

In this embodiment, the conversion function of the data conversion portion 307 has been explained only as the size change function of the static image, but the present invention can cope with all data conversion functions.

Examples of the data conversion systems that can be applied to the present invention include the conversion of moving image data to digest data, the conversion of speech data to digest data, translation of text data, and so forth.

Though this embodiment has the construction such that the additional screen configuration data are displayed at the upper portion of the screen, this position can be easily changed to the right or left or lower portions.

Though the number of the additional screen configuration data is only one in this embodiment, it can be easily changed to a plurality of numbers.

The content of the additional screen configuration data in this embodiment is the mode setting buttons for the data conversion, but any content can be added to the screen display by the present invention so long as they can be represented by the screen configuration data.

Examples include the notice and help to the users and advertisements of companies.

This embodiment makes it possible for the user of the client to reduce the data amount while keeping layout of the original screen display 601.

Further, the client user can gain access at any time to the content similar to that of the screen display 601 and the access to the original data becomes easier.

Because the present invention keeps the format of the communication system and the screen configuration data according to the prior art, existing servers and clients can be as such utilized.

As described above, this embodiment provides the function of reducing the data amount and improving operability of the system by merely selecting the buttons at the upper portion of the screen and changing the mode without changing layout.

Figure 23:
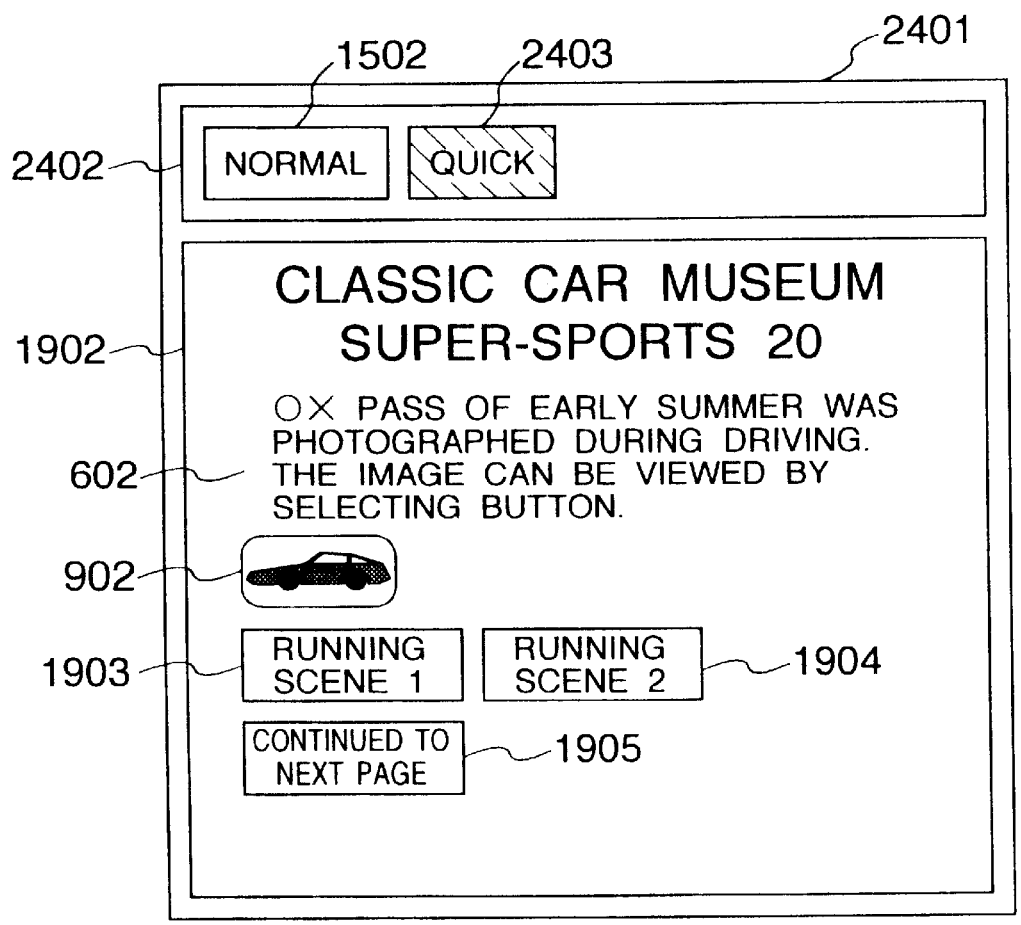
FIG. 23 shows still another example of the client screen according to the present invention.
Figure 24:
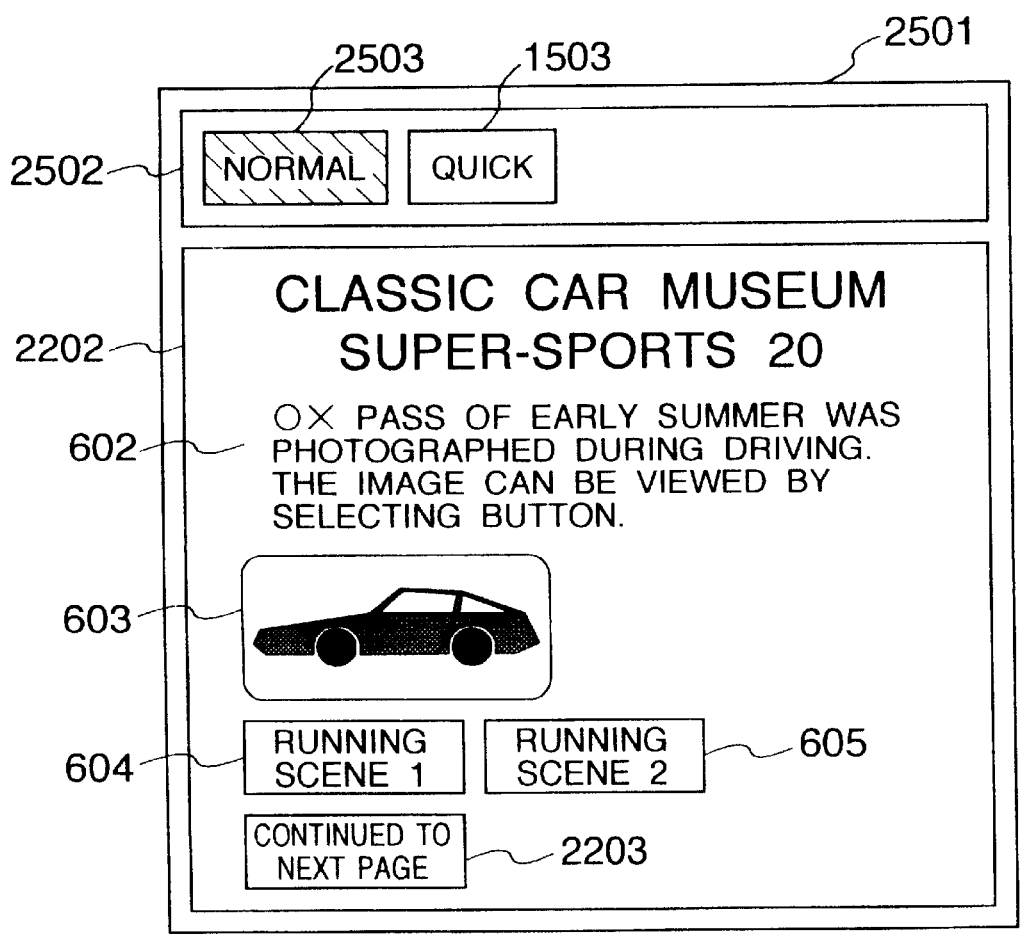
FIG. 24 shows still another example of the client screen according to the present invention.

Change-over of the mode can be explicitly represented as shown in FIGS. 23 and 24 by changing the display method of the selected button at the time of selection of the buttons 1502 and 1503.

In FIG. 23, reference numeral 2401 denotes the client screen display, reference numeral 2402 denotes the screen display of the additional screen configuration data and reference numeral 2403 denotes the reversed button display.

In FIG. 24, reference numeral 2501 denotes the client screen display, reference numeral 2502 denotes the screen display of the additional screen configuration data and reference numeral 2503 denotes the reversed button display.

According to this embodiment, the user can judge at a look the mode he is utilizing, and can be relieved from the confusion whether or not he is looking up the original.

Figure 25:
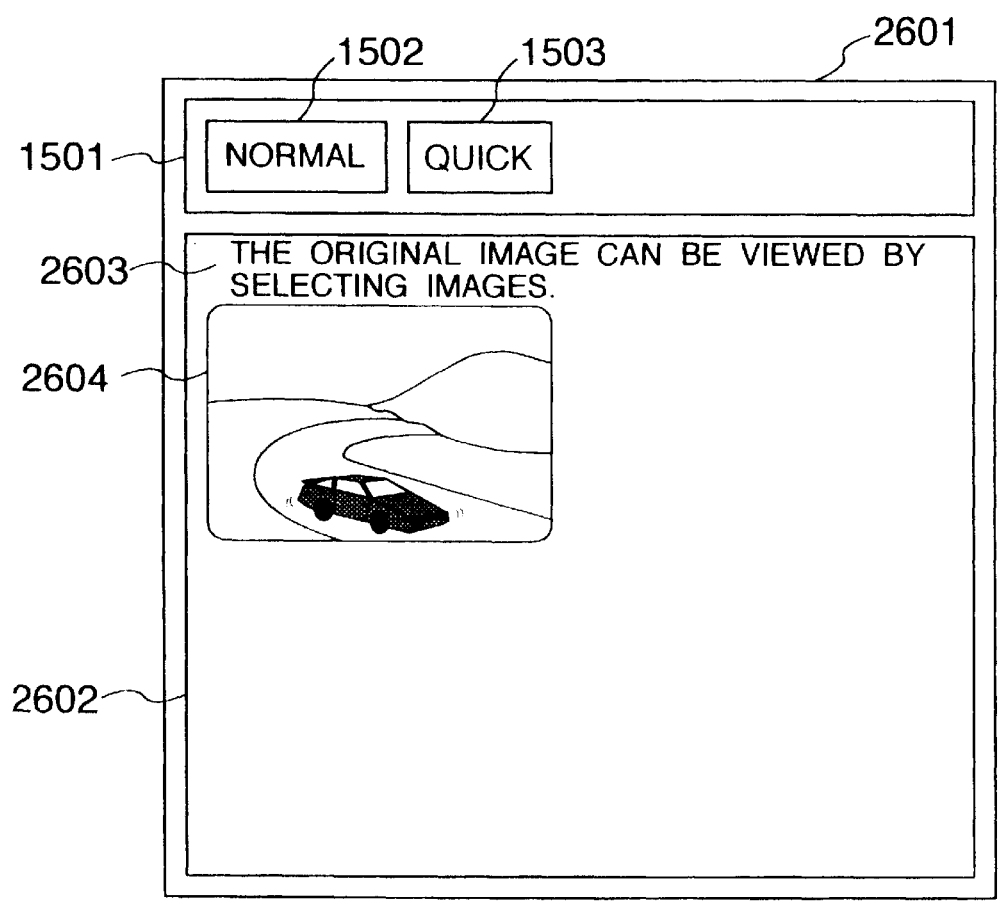
FIG. 25 shows still another example of the client screen according to the present invention.

The content shown in FIG. 25 can be displayed on the client 105 in place of the screen display 2001.

In FIG. 25, reference numeral 2601 denotes the client screen display, reference numeral 2602 denotes the screen display of the lower area of 2601, reference numeral 2603 denotes the screen display of the text and reference numeral 2604 denotes the static image 1002 and also the button.

When the user selects the user button 2604 in the screen display 2601, the screen display of the client 105 finally becomes similar to the screen display 2301.

The first embodiment requires the operation of changing the mode and gaining again access to the same data in order to easily look up the original image from the state where the user refers to the reduced image. However, this embodiment can carry out the same operation by a single operation of selecting the buttons.

Figure 26:
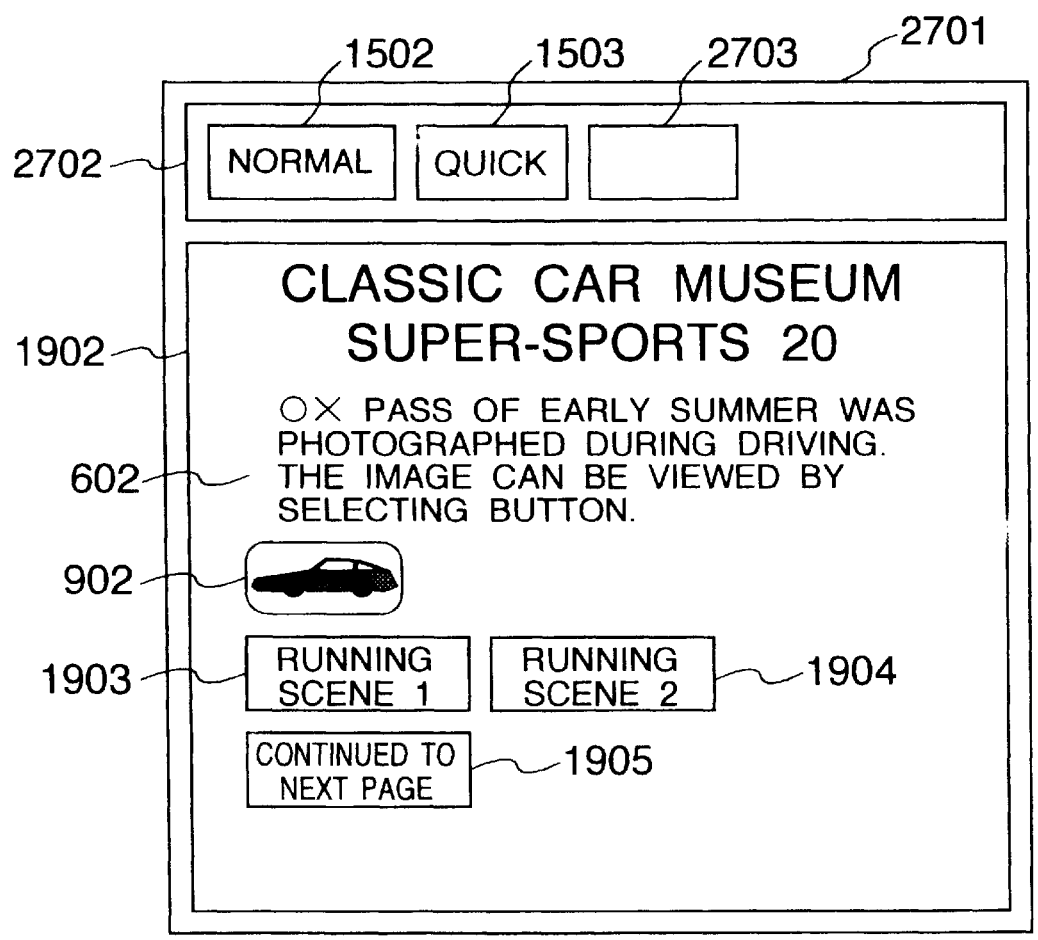
FIG. 26 shows still another example of the client screen according to the present invention.

Furthermore, a [list] button can be added as shown in FIG. 26 by changing the additional screen configuration data.

In FIG. 26, reference numeral 2701 denotes the client screen display, reference numeral 2702 denotes the screen display of the additional screen configuration data to which the [list] button is added, and reference numeral 2703 denotes the screen display of the [list] button.

The user can look up the list of the reduced images of the static image data referred to by the button on the screen displayed at the lower portion by selecting the [list] button.

Figure 27:
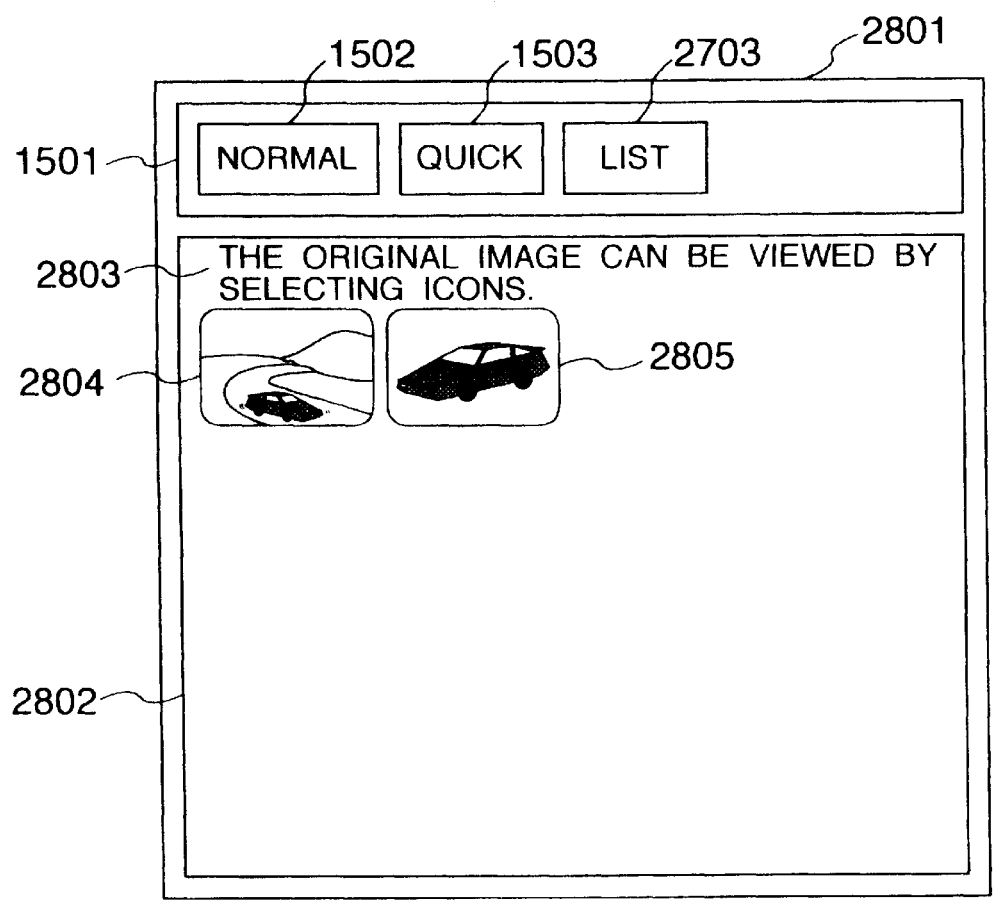
FIG. 27 shows still another example of the client screen according to the present invention.

When the user selects the button 2703 in the screen display 2701, for example, the screen display of the client 105 becomes such as the one shown in FIG. 27.

In FIG. 27, reference numeral 2801 denotes the client screen display, reference numeral 2802 denotes the list display of the images, reference numeral 2803 denotes the text and reference numerals 2804 and 2805 denote the reduced static images, respectively.

The original images of the respective image can be looked up in the screen 2801 by selecting the buttons 2804 and 2805, respectively.

It is possible to grasp the outline of a plurality of data by one operation, and is particularly effective when a large number of buttons for looking up the static image data exists on the same screen.

The third and fourth embodiments are effective not only when the object of the data conversion in the present invention is the static image but also when it is the moving image data.

For example, the third embodiment can provide the function such that when the button for looking up the moving image data exists, only the first frame of the moving image is displayed in the QUICK mode, and starting the reproduction of the moving image when this image is selected as the button.

The next embodiment can provide the function such that when a large number of buttons for looking up the moving image data exist, only the first frame of the moving image data is listed by selecting the [list] button.

Figure 28:
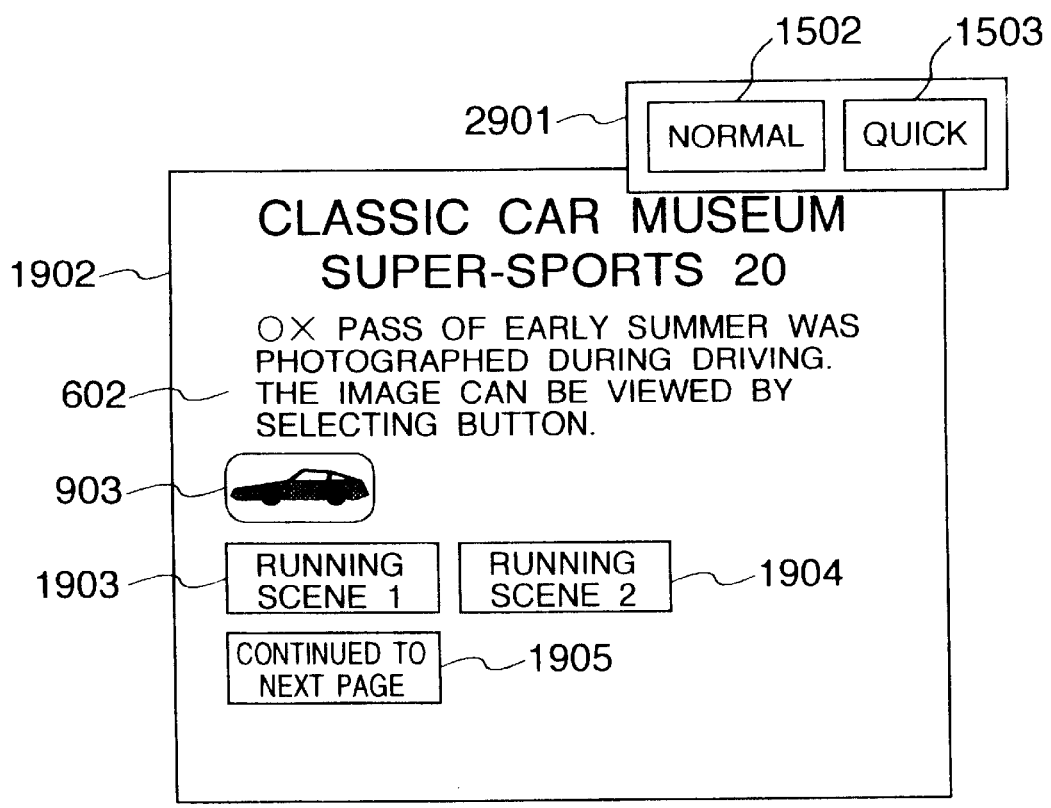
FIG. 28 shows still another example of the client screen according to the present invention.

Furthermore, the additional screen configuration data can be displayed as shown in FIG. 28.

In FIG. 28, reference numeral 2901 denotes a screen display by another window.

According to this embodiment, the user can dispose the mode change button at a desired position.

It is further possible to distinguish the static image buried in the client display screen from the static image looked up by the button, and to enable the user to select the separate reference modes.

Figure 29:
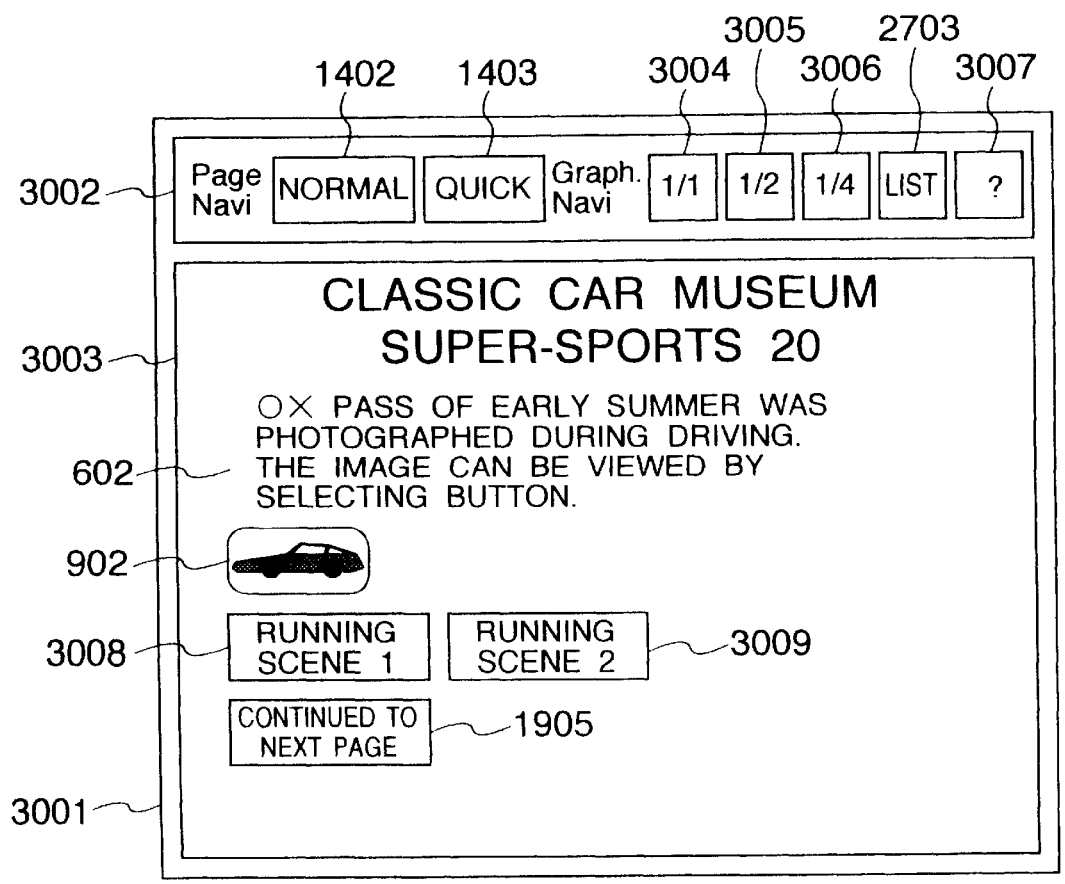
FIG. 29 shows still another example of the client screen according to the present invention.

The client display screen in this embodiment becomes such as the one shown in FIG. 29.

In FIG. 29, reference numeral 3001 denotes the client screen display and reference numeral 3002 denotes the screen display of the additional screen configuration data.

In FIG. 29, reference numeral 3003 denotes the client screen display and reference numerals 3004, 3005 and 3006 denote the buttons for designating the reference mode of the static image to be looked up by the buttons.

In FIG. 29, further, reference numeral 3007 denotes the button for displaying the operation method.

This embodiment distinguishes the static image buried into the client display screen from the static image to be looked up by the buttons and enables the user to select the separate reference modes. Therefore, the operation can be carried out easily and flexibly in such a manner that the image buried in the screen display is reduced and only the static image to be looked up by the buttons always refers to the original.

Next, the operation for accomplishing the processing described above will be explained in further detail.

Although the present invention does not limit the kind of the data exchanged between the client 105 and the server 105 and the number of such data, the following premise will be assumed so as to simplify the explanation.
{Premise 1}

The kind of the data as the object of the operation of the screen configuration expanding device 103 is only the screen configuration data and the static image data. The end of the data address is always [.html] in the case of the screen configuration data and [.gif] in the case of the static image data.

Then, the explanation will be given on the operation of the network system of this embodiment shown in FIG. 1 with reference to the drawings.

Figure 30:
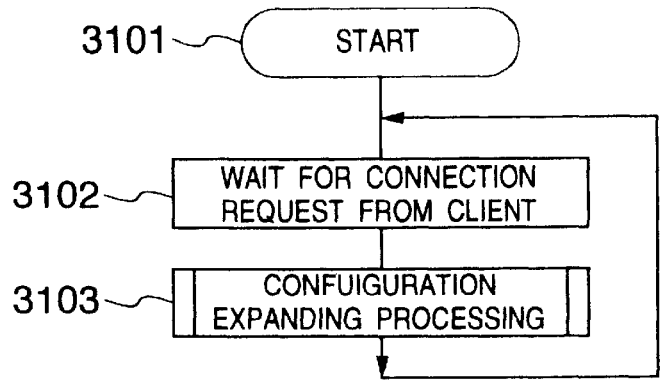
FIG. 30 is a flowchart of the processing of a configuration expanding device.

In this embodiment, the screen configuration expanding device 103 executes the processing in accordance with the flowchart shown in FIG. 30.

In FIG. 30, reference numeral 3101 represents the start of the operation of the screen configuration expanding device 103.

When activated, the screen configuration device 103 transfers the processing to the step 3102 and waits for the connection request from an indefinite client.

When the connection request arrives from the client, the screen configuration expanding device 103 transfers the processing to the step 3103 and executes the configuration expanding processing.

This configuration expanding processing 3103 will be explained later in further detail.

When this configuration expanding processing 3103 is completed, the screen configuration expanding device 103 again transfers the processing to the step 3102 and thereafter repeats the steps 3102 and 3103.

Next, the concrete operations of the screen configuration expanding device 103 in this embodiment will be explained.

In the explanation which follows, the period during which the client 105 establishes the connection with the screen configuration expanding device 103 to transmit the command and cuts off this connection will be referred to as a "session".

The operation of the screen configuration expanding processing 103 in the session in which the client 105 establishes the connection with the configuration expanding device 103 to transit the command [GET menu. html] and then cuts off this connection will be explained.

This session will be hereinafter called the "session 1).

First, the screen configuration expanding device 103 is activated and then waits for the connection request from an unspecific client at the step 3102.

Next, the client 105 raises the connection request for the screen configuration expanding device 103 and transmits the command {GET menu. html].

Then, the screen configuration expanding device 103 receives the connection request from the client 105 and transfers the processing to the step 3103.

After the configuration expanding processing at the step 3103 is completed, the processing is transferred to the step 3102, and a new connection request from an unspecific client is awaited afresh.

Figure 31:
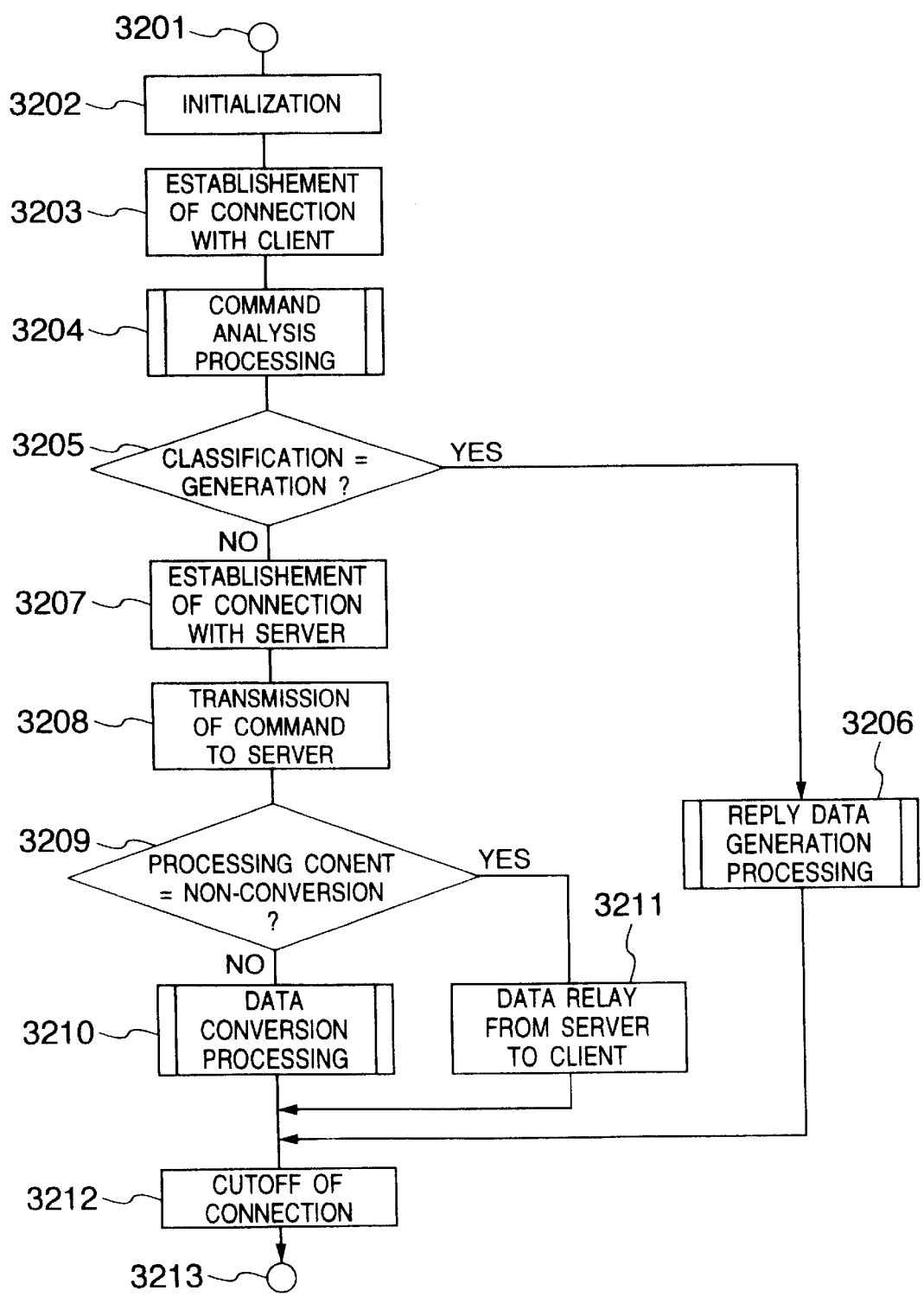
FIG. 31 is a flowchart of a configuration expanding processing.

Next, the processing content of the configuration expanding processing 3103 will be explained with reference to the flowchart of FIG. 31. In FIG. 31, reference numeral 3201 denotes the start of the configuration expanding processing 3103.

Similarly, reference numeral 3202 denotes the step of an initialization processing, and the data necessary for the configuration expanding processing 3103 are initialized at this step.

In this embodiment, the screen configuration expanding device 103 initializes the setting table shown in FIG. 3 at the step 3202.

In FIG. 37, reference numeral 3801 denotes the setting table and reference numeral 3802 denotes the item name of the setting table 3801. Reference numeral 3803 denotes the content of the setting table 3801.

At the step 3202, the screen configuration device 103 sets the content of the setting table 3801 to [address=nil, classification=conversion, processing content=non-conversion, parameter=nil] as represented by 3803.

Next, the screen configuration expanding device 103 transfers the processing to the step 3203 and establishes the connection with the client.

The screen configuration expanding device 103 then transfers the processing to the step 3204 and executes the command analysis processing.

In this command analysis processing 3204, the command from the client with which connection is established is received, and the content of the setting table is set by using the processing object able for confirming whether or not the command is the data as the processing object of the screen configuration expanding device 103. The detail of the command analysis processing will be described later.

When the command analysis processing 3204 is completed, the screen configuration expanding device 103 transfers the processing to the step 3205 and judges whether or not the content of the item [classification] of the setting table 3801 is [generation].

When the judgement result at the step 3205 proves [YES], that is, true, the screen configuration expanding device 103 transfers the processing to the step 3206 and if the result is not [YES], it transfers the processing to the step 3207.

At the step 3206, the screen configuration expanding device 103 generates new screen configuration data for executing expansion for the page of the original and replies to the client.

The detail of this replay data generation processing 3206 will be described later.

At the step 3207, on the other hand, the screen configuration expanding device 103 establishes the connection with the server storing the data of the [address] of the setting table.

Next, the screen configuration expanding device 103 transfers the processing to the step 3208, transmits established at the step 3207, and then transfers the processing to the step 3209.

The command at this time is the one obtained by replacing the address portion of the command received from the client by the content of the item [address] of the setting table 3801.

Next, the screen configuration expanding device 103 transfers the processing to the step 3209 and judges whether or not the item [processing content] of the setting table 3801 is [non-conversion].

When the result is [YES], that is, true, the screen configuration device 103 transfers the processing to the step 3211 and if not, transfers the processing to the step 3210.

At the step 3210, the screen configuration expanding device receives the data from the server, executes data conversion designated y the [processing content] of the setting table, and then transfers the processing to the step 3212.

The detail of the data conversion processing 3210 will be described later.

On the other hand, the screen configuration expanding device 103 receives the data transmitted from the server at the step 3211, transmits the data as such to the client, relays the data and then transfers the processing to the step 3212.

Next, the screen configuration expanding device 103 cuts off the connection with the client, and the connection with the server when the processing is executed through the step 3207, at the step 3212, and then transfers the processing to the step 3213.

At the step 3213, the screen configuration expanding device 103 completes the configuration expanding processing 3103. The above explains the operation of the screen configuration expanding device 103 in the configuration expanding processing 3103.

Since the operation of the configuration expanding device 103 is the repetition of the configuration expanding processing 3103, the explanation will be hereinafter given primarily on the operation of the configuration expanding processing 3103 when the operation of the screen configuration expanding device 103 is explained.

Here, the configuration expanding processing 3103 in (session 1) will be explained.

The screen configuration expanding device 103 first initializes the content of the setting table 3801 at the step 3202 and then transfers the processing to the step 3203.

At this time, the content of the setting table is as 3803 in FIG. 37.

The screen configuration device 103 establishes the connection with the client 105 at the step 3203 and then transfers the processing to the step 3204.

Next, the screen configuration expanding device 103 executes the command analysis processing 3204 at the step 3204, sets the content of the setting table and transfers the processing to the step 3205.

In this embodiment, the content of the setting table is set to [address=menu. html, classification=generation, processing content=generation of configuration expanding frame, parameter=.p-quick], and the process to this setting result will be later described.

Next, since the content of [classification] of the setting table 3801 is [generation] at the step 3205, the result of judgement becomes [UES] and the screen configuration expanding device 103 transfers the processing to the step 3206.

The screen configuration expanding device 103 generates the expanded screen configuration data 1701 shown in FIG. 16 at the step 3206, and then transfers the processing to the step 3212.

The detail of the processing of the step 3206 will be described later.

At the step 3212, the screen configuration expanding device 103 cuts off the connection with the client 105 and transfers the processing to the step 3212.

At the step 3213, the screen configuration expanding device 103 completes the configuration expanding processing 3103.

The above explains the operation of the configuration expanding processing of the screen configuration expanding device 103 in (session 1).

Next, the detail of the command analysis processing 3204 will be explained.

Figure 32:
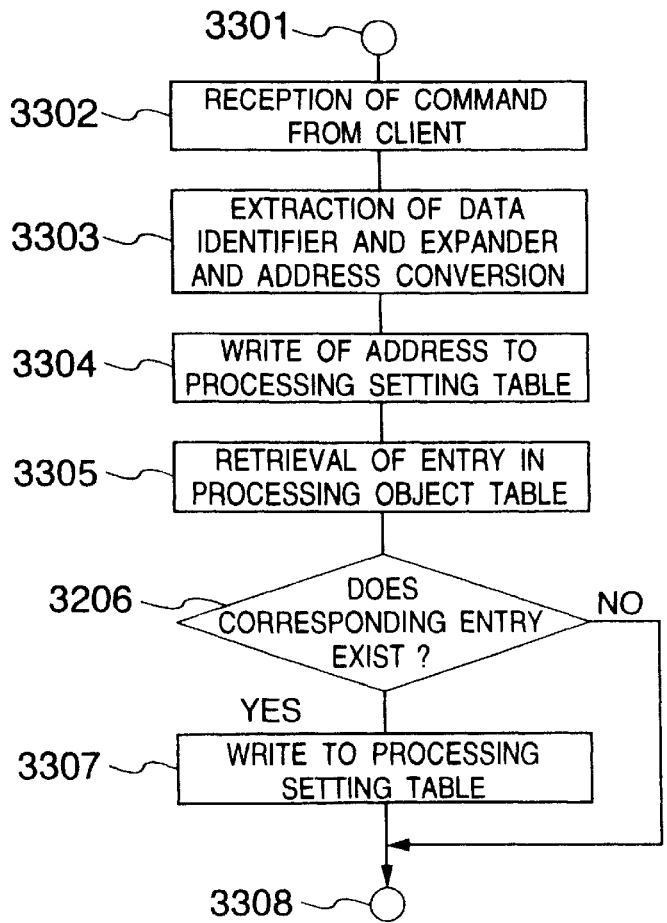
FIG. 32 is a flowchart of a command analysis.

The screen configuration expanding device 103 executes the command analysis processing 3204 in accordance with the flowchart shown in FIG. 32.

In FIG. 32, reference numeral 3301 represents the start of the command analysis processing.

At the step 3302, the screen configuration expanding device 103 receives the command from the client which establishes the connection at the step 3203.

Next, the screen configuration expanding device 103 extracts the data identifier and the expander from the address contained in the command so received at the step 3303, removes the expander from the address if it exists, and transfers the processing to the step 3304.

Here, the term "data identifier" represents a character string starting with the tail [.] and the term "expander" represents a character string starting with the tail [.] other than the data identifier.

For example, when the address of the received command is [menu. html], the data identifier is [.html] and the expander is [nil], and the address conversion is not effected.

On the other hand, when the address of the received command is [menu. quick. html], the data identifier is [.html] and the expander is [quick].

Next, the screen configuration expanding device 103 writes the address contained in the command received from the client into the item [address] of the setting table 3801 at the step 3304 and transfers the processing to the step 3305.

Next, the screen configuration expanding device 103 judges whether or not the command is the processing object data by using the processing object table shown exemplarily in FIG. 38 at the step 3305. This processing object table is stored in the memory device 202 shown in FIG. 2.

In FIG. 38, reference numeral 3901 represents the processing object table and reference numeral 3902 does the item name of this processing object table 3901. Reference numerals 3903, 3904, 3905, 3906, 3907 and 3908 represent the entries of the processing object table.

It will be hereby assumed that the processing object table does not have the limitation of the number of entries.

At the step 3305, the screen configuration expanding device 103 retrieves the entries where the data identifier and the expander extracted at the step 3303 correspond to the items [object data identifier] and [expander] in the processing object table, respectively, and then transfers the processing to the step 3306.

Next, at the step 3306, the screen configuration expanding device 103 judges whether or not the entries exist as a result of retrieval at the step 3305. If the corresponding entries exist, the result proves [YES] and the processing proceeds to the step 3307. If not, the processing proceeds to the step 3308.

At the step 3307, the screen configuration expanding device 103 writes the items [classification], [processing content] and [parameter] in the entries retrieved at the step 3305 into the items [classification], [processing content] and [parameter] in the setting table 3801, and transfers the processing to the step 3308.

The screen configuration expanding device 103 completes the command analysis processing at the step 3308.

Next, the processing process of the command analysis processing 3204 when the client 105 transmits the command [GET menu. html] to the screen configuration expanding device 103 will be explained.

First, at the step 3301, the screen configuration expanding device 103 starts the command analysis processing.

Next, the screen configuration expanding device 103 receives the command [GET menu. html] from the client 105 at the step 3302 and transfers the processing to the step 3303.

Next, the screen configuration expanding device 103 extracts the expander and the data identifier from the address menu. html contained in the command [GET menu. html] and the result of this extraction becomes [data identifier= .html, expander=nil].

Because [expander=nil], the screen configuration expanding device 103 does not execute the address conversion.

Next, the screen configuration expanding device 103 retrieves the entry having [object data identifier=.html, expander=nil] in the processing object table 3901 at the step 3305, and picks up the entry 3904 as the result of retrieval.

At the next step 3306, the screen configuration device 103 confirms the existence of the corresponding entry and then transfers the processing to the step 3307.

The screen configuration expanding device 103 then writes the content [classification], [processing content] and [parameter] of the entry 3904 into the items [classification], [processing content] and [parameter] of the setting table 3801 at the step 3308.

As a result, the content of the setting table 3801 becomes [address=menu. html, classification=generation, processing content=generation of configuration expanded name, parameter=.[-quick].

The screen configuration expanding device 103 completes the command analysis processing at the step 3308

The above explains the processing process of the command analysis processing 3204 when the client 105 transmits the command [GET menu. html] to the screen configuration expanding device 103.

Next, the detail of the response data generation processing 3206 will be explained.

Figure 33:
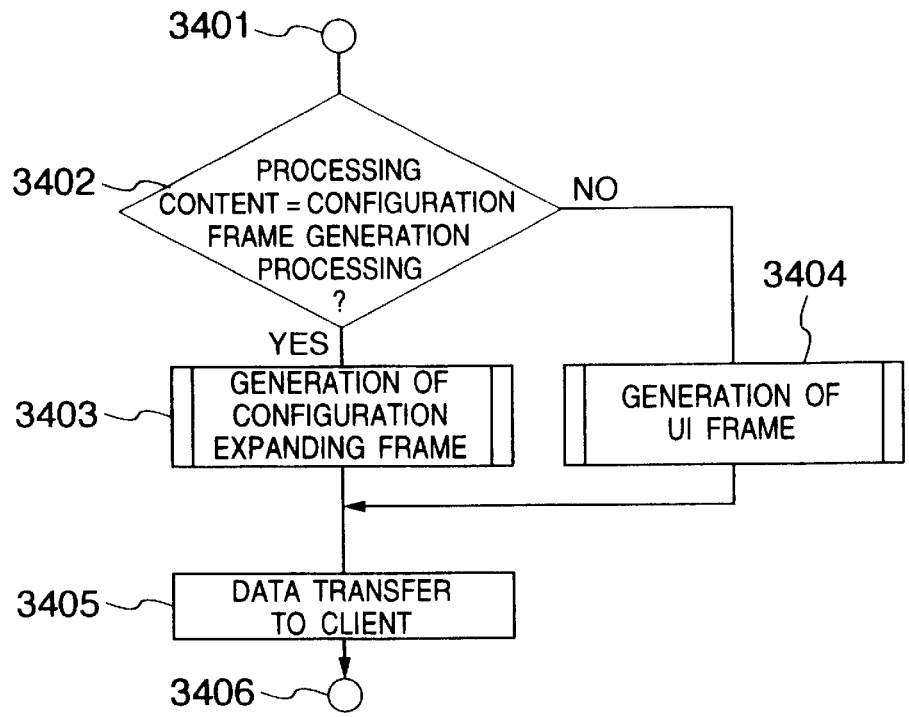
FIG. 33 is a flowchart of a response data generation processing.

The screen configuration expanding device 103 starts the response data generation processing 3206 at 3401 in FIG. 33.

The screen configuration expanding device 103 judges whether or not the content of the time [processing content] of the setting table 3801 is [generation of configuration expanded frame] at the step 3402. If the result proves [YES], that is, true, the processing is transferred to the step 3403 and if not, to the step 3404.

At the step 3043, the screen configuration expanding device 103 executes the configuration expanded frame generation processing, generates the screen configuration data for replaying to the client establishing the connection, and transfers the processing to the step 3405.

This screen configuration data is the screen configuration data for expanding the page of the address required by the client, and is so described as to synthesize a plurality of screen configuration data.

The detail of the operation of the configuration expanded frame generation processing 3403 will be described later.

On the other hand, the screen configuration expanding device 103 executes the UI frame generation processing at the step 3404, generates the screen configuration data for replying to the client establishing the connection at the step 3203, and transfers the processing to the step 3405.

This screen configuration data is the one that describes the user interface for enabling the user to utilize a certain specific function when added to the page of the address required by the client.

The detail of the UI frame generation processing 3404 will be described later.

At the step 3405, the screen configuration expanding device 103 transmits the screen configuration data generated at the step 3403 or 3404 to the client establishing the connection at the step 3203, and transfers the processing to the step 3406.

At the step 3406, the screen configuration expanding device 103 completes the replay data generation processing.

The processing process of the replay data generation processing will be hereby explained about the case where the client 105 transmits the command [GET menu. html] to the screen configuration expanding device 103.

In this case, the content of the setting table 3801 is [address=menu. html, classification=generation, processing content=generation of expanded configuration frame, parameter=.p-quick] in the command analysis processing 3204 as described already.

First, the screen configuration expanding device starts the replay data generation processing at the step 3401.

At the next step 3402, the screen configuration expanding device 103 judges whether or not the item [processing content] of the setting table 3801 is [generation of configuration expanded frame], and because this result proves [YE], it transfers the processing to the step 3403.

At the step 3403, the screen configuration expanding device 103 generates the screen configuration data 1701 and transfers the processing to the step 3405.

The detail of the process for generating the screen configuration data 1701 by the configuration expanded frame processing 3403 will be described later.

At the step 3405, the screen configuration expanding device 103 transmits the screen configuration data 1701 generated at the step 3403 to the client 105 and then transfer the processing to the step 3406.

The above explains the processing process of the replay data generation processing when the client 105 transmits the command [GET menu. html] to the screen configuration expanding device 103.

Next, the detail of the configuration expanded frame generation processing 3403 will be explained.

Figure 34:
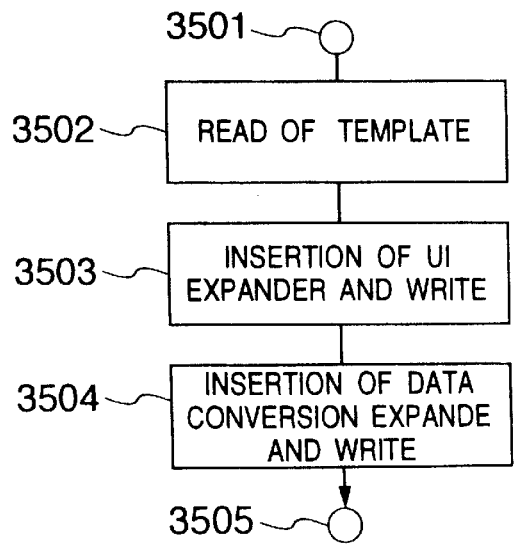
FIG. 34 is a flowchart of configuration expanding frame generation.

The screen configuration expanding device 103 executes the configuration expanded frame generation processing 3403 in accordance with the flowchart shown in FIG. 34.

In FIG. 34, reference numeral 3501 represents the start of the configuration expanded frame generation processing 3403.

The screen configuration expanding device 103 first reads the screen configuration temperate as the model of the screen configuration data to be finally generated at the step 3502, and transfers the processing to the step 3503.

FIG. 15 shows an example of the screen configuration template used in this embodiment.

Two blank columns 1606 and 1607 are provided to the screen configuration template in this embodiment.

At the step 3503, the screen configuration expanding device 103 inserts the expander [.ui] to the address set to the item [address] of the setting table 3801, writes the result into the blank column 1601 and then transfers the processing to the step 3504.

At the step 3504, the screen configuration expanding device 103 inserts the expander set to the item [parameter] of the setting table 3801 to the address set to the item

[address] of the setting table 3801, writes the result into the blank column 1607 and then transfers the processing to the step 3050.

At the step 3505, the screen configuration device 103 handles the data filling the two blank columns 1606 and 1607 of the screen configuration template 1601 as the resulting screen configuration data, and finishes the configuration expanded frame generation processing.

Here, the processing process of the configuration expanding frame generation processing will be explained about the case where the client 105 transmits the command [GET menu. html] to the screen configuration expanding device.

In this case, the content of the setting table 3801 is [address=menu.html, classification=generation, processing content=generation of configuration expanded frame, parameter=.p-quick] in the command analysis processing 3204 as already described.

First, the screen configuration device 103 starts generating the configuration expanded frame at the step 3501.

At the step 3502, the screen configuration expanding device 103 reads the screen configuration template 1601 and transfers the processing to the step 3503.

At the step 3503, the screen configuration expanding device 103 inserts the expander [.ui] to the content [menu.html] of the item [address] of the setting table 3801, writes the result [menu. ui. html] into the blank column 1606 and then transfers the processing to the step 3504.

At the step 3504, the screen configuration expanding device 103 inserts the expander [.p-quick] (here, the expander is also the conversion instruction command for instructing to convert the command from the server at the screen configuration expanding device) set to the content [menu. html] of the item [address] of the setting table 3801, writes the result [menu. p-quick.html] into the blank column 1607 and transfers the processing to the step 3505.

At this time, as the two blank columns 1606 and 1607 are filled, the screen configuration template 1601 becomes the screen configuration data 1701 shown in FIG. 16.

At the step 3505, the screen configuration expanding device 103 handles the screen configuration data 1701 as the resulting screen configuration data and finishes the configuration expanded frame generation processing 3403.

When the screen configuration expanding device 103 receives the command [GET menu.html] from the client 105 in the (session 1) as described above, it transmits finally the screen configuration data to the client 105.

Figure 42:
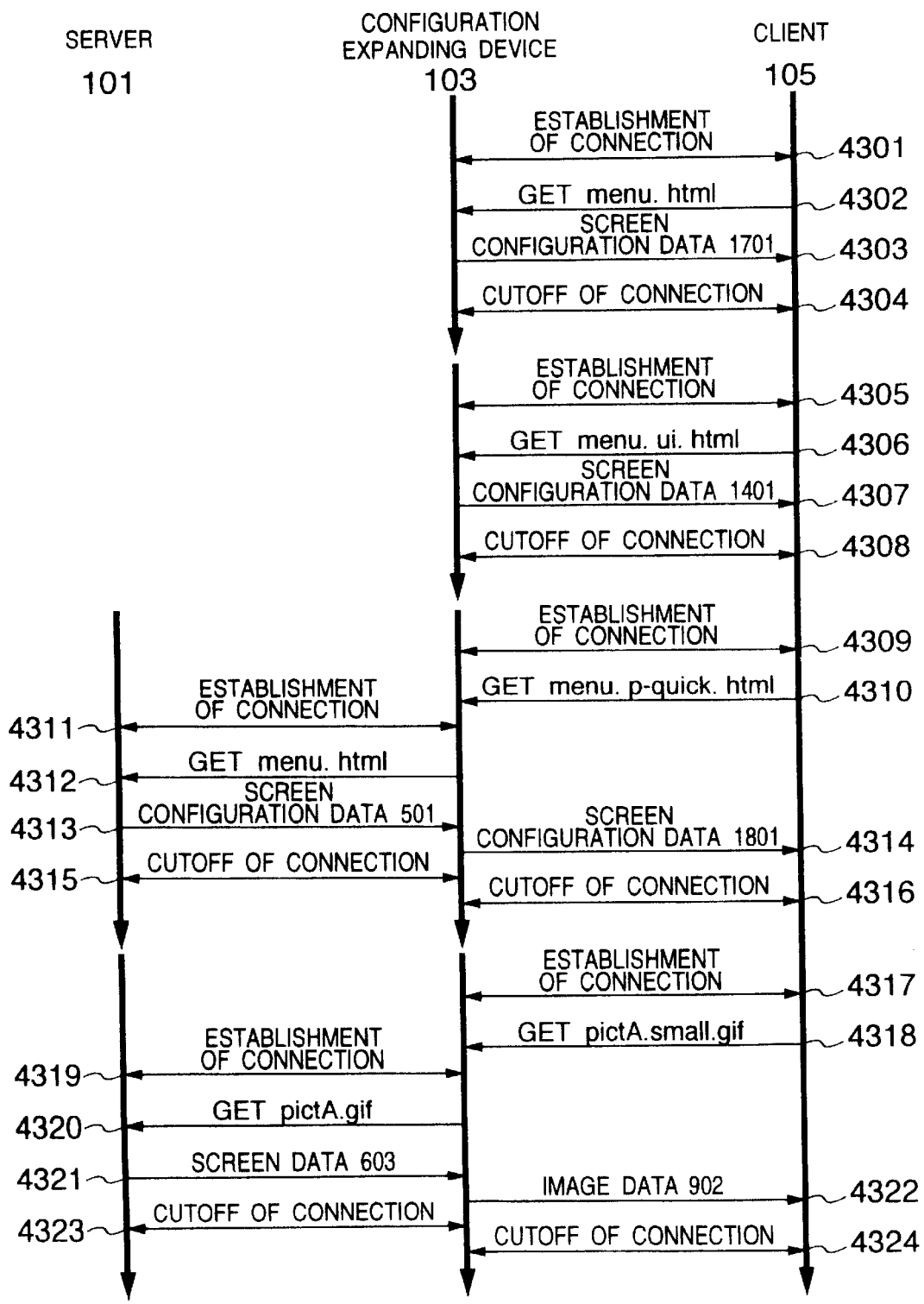
FIG. 42 shows a processing sequence according to the present invention.

FIG. 42 shows the mode of communication between the client 105 and the screen configuration expanding device 103 in the (session 1).

The communication in the (session 1) is represented by reference numerals 4301 to 4304, and the step 3203 and communication 4301, the step 3302 and communication 4302, the step 3405 and communication 4303 and the step 3212 and communication 4304 correspond to one another, respectively.

Next, the operation of the screen configuration expanding device 103 will be explained about the processing continuing the (session 1) by including the explanation of the UI frame generation processing 3404 and the data conversion processing 3210.

When the client 105 receives the screen configuration data 1701 by the (session 1), it analyzes the content and transmits the command requesting the screen configuration data [menu. ui. html] and [menu. p-quick. html] as the two constituent elements of the frame to the screen configuration expanding device 103.

A series of processings from establishment till cutoff of the connection by the two commands transmitted, i.e. [GET menu. ui. html] and [GET menu. p-quick. html], are referred to as (session 2) and (session 3), respectively.

First, the operation of the screen configuration expanding device 103 in the (session 2) will be explained.

After completion of the (session 1), the screen configuration expanding device 103 waits for the connection request from an unspecific client 105 at the step 3102.

The client 105 transmits the command [GET menu. ui. html] to the screen configuration expanding device 103.

Here, the operation of the screen configuration expanding device 103 in the (session 2) is the same as the operation in the (session 1) up to the command analysis processing 3204. Therefore, the operation of the screen configuration expanding device 103 will be explained from the step 3302 of the command analysis processing 3204.

At the step 3302, the screen configuration expanding device 103 receives the command [GET menu. ui. html] from the client 105.

At the step 3303, the screen configuration expanding device 103 extracts the data identifier [.html] and the expander [.ui] from the address [menu. ui. html] contained in the command so received, removes the expander [.ui] from the address to obtain [menu. html] and then transfers the processing to the step 3304.

At the step 3304, the screen configuration expanding device 103 writes the address [menu. html] converted at the step 3303 to the item [address] of the setting table 3801 and transfers the processing to the step 3305.

At the step 3305, the screen configuration expanding device 103 retrieves the entry having [object data expander= .html, expander=.ui] in the processing object table 3901, and transfers the processing to the step 3306 by using the entry 3905 as the result of retrieval.

At the step 3306, the configuration expanding device 103 transfers the processing to the step 3307 as the corresponding entry exists as a retrieval result.

At the step 3307, the contents of the items [classification], [processing content] and [parameter] of the entry 3905 are written into the items [classification], [processing content] and [parameter] of the setting table 3801, respectively, and the processing is transferred to the step 3308.

As a result, the contents of the setting table 3801 become [address=menu. html, classification=generation, processing content=UI frame generation, parameter=nil].

At the step 3308, the screen configuration expanding device 103 finishes the command analysis processing.

The screen configuration expanding device 103 transfers the processing to the step 3205 after the command analysis processing is completed.

Since the result of the step 3205 becomes [YES], the screen configuration expanding device 103 transfers the processing to the reply data generation processing.

Since the result of the step 3402 of the reply data generation processing 3206 is [NO], the screen configuration expanding device 103 transfers the processing to the step 3404.

The detail of the UI frame generation processing 3404 will be hereby explained.

The screen configuration expanding device 103 describes the UI frame on the basis of the UI setting table shown in FIG. 39.

Figure 35:
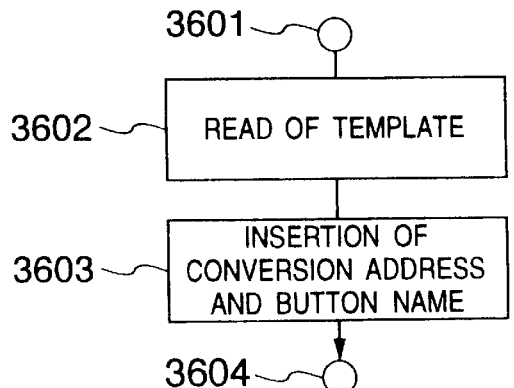
FIG. 35 is a flowchart of UI frame generation.

The screen configuration expanding device 103 executes the UI frame generation processing 3404 in accordance with the flowchart shown in FIG. 35.

In FIG. 35, reference numeral 3601 represents the start of the UI frame generation processing.

First, at the step 3602, the screen configuration expanding device 103 reads the template of the button description as the model of the user interface portion, and then transfers the processing to the step 3603.

Figure 43:
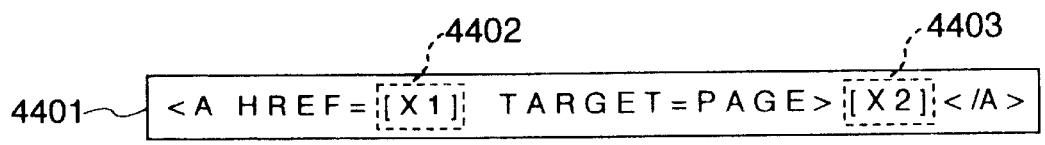
FIG. 43 shows an example of a button template.

FIG. 43 shows an example of the template used in this embodiment.

In FIG. 43, reference numeral 4401 denotes the template and reference numerals 4402 and 4403 denote the blank columns of the template, respectively.

At the step 3603, the screen configuration expanding device 103 generates the screen configuration data of the UI frame on the basis of the UI setting table shown in FIG. 39 and then transfers the processing to the step 3604.

In FIG. 39, reference numeral 4001 denotes the UI setting table, reference numeral 4002 denotes the item name of the UI setting table 4001, and reference numerals 4003 and 4004 denote entries.

At the step 3603, the screen configuration expanding device 103 executes the following processings for the entries of the UI setting table 4001.

First, it inserts the expander registered to the item [insertion expander] of the entry to the content of the item [address] of the setting table 3801 and writes the result into the blank column 4402 of the template 4401.

Next, it writes the content of the item [button name] of the entry into the blank column 4403 of the template 4401.

The template 4401 the blank columns of which are filled is added to the UI frame generation result.

The screen configuration expanding device 103 executes the processing described above for each entry of the UI setting table 4401 and generates the screen configuration data of the UI frame including the number of buttons equal to the number of entries.

At the step 3603, the screen configuration expanding device 103 finishes the UI frame generation processing 3404.

The above explains the operation of the screen configuration expanding device 103 in the UI frame generation processing 3404.

Next, the operation of the UI frame generation processing 3404 in the (session 2) will be explained.

At the step 3602, the screen configuration expanding device 103 read the template 4401.

At the step 3603, the screen configuration expanding device 103 executes the following processings for the two entries of the UI setting table 4001.

First, this device 103 inserts the insertion expander [.p-quick] of the entry 4002 to the content of the address [menu. html] of the setting table 3801 to generate [menu. p-normal. html] and writes it into the blank column 4402.

Next, the screen configuration expanding device 103 inserts the button name [NORMAL] of the entry 4002 to the blank column 4403.

As a result, the blank columns 4402 and 4403 of the template 4401 are filled by the screen configuration expanding device 103, and the template 4401 becomes [<HREF= menu. p-normal. html TARGET=PAGE>NORMAL</A].

The screen configuration expanding device 103 adds this to the screen configuration data generation result by the entry 4002.

Next, the screen configuration expanding device 103 executes the processing similar to the one made for the entry 4002, for the entry 4003 and fills the blank columns 4402 and 4403 of the template 4401 to generate [<HREF=menu. p-quick. html TARGET=PAGE>QUICK</A].

The screen configuration expanding device 103 adds the above to the screen configuration data generation result by the entry 4403.

As a result of the processing described above, the screen configuration expanding device 103 converts 1041 in FIG. 13 to the screen configuration data generated by the UI frame generation processing.

At the next step 3604, the screen configuration expanding device 103 finishes the UI frame generation processing 3404.

The above explains the operation of the UI frame generation processing 3404 in the (session 2).

Next, the screen configuration expanding device 103 transfers the processing to the step 3405.

At this step 3405, the screen configuration expanding device 103 transmits the screen configuration data 1401 to the client 105 and transfers the processing to the step 3406.

At the step 3406, the screen configuration expanding device 103 finishes the reply data generation processing and transfers the processing to the step 3212.

At the step 3212, the screen configuration expanding device 103 cuts off the connection with the client 105 and transfers the processing to the step 3213.

At the step 3213, the screen configuration expanding device 103 finishes the configuration expanding processing 3103 in the (session 2).

Here, FIG. 42 shows the communication sequence between the screen configuration expanding device 103 and the client 105 in the same way as in the (session 1).

In FIG. 42, communication 4305, 4306, 4307 and 4308 are the communications in the (session 2), and the communication 4305 and the step 3203, the communication 4306 and the step 3302, the communication 4307 and the step 3405, and the communication 4308 and the step 3212 correspond to one another, respectively.

Next, the operation of the screen configuration expanding device 103 in the (session 3) will be explained.

After the (session 2) is completed, the screen configuration expanding device 103 waits for the connection request from an unspecific client at the step 3102.

The client 105 transmits the command [GET menu. p-quick. html] to the screen configuration expanding device 103.

Here, the operation of the screen configuration expanding device 103 in the (session 3) till the command analysis processing 3204 is substantially the same as the operation in the (session 1) and its command analysis processing 3204 is substantially the same as that of the (session 1) and the (session 2). Therefore, the detailed explanation will be omitted.

The screen configuration expanding device 103 set the content of the setting table 3801 to [address menu. html, classification=conversion, processing content=configuration description conversion, parameter=.p-quick] by the command analysis processing 3204 on the basis of the address in the command received from the client 105 and the processing object table 3901.

When the command analysis processing 3204 is finished, the screen configuration expanding device 103 transfers the processing to the step 3205.

Since the result of the step 3205 becomes [NO], the screen configuration expanding device 103 transfers the processing to the step 3207.

At the step 3207, the screen configuration expanding device 103 establishes the connection with the server 101 storing [menu. html] designated by the address of the setting table 3801, and transfers the processing to the step 3208.

At the step 3208, the screen configuration expanding device 103 transmits the command [GET menu. html] obtained by replacing the address portion of the command received from the client 105 by the address of the setting table 3801, and then transfers the processing to the step 3209.

At the step 3209, since the processing content of the setting table is [conversion], the screen configuration expanding device 103 sets the evaluation result [processing content=non-conversion] to [NO] and transfers the processing to the step 3210.

The detail of the data conversion processing 3210 will be hereby explained.

The screen configuration expanding device 103 executes the data conversion processing in accordance with the flowchart shown in FIG. 36.

In FIG. 36, reference numeral 3701 represents the start of the data conversion processing 3210.

At the step 3702, the screen configuration expanding device 103 evaluates whether or not the processing content of the setting table 1 is the [image reduction] and if the result is [YES], that is, true, transfers the processing to the step 37076 and if not, to the step 3703.

At the step 3703, the screen configuration expanding device 103 receives the data from the server 101 and transfers the processing to the step 3704.

The data which the screen configuration expanding device 103 receives from the server 101 at this time is the screen configuration data.

For, the processing content of the setting table 3801 at this step 3703 is [configuration description conversion] from the judgement result at the step 3702 and from the content of the setting table 3901 and in this case, the data identifier of the address in the command transmitted to the server 101 should be [.html].

Therefore, the data the server 101 transmits to the screen configuration expanding device 103 becomes the screen configuration data.

At the step 3704, the screen configuration expanding device 103 executes the configuration description conversion processing for the data received from the server 101 and then transfers the processing to the step 3705.

Here, the configuration description conversion processing 3704 will be explained.

The screen configuration expanding device 103 converts the screen configuration data received from the server 101 on the basis of the two tables.

One of them is the conversion rule table shown in FIG. 40 and represents the tag as the conversion object is the screen configuration data and its attribute.

In FIG. 40, reference numeral 4101 denotes the conversion rule table, reference numeral 4202 denotes the item name of this conversion rule table 4101 and reference numerals 4103, 4104 and 4105 denote the entries of the conversion rule table 4101.

The other table is the conversion parameter table shown in FIG. 41. This is used for fitting a concrete expander to the insertion expander as one of the items of the conversion rule table 4101.

In FIG. 41, reference numeral 4201 denotes the conversion parameter table, reference numeral 4202 denotes the item name of the conversion parameter table 4201 and reference numerals 4203 and 4204 denote the entries.

The screen configuration expanding device 103 first searches the entry whose mode content is the same as the parameter of the setting table 3801 in the conversion parameter table 4201, and fits the contents of [P1], [P2] and [P2] of the entry to [P1], [P2] and [P3] of the conversion rule table 4101.

Next, the screen configuration expanding device 103 executes the conversion for the description in which the entry, whose tag, attribute name and data identifier of the address of the attribute value coincide with those of the conversion rule tale 4101 in the screen configuration data received from the server 101, exists, in such a manner as to insert the insertion expander of the corresponding entry into the address.

As described above, the screen configuration expanding device 103 inserts the expander designated by the parameters of the conversion parameter table 4204 and the parameters of the setting table 3801 to all the attribute values of the tags registered to the entry of the conversion rule table 4101 in the screen configuration data received from the server 101 by the configuration description conversion processing 3704.

Next, at the step 3705, the screen configuration expanding device 103 transmits the screen configuration data converted by the configuration description conversion processing to the client with which connection is established at the step 3203, and then transfers the processing to the step 3709.

On the other hand, the screen configuration expanding device 103 receives the data from the server 101 at the step 3706 and transfers the processing to the step 3707.

At the step 3707, the screen configuration expanding device 103 carries out the image reduction processing for the image data it receives from the server 101 in accordance with the parameters of the setting table 3801, and then transfers the processing to the step 3708.

The data the screen configuration device 103 receives is the static image.

At the step 3808, the screen configuration expanding device 103 transmits the image data reduced at the step 3707 to the client which establishes the connection at the step 3203, and then transfers the processing to the step 3709.

At the step 3709, the screen configuration expanding device 103 finishes the data conversion processing.

The above explains the detail of the data conversion processing 3210.

Next, the data conversion processing 3210 of the screen configuration expanding device 103 in the (session 3) will be explained.

Here, the content of the setting table 3801 is [address= menu. html, classification=conversion, processing content= configuration description conversion, parameter=.p-quick].

At the step 3702, since the processing content of the processing table 3801 is [configuration description conversion], the screen configuration expanding device 103 evaluates [processing content=image reduction] for the setting table 3801, sets the result to [NO] and transfers the processing to the step 3703.

At the step 3703, the screen configuration expanding device 103 receives the screen configuration data from the server 101 and transfers the processing to the step 3704.

This data is the data received as the result of transmission of the command [GET menu. html] from the configuration expanding device 103 to the server 101 at the step 3208. Therefore, it becomes the screen configuration data 501.

At the next step 3704, the screen configuration expanding device 103 executes the configuration description conversion processing for the screen configuration data 501 and transfers the processing to the step 3705.

Here, the configuration description conversion processing 3704 of the screen configuration expanding device 103 in the (session 3) will be hereby explained.

First, the screen configuration expanding device 103 selects the entry 4203 of the conversion parameter table 4201 in which the mode of the conversion parameter table 4201 coincides with the content of the parameter of the setting table 3801.

Next, the screen configuration expanding device 103 fits the content of [P1=.quick], [P2=.small], [P3=.small] of the entry 4203 to [P1], [P2] and [P3] of the conversion rule table 4101.

The screen configuration expanding device 103 then converts the screen configuration data 501 in accordance with the conversion rule table 4110.

First, the screen configuration expanding device 103 confirms that the tag name of the description is [IMG], the attribute is [SRC] and the expander of the attribute value is [.gif] and that the description 503 corresponds to the entry 4105 of the conversion rule table in the screen configuration date 501, and converts the attribute value [pictA. gif] of the description 503 to [pictA. small. gif].

Next, the screen configuration expanding device 103 confirms that the tag name of the description 504 is [A], the attribute is [HREF] and the expander of the attribute value is [.gif] and that the description corresponds to the entry 4104 of the conversion table, and then converts the attribute value [pictB. gif] of the description 504 to [pictB. small. gif].

Next, the screen configuration expanding device 103 confirms that the tag name of the description 505 is [A], the attribute is [HREF] and the expander of the attribute value is [.gif] and that the description corresponds to the entry 4104 of the conversion rule table, and then converts the attribute value [pictC. gif] of the description 504 to [pictc. small. gif].

Finally, the screen configuration expanding device 103 confirms that the tag name of the description 506 is [A], the attribute is [HREF] and the expander of the attribute value is [.html] and that the description corresponds to the entry 4103 of the conversion table, and converts the attribute value [next. html] of the description 504 to [next. quick. html].

In this way, the screen configurations expanding device 103 converts the screen configuration data 501 to the screen configuration data 1801.

Next, the screen configuration expanding device 103 transmits the screen configuration data 1801 to the client 105 at the step 3705 and transfers the processing to the step 3709.

At the step 3709, the screen configuration expanding device 103 finishes the data conversion processing 3210.

The above explains the detail of the data conversion processing of the screen configuration expanding device 103 in the (session 3).

Next, at the step 3212, the screen configuration expanding device 103 cuts of the connection between the server 101 and the client 105 and transfers the processing to the step 3213.

At the step 3213, the screen configuration expanding device 103 finishes the configuration expanding device 103 finishes the configuration expanding processing 3103.

The above explains the detail of the configuration expanding processing 103 of the screen configuration expanding device 103 in the (session 3).

Here, FIG. 42 shows the communication sequence between the screen configuration expanding device 103 and the client 105 in the same way as in the (session 1) and the (session 2).

In FIG. 42, the communications 4309, 4310, 4311, 4312, 4313, 4314, 4315 and 4316 are the communications in the (session 3).

The communication 4309 and the step 3203, the communication 4310 and the step 3302, the communication 4311 and the step 3207, the communication 4312 and the step 3208, the communication 4313 and the step 3703 and the communication 4314 and the step 3705 correspond to one another, respectively.

Similarly, the communication 4515 and 4516 correspond to the step 3212.

When the (session 3) is completed, the client 105 receives the screen configuration data 1801.

Then, the client 105 recognizes that the description 802 in the screen configuration data 1801 is the description of the image tag, and transmits the command [GET pictA. small. gif] for acquiring the image data of the address designated by [SRC=] to the screen configuration expanding device 103.

The period in which the client 105 transmits this command, receives finally the data and then cuts off the connection will be referred to as the (session 4).

Hereinafter, the operation of the screen configuration expanding device 103 in this (session 4) will be explained.

The operation of the screen configuration expanding device 103 in the (session 4) is substantially the same as its operation in the (session 3), and the data conversion processing at the step 3210 is a greatly different portion.

The processing up to the step 3210 will be briefly explained by using the communication sequence shown in FIG. 42.

In FIG. 42, the communication 4317, 4318, 4319, 4320, 4321, 4322, 4323 and 4324 are the communications in the (session 4).

First, in the communication 4317, the screen configuration expanding device 103 establishes the connection with the client 105 (step 3203).

Next, in the communication 4318, the screen configuration expanding device 103 receives the command [GET pictA. small. gif] from the client 105 (step 3302).

Further, the screen configuration expanding device 103 sets the content of the setting table 3801 to [address=pictA. gif, classification=conversion, processing content=image reduction, parameter=1/2] by the processing from the step 3303 to the step 3308.

The screen configuration expanding device 103 then establishes the connection with the server 101 by the communication 4319 (step 3207).

Next, the screen configuration device 103 transmits the command [GET pictA. gif], which is generated by changing the command address received from the client 105 to the address of the setting table 3801, to the server 101 by the communication 4320 (step 3208).

Here, the data conversion processing 3210 of the screen configuration expanding device 103 in the (session 4) will be explained.

The screen configuration expanding device 103 confirms that the processing content of the setting table 3801 is [image reduction] at the step 3702, sets the evaluation result to [YES] and transfers the processing to the step 3706.

The screen configuration expanding device 103 receives the image data 603 from the server 101 at the step 3706 (communication 4320) and transfers the processing to the step 3707.

At the step 3707, the screen configuration expanding device 103 executes the image reduction processing of the image data 603 in accordance with the parameter [1/2] of the setting table, converts the image data 603 to the image data 902 and transfers the processing to the step 3708.

The reduction processing can be accomplished by, for example, dividing the pixels of the image data into groups of four adjacent pixels of two pixels by two, selecting one typical pixel of each group and disposing it in accordance with the disposition of each group.

At the step 3708, the screen configuration expanding device 103 transmits the image data 902 to the client 105 (communication 4322) and transfers the processing to the step 3709.

At the step 3709, the screen configuration expanding device 103 finishes the data conversion processing 3210.

The above explains the data conversion processing 3210 of the screen configuration expanding device 103 in the (session 4).

Subsequent processings are substantially the same as those of the (session 3).

The screen configuration expanding device 103 cuts off the connection with the server 101 and the client 105 by the communications 4323 and 4324 (step 3212) and finishes the configuration expanding processing 3103.

The above explains the operation of the screen configuration expanding device 103 in the (session 4).

The client 105 displays the display 1901 on the screen through the processings from the (session 1) to the (session 4).

Here, the operation of the present invention will be explained about the case where the user of the client 105 selects the button 1903.

When the user selects the button 1903, the client 105 transmits the command [GET pictB. small. gif] to the screen configuration expanding device 103.

The operation of the screen configuration expanding device 103 at this time is the same as that in the (session 4).

The screen configuration device 103 receives the image data 702 from the server 101, converts it to the image data 1002 by the data conversion processing, and transmits it to the client 105.

Finally, the screen of the client 105 becomes such as the one represented by 2001.

When the client 105 gains access to the page of the server 101 through the screen configuration expanding device 103, the image data is automatically reduced, transferred and displayed, and when the button for looking up the image is selected, too, the image is automatically reduced, transferred and displayed.

The state where the image data bonded inside the page and the image data looked up by the button are referred to as a [QUICK mode].

The operation of the present invention will be explained about the case where the client user selects the button 1502 from the end state of the (session 4).

When the user selects the button 1502, the client transmits the command [GET menu. p-normal. html] to the screen configuration expanding device 103.

The time from the transmission of the command to cutoff of the connection will be referred to as a (session 5).

The operation of the screen configuration expanding device 103 in this (session 5) is substantially the same as that in the (session 3).

The operation of the screen configuration expanding device 103 in the (session 5) will be briefly explained with reference to the sequence diagram of FIG. 44.

Figure 44:
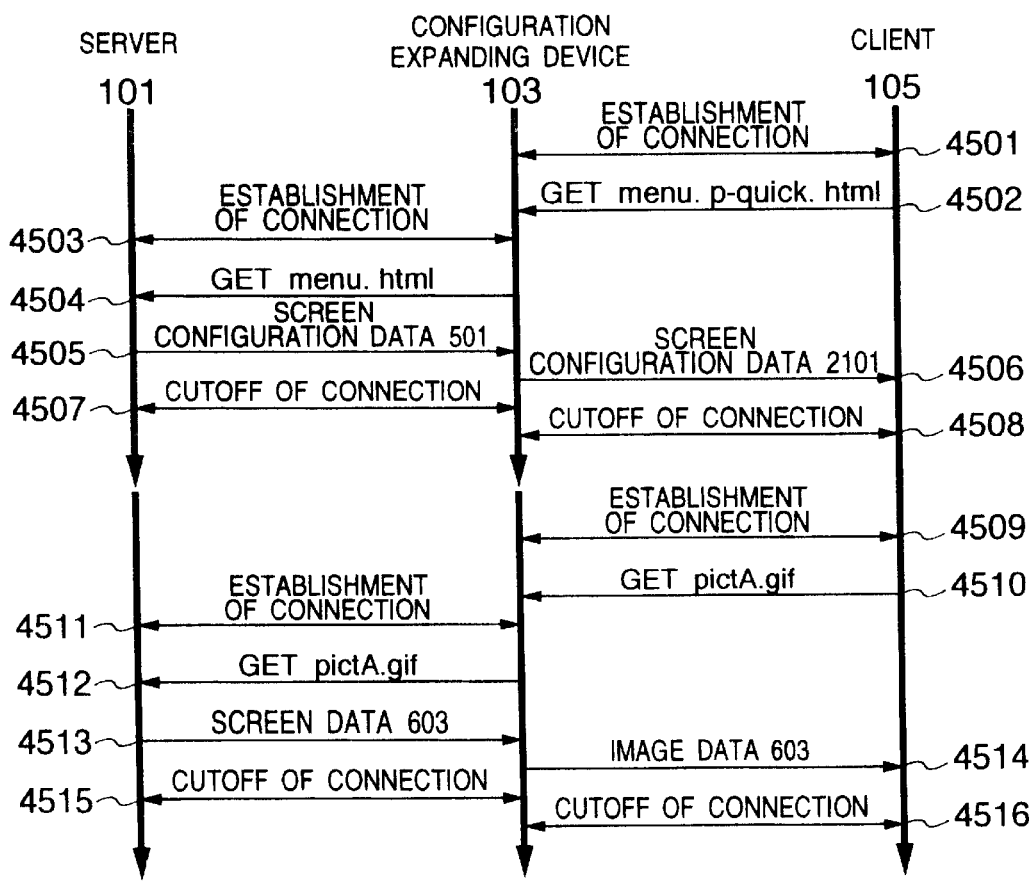
FIG. 44 shows a processing sequence according to the present invention.

In FIG. 44, reference numerals 4501 to 4516 represent the communications among the server 101, the configuration expanding device 103 and the client 105.

In FIG. 44, the communications 4501, 4502, 4503, 4504, 4505, 4506, 4501 and 4508 denote the communications in the (session 65).

First, the screen configuration expanding device 103 establishes the connection with the client 105 by the communication 4501

Next, the device 103 receives the command [GET menu. p-normal. html] from the client 105 by the communication 4502.

The screen configuration expanding device 103 then sets the content of the setting table 3801 to [address=menu. html, classification=conversion, processing content=configuration description conversion, parameter=.p-normal] by the command analysis processing 3204.

This content is different from the content of the setting table 3801 after completion of the command analysis processing 3204 in the (session 3) only in the point [parameter= .p-quick].

Next, the screen configuration expanding device 103 transmits the command [GET menu. html] to the server 101 by the communication 4503.

The device 103 then receives the screen configuration data 501 from the server 101 by the communication 4505.

The screen configuration expanding device 103 converts the screen configuration data 501 by the configuration description conversion processing 3704.

Since the parameter of the setting table 3801 is [.p-normal] in this instance, the screen configuration expanding device 103 writes the contents of [[P1]=normal, [P2]=nil and [P3]=nil]] of the table 4201 of the conversion parameter table 4201 into the content of [P1], [P2] and [P3] of the conversion rule table 4101.

Here, "insertion expander=nil" in the conversion rule table 4101 means that conversion is not made.

Therefore, the screen configuration expanding device 103 executes conversion of the screen configuration data 501 in accordance with only the rule of the entry 4103.

In other words, the screen configuration expanding device 103 inserts the expander [.normal] to the address of the description having [tag name=A, attribute=HREF, data identifier of address=.html].

In the screen configuration data 501, it is only the description 506 that becomes the object of conversion described above. Therefore, the screen configuration expanding device 103 finally converts the screen configuration data 501 to the screen configuration data 2101.

The screen configuration expanding device 103 then transmits the screen configuration data 2101 to the client 105 by the communication 4506.

Next, in the communications 4507 and 4508, the screen configuration expanding device 103 cuts off the connection with the server 101 and the client 105, and finishes the processing.

The above explains the operation of the screen configuration expanding device 103 in the (session 5).

In the (session 5), the client 105 receives the screen configuration data 2101, analyzes its content, recognizes the image tag description 503 and transmits the command {GET pictA. gif] to the screen configuration expanding device 103.

The period from transmission of this command to cutoff of the connection will be referred to as a (session 6).

Hereinafter, the operation of the screen configuration expanding device 103 in this (session 6) will be explained briefly with reference to the sequence diagram of FIG. 44 in the same way as in the (session 5).

In FIG. 44, communications 4509, 4510, 4511, 4512, 4513, 4514, 4515 and 4516 are the communications in this (session 6).

The operation of the screen configuration expanding device 103 in the (session 6) is substantially the same as its operation in the (session 4) up to the step 3208.

First, the screen configuration expanding device 103 establishes the connection with the client 105 by the communication 4509.

Next, the screen configuration expanding device 103 receives the command [GET pictA. gif] from the client 105 by the communication 4510.

The screen configuration expanding device 103 sets the content of the setting table 3801 to [address=pictA. gif, classification=conversion, processing content=non-conversion, parameter=nil].

Next, the screen configuration expanding device 103 establishes the connection with the server 101 (step 3207).

Next, the screen configuration expanding device 103 transmits the command [GET pictA.gif] to the server 101 (step 3208).

Because the processing content of the setting table 3801 is "non-conversion", the screen configuration expanding device 103 sets the evaluation result to [YES] at the step 3209 and transfers the processing to the step 3211.

At the step 3211, the screen configuration expanding device 103 receives the image data 603 from the server 10 (communication 4513), transmits it to the client 105 without conversion (communication 4514) and transfers the processing to the step 3212.

At the step 3212, the configuration expanding device 103 cuts off the connection with the server 101 and the client 105 (communications 4515 and 4516) and transfers the processing to the step 3213.

At the step 3213, the expanding device 103 finishes the configuration expanding processing 3103.

The above explains the operation of the screen configuration expanding device 103 in the (session 6).

The client 105 receives the screen configuration data 2101 and the image data 603 in the (session 5) and (session 6) and executes the screen display 2201.

As described above, when the user of the client 105 selects the [NORMAL] button of the frame 1501 on the screen 1901, the image in the page is transferred and displayed in the size of the original, and when the user selects the image lookup button, the image of the original is displayed.

The mode in which the image data in the page or the image data looked up by the button is displayed in the original size will be referred to as the [NORMAL mode].

Here, the operation of the present invention will be explained about the case where the user of the client 105 selects the button 604 of the screen 2201 after completion of the (session 6).

When the user selects the button 604, the client 105 transmits the command [GET pictB. gif] to the screen configuration expanding device 103.

The operation of this expanding device 103 at this time is the same as its operation in the (session 6).

The screen configuration expanding device 103 receives the image data 702 from the server 101 and transmits it to the client 105 without executing data conversion.

Finally, the screen of the client 105 becomes such as the one shown in FIG. 22.

As described above, the client 105 can receive the image data in the size of the original by selecting the button 1502 on the screen 1901.

When the user of the client 105 selects the button 1503 of the screen 2201, the client 105 transmits the command [GET menu. p-quick html] to the screen configuration expanding device 103.

In this case, since the expander of the entry 3904 of the processing object table 3901 is [nil/quick], the operation of the screen configuration expanding device 103 is exactly the same as when the client 105 transmits the command [GET menu. html], that is, its operation in the (session 3).

In this case, therefore, the screen configuration expanding device 105 executes the same processing as in the (session 3) and (session 4), and the screen display of the client 103 becomes such as the one represented by 1901.

As described above, the user of the client 105 can select the size of the image for a certain page by selecting the buttons [QUICK] and [NORMAL] at the upper portion of the screen.

Next, the operation when the user of the client 105 selects the button [to next page] for each of the screen 1901 after completion of the (session 4) and the screen 2201 after completion of the (session 6) will be explained.

First, the operation of the configuration expanding device 103 when the user of the client 105 selects the button 1905 on the screen 1901 after completion of the (session 4) will be explained.

At this time, the client 105 transmits the command [GET next. quick. html] to the screen configuration expanding device 103.

The operation of the configuration expanding device 103 in this case is substantially the same as its operation in the (session 1) to (session 3), and the difference exists in only that the screen configuration data changes from [menu. html] to [next. html].

Therefore, the UI frame inclusive of the button for changing over the mode is displayed finally at the upper portion of the screen of the client 105 in the same way as the screen 1901, and the page of the [QUICK mode] which is obtained by converting the screen configuration data of the address [next. html] of the server 101 by the screen configuration expanding device 103 in the same way as in the (session 3) by the configuration description conversion processing is displayed at the lower portion of the screen.

The operation of the screen configuration expanding device 103 when the user of the client 105 selects the button 2203 on the screen 2201 after completion of the (session 6) will be explained.

At this time, the client 105 transmits the command [GET next. normal. html] to the screen configuration expanding device 103.

The operation of the screen configuration expanding device 103 at this time is substantially the same as its operation in the (session 1), (session 2) and (session 5). In the (session 1), the parameter of the configuration expanded frame generation changes from [.p-quick] to [.p-normal], and the screen configuration data as the object changes from [menu. html] to [next. html] in each of these sessions.

Therefore, the UI frame inclusive of the button for changing over the mode is finally displayed at the upper portion of the screen of the client 105 in the same way as the screen 2201, and the page of [NORMAL mode] obtained by converting the screen configuration data of the address [next. html] of the server 101 by the screen configuration expanding device 103 by the configuration description conversion processing is displayed at the lower portion of the screen.

When the client 105 gains access to the page of the server 101 through the configuration expanding device 103 or to a certain page in the [QUICK] mode or to other pages by selecting the button through the screen configuration expanding device 103, the page, too, is displayed in the [QUICK mode]. When the first mode is the [NORMAL mode], the next page, too, becomes the [NORMAL] mode.

In other words, all of the server 101, the screen configuration expanding device 103 and the client 105 can keep the mode for a series of the operations by the user without having specific information for retaining the mode.

This mode can be changed over at any time by the button of the UI frame displayed always at the upper portion of the screen.

The above explains the operation of the screen configuration expanding device 103 in this embodiment.

According to this embodiment, the user of the client 105 can change over either of the [QUICK mode] for displaying the image size by reducing its display size and the

[NORMAL mode] capable of looking up the image of the original, though a longer time is necessary till display, whenever necessary, by the configuration expanding device 103 when the user gains access to an arbitrary page.

Particularly because the screen configuration expanding device 103 need not insert a specific button into the page of the original for the data converting device 401, disturbance of layout due to the insertion of the button into the page does not occur.

This effect of the present invention becomes greater when the number of buttons increases such as when the kind of the reduction of the size increases.

For example, the kind of image size reduction includes the reduction at 1/4 in length and width and 1/8 in length and width besides 1/2, and the explanation will be given on the case where the user can select the reduction ratio.

The data converting device 401 must prepare the buttons for selecting the reduction ratios so increased.

In other words, the data converting device 401 must insert the extra buttons such as [tiny] for the 1/8 reduction in length and width and [bit] for the 1/8 reduction in length and width in addition to the button [small] for the screen configuration data of the page.

When these three kinds of buttons are inserted for each button for gaining access to the image data, layout is markedly disturbed, the occupying ratio of the buttons for selecting the reduction ratios becomes greater on the screen, and the information amount per display area of the screen drops, too.

In contrast, even when the number of alternatives for selecting the image reduction ratios is increased in the screen configuration expanding device 103 as described above, the button to be increased is only the button for changing over the mode in the UI frame, and the buttons need not be inserted into the page to which the user gains access. Therefore, display of the page is not affected even when the number of kinds of image reduction is increased.

When the data converting device 401 is utilized in place of the screen configuration expanding device 103 and when the client makes access to a new page, the image data buried into the page is always reduced in size.

When the data converting device 401 is utilized, the user must select whether or not the data to be accessed next is the data of the reduced mode, but when the screen configuration expanding device 103 is utilized, the user can gain access to the image having a desired size by only the normal button selecting operation once the mode is set. In other words, the user need not confirm whether the data is the original data or the reduced image whenever he gains access to new data.

Further, it is possible to incorporate Japanese-to-English translation processing, data amount reduction processing of moving image data and data amount reduction processing of speech data into the screen configuration expanding device 103 of this embodiment, and in such a case, it is necessary to assemble the conversion processing and to change the contents of various tables and templates.

The following modifications can be made for the screen configuration expanding device 103.

(Modification 81): A thumb nail button generation processing is added afresh to the reply data generation processing of the screen configuration expanding device 103.

The thumb nail button generation processing will be explained later.

(Modification 82): The processing object table 3901 used by the configuration expanding device 103 is changed to the processing object table 4601 shown in FIG. 45.

In FIG. 45, reference numeral 4601 denotes the processing object table and reference numerals 4601 and 4602 denote the entries.

As can be appreciated by comparing FIG. 45 with FIG. 38, the processing object table 4601 corresponds to the case where the entry 4602 is added to the processing object table 3901.

As a result of the change of the processing object table, a new expander [. thumb] and [thumb nail button generation] as its processing content are registered.

(Modification 83): The conversion table which the screen configuration expanding table 103 uses in the configuration description conversion processing 3704 is changed from 4201 to 4701 as shown in FIG. 46.

In FIG. 46, reference numeral 4701 denotes a conversion parameter table and 4702 denotes an entry.

The conversion parameter table 4701 is the one obtained by changing the entry 4203 of the conversion parameter table 4201 to the entry 4702.

The particular difference between the entry 4203 and the entry 4702 is that the item [P2] is changed from [.small] to [.thumb].

Due to this change, the screen configuration expanding device 103 displays the thumb nail button but not the reduced image when the user of the client 105 selects the button for looking up the image data in the [QUICK mode].

The term "thumb nail button" represents the button for looking up a certain image and a button as a reduced image of the former.

The above explains the modification of the seventh embodiment of the present invention.

Next, the operation of the screen configuration expanding device 103 in this embodiment will be explained.

The explanation will be given from the state where the client 105 transmits the command [GET menu. html] in the same way as in the seventh embodiment.

When the client 105 transmits the command [GET menu. html] in this embodiment, the screen of the client 105 becomes the one represented by 2601, and the operation of the configuration expanding device 103 up to this stage is substantially the same as its operation in the (session 1) to the (session 4). The difference lies only in a part of the processing of the portion corresponding to the (session 3).

Therefore, the third session among the four sessions generated by the transmission of the command [GET menu. html] by the client 105 in this embodiment will be referred to as the (session 7), and the operation of the screen configuration expanding device 103 in this (session 7) will be explained.

Next, the screen configuration expanding device 103 in this (session 7) will be explained.

The concrete operation of the screen configuration expanding device 103 in this embodiment is substantially the same as its operation in the (session 3).

In the (session 3) of the former embodiment, the screen configuration expanding device 103 receives the screen configuration data 501 of the address [menu. html] from the server 101 for the command [menu. p-quick. html] transmitted by the client 105, converts this data 501 to the screen configuration data 1801 and transfers it to the client 105.

In the (session 7), the screen configuration expanding device 103 receives the configuration data 501 from the server 101 for the command [menu. p-quick. html] transmitted from the client 105, converts the data 501 to the screen configuration data 4801 shown in FIG. 47 and transfers it to the client 105.

In FIG. 47, reference numeral 4801 denotes the screen configuration data and 4802 and 4803 denote the anchor tag descriptions for causing the client to display the buttons.

The screen configuration data 4801 is different from the screen configuration data 1801 in that the anchor tag descriptions 1802 and 1803 are changed to the anchor tag descriptions 4802 and 4803.

The screen configuration expanding device 103 executes the conversion of the configuration data by the configuration description conversion processing 3704, and the difference of the conversion result results from the change of the conversion parameter table by (Modification 82).

In the (session 7), the content of the setting table is [address=menu. html, classification=conversion, processing content–configuration description conversion, parameter= .p-quick] in the same way as in the (session 3). Therefore, the selected entry in the conversion parameter table 4701 used in this embodiment is the entry 4702.

The screen configuration expanding device 103 writes the content of [P1], [P2] and [P3] of the entry 4702 into the parameters p{1], [P2] and [P3] of the conversion rule table 4101 and uses them as the conversion rule of the screen configuration data.

In the (session 7), the value of [P2] is different from that of the (session 3), and [P2]=[.thumb].

The item [P2] of the conversion parameter table represents the expander to be inserted into the address of the HREF attribute of the anchor tag. Therefore, the screen configuration expanding device 103 inserts [.thumb] into the address of the corresponding anchor tag.

In consequence, the screen configuration expanding device 103 converts the anchor descriptions 504 and 505 of the screen configuration data 501 to the anchor descriptions 4803 and 4803, respectively, by the configuration description conversion processing 3704.

As described above, in the (session 7), the screen configuration expanding device 103 converts the screen configuration data 501 o the screen configuration data 4801 and transmits this data to the client 105.

The above explains the operation of the screen configuration expanding device 103 in the (session 7).

Thereafter, the client 105 receives the screen configuration data 4801, analyzes its content, detects the image tag description 802 and transmits the command [pictA. small. gif] to the screen configuration expanding device 103. The operation of this device 103 at this time is the same as its operation in (session 7) in the seventh embodiment.

After the processing described above is completed, the client 105 finally displays the screen 2201.

Here, the appearance on the screen is entirely the same as that in the seventh embodiment but in this embodiment, the result when the user of the client 105 selects the buttons 1903 and 1904 is different from that of the seventh embodiment.

Here, the operation of the screen configuration expanding device 103 when the user of the client 105 selects the button 1903 will be explained.

When the user of the client 105 selects the button 1903, the client 105 establishes the connection with the screen configuration expanding device 103 so as to transmit the command [GET pictB. thumb. gif].

The time from the establishment of the connection till its cutoff will be referred to as a (session 8).

The basic flow of the screen configuration expanding device 103 in this (session 8) is substantially the same as that of the (session 1) and the (session 2).

In the (session 8), the screen configuration expanding device 103 is not connected t the server but generates the data and replies it to the client 105 in the same way as in the (session 1) and the (session 2).

Hereinafter, the operation of the screen configuration expanding device 103 in the (session 8) will be explained by picking up some steps as the essential points.

At the step 3203, the screen configuration expanding device 103 establishes the connection with the client 105.

Next, the screen configuration expanding device 103 receives the command [GET pictB. thumb. gif] from the client 105 in the command analysis processing at the step 3204.

Because the object identifier of the address of the command described above is [.gif] and its expander is [.thumb], the screen configuration expanding device 103 detects the entry 4602 of the processing object table 4601 in the command analysis processing 3204 and sets the content of the setting table 3801 to [address=pictB. gif, classification= generation, processing content=thumb nail button generation, parameter=nil].

At the step 3205, the screen configuration expanding device 103 confirms that the processing content of the setting table 3801 is [generation] and transfers the processing to the replay data generation processing of the step 3206.

Here, the operation of the replay data generation processing 3206 in this embodiment will be explained.

Figure 48:
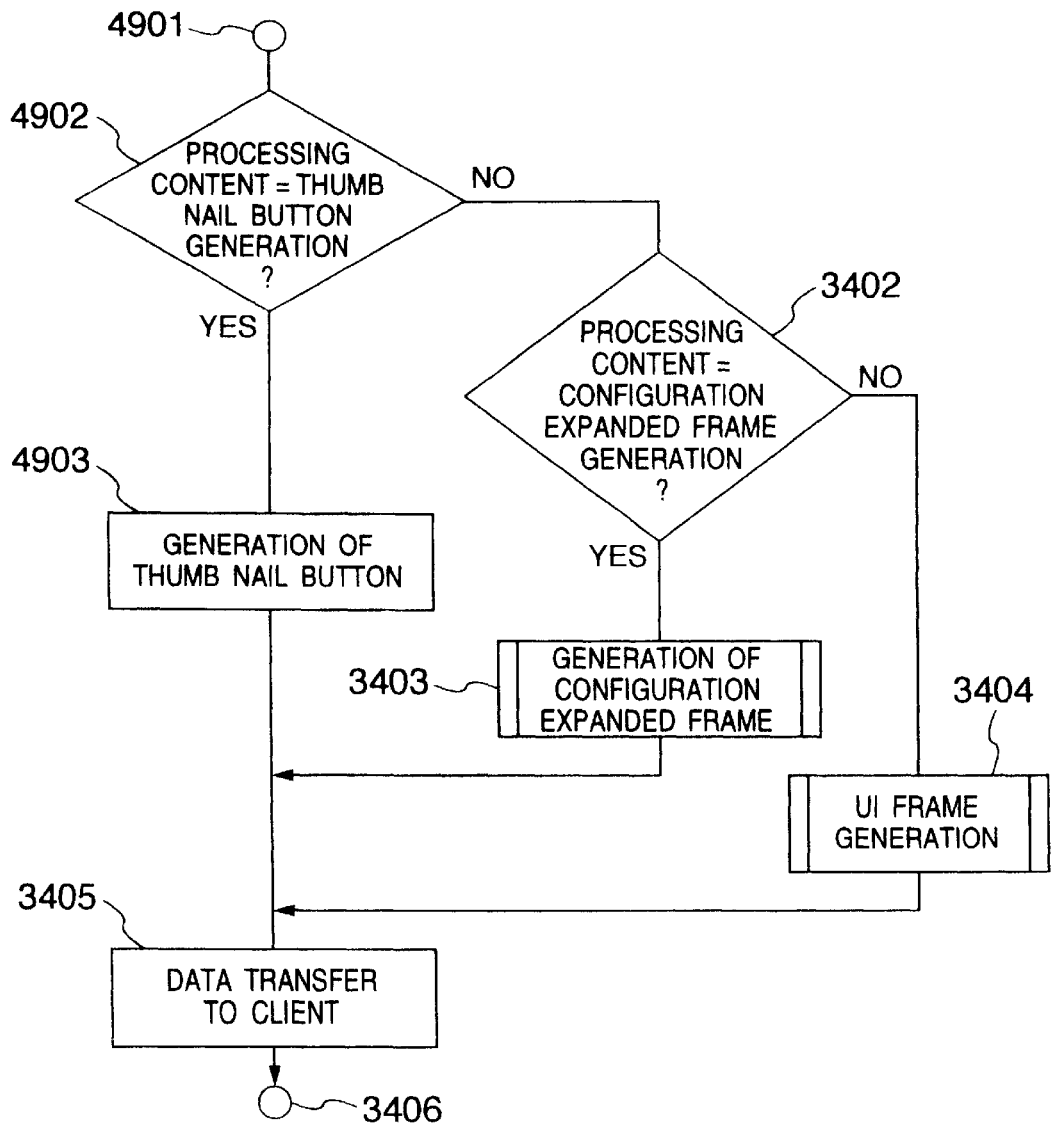
FIG. 48 is a flowchart of a response data generation processing.

Due to the (Modification 81), the [thumb nail button generation processing] is added to the replay data generation processing in this embodiment, and the screen configuration expanding device 103 executes the processing in accordance with the flowchart shown in FIG. 48.

In the flowchart of FIG. 48, the step 4902 is added before the step 3402 of the flowchart of FIG. 33 and the step 4903 is added further to one of the branches of the step 4902.

In FIG. 48, the step 4901 represents the start of the replay data generation processing of the configuration expanding device 103 in this embodiment, and the expanding device 103 transfers the processing to the step 4902.

At the step 4902, the configuration expanding device 103 checks whether or not the processing content of the setting table 3801 is the [thumb nail button processing] and if this result is [YES], that is, true, the processing is transferred to the step 4903 and if not, to the step 3402.

At the step 4903, the configuration expanding device 103 executes the thumb nail button generation processing, and transfers the processing to the step 3405.

The detail of the thumb nail generation processing will be described later.

Other steps in FIG. 48 are the same as those explained in the former embodiment.

The above explains the replay data generation processing 3206 of the configuration expanding device 103.

Next, the detail of the thumb nail button generation processing 5903 will be explained.

In this thumb nail button generation processing, the screen configuration expanding device 103 generates the screen configuration data for display in the thumb nail button of the image data represented by the address of the setting table 3801 on the client 105.

In the thumb nail button generation processing, the screen configuration expanding device 103 generates the screen configuration data of the thumb nail button by using the thumb nail template shown in FIG. 49.

In FIG. 49, reference numeral 5001 denote the thumb nail template and 5002 and 5003 denote the blank columns.

The screen configuration expanding device 103 first writes the content of the address of the setting table 3801 into the blank column 5002.

Next, the screen configuration expanding device 103 inserts the expander [.small] into the address of the setting table 3801 and writes it into the blank column 5003 of the setting table.

The screen configuration expanding device 103 writes the address into the two blank columns 5002 and 5003 of the thumb nail template 5001 as described above, and generates the screen configuration data of the thumb nail button.

The above explains the detail of the thumb nail button generation processing.

Here, the processing of the replay data generation processing 3206 in the (session 8) inclusive of the processing in the thumb nail generation processing 4903 will be explained.

First, the screen configuration expanding device 103 starts the relay data generation processing 3206 at the step 4901 and transfers the processing to the step 4902.

At the step 4902, the screen configuration expanding device 103 confirms that the processing content of the setting table 3801 is the thumb nail button generation, sets the evaluation result to [YES] and transfers the processing to the step 4903.

In the thumb nail button generation process of the step 4903, the screen configuration expanding device 103 first reads the thumb nail template 5001.

Next, the screen configuration expanding device 103 writes the address [pictB. gif] of the setting table 3801 into the blank column 5002 and further writes the address generated by inserting the expander [.small] into this address into the blank column 5003.

As described above, the screen configuration expanding device 103 generates the screen configuration data of the thumb nail button shown in FIG. 50 on the basis of the template 5001 in the thumb nail generation processing 4903.

In FIG. 50, reference numeral 5101 denotes the screen configuration data of the thumb nail button and reference numeral 5102 denotes the anchor tag description inclusive of the image tag.

The screen configuration expanding device 103 finishes the thumb nail button generation processing and transfers the processing to the step 3405.

At the step 3405, the screen configuration expanding device 103 transmits the screen configuration data 5101 to the client 105.

At the step 3406, the screen configuration. expanding device 103 finishes the replay data generation processing 4901.

The above explains the conversion data generation processing 4901 of the screen configuration expanding device 103 in the (session 8).

The subsequent operations of the screen configuration expanding device 103 are the same as those of the (session 1) and the (session 2).

At the step 3212, the screen configuration expanding device 103 cuts off the connection with the client 105 and at the step 3213, it finishes the configuration expanding processing 3103.

The above explains the operation of the screen configuration expanding device 103 in the (session 8).

By the (session 8), the client 105 receives the screen configuration data 5101 from the screen configuration expanding device 103, analyzes its content and transmits the command [GET pictB. small. gif] to the screen configuration expanding device 103 from the description of the image tag in the description 5102. The operation at this time is entirely the same as when the user pushes the button 1903 immediately after the (session 4) in the seventh embodiment, and the client 105 finally receives the image data 1002.

The client 105 receives the image data 1003 and finally displays 2601 of FIG. 25 on the screen.

Reference numeral 2604 denotes the image data 1002. It is also the button that transmits the command [GET pict. gif].

Here, when the user of the client 105 selects the button 2604, the client 105 transmits the command [GET pict. gif] to the screen configuration expanding device 103.

The operation of the screen configuration expanding device 103 in this case is the same as its operation when the user of the client 105 selects the button 604 of the screen 2201 after completion of the (session 6) in the former embodiment, and the client 105 finally displays the screen 2301.

The above explains the operation of the screen configuration expanding device 103 in this embodiment.

Next, the effect of the present invention in this embodiment will be explained.

First, the effect of the present invention will be explained about the case where the user gains access to the page of the screen 1901 and selects the button 1903, by way of example.

When the button 1903 is selected in the seventh embodiment as described above, the client 105 displays the screen 2001.

In this case, when the user of the client 105 desires to gain access to the original image of the image 1002 in order to examine it in further detail, the user first returns to the screen 1901, selects the button 1502, changes the mode to the [NORMAL mode], then shifts to the screen 2201, selects further the button 604 and then shifts to the screen 2301. In this way, the user can view the image data 702 as the original of the image data 1002.

In contrast, if the user of the client 105 desires to view the image data 702 as the original of the image data 1002 after looking up this image data 1002, it is necessary for the user in this embodiment to first select the button 1903, then to shift to the screen 2601 to view the image data 1002, to further select the button 2604 to switch the screen to 2301, and to watch the image data 2702.

This difference will be compared in the number of operations of the button selection by the user from watching the image 1002 to watching the image 702. The number of operations is three in the former case whereas it is one in the embodiment of the present invention. It can be thus appreciated that this embodiment can reduce the operation amount to 1/3.

This embodiment accomplishes a natural interface such that in the practical operation, the original image can be viewed by selecting the reduced image.

Though the effect of the present invention is explained above about the reduction of the static image in this embodiment by way of example, this embodiment can provide preview buttons for enabling the user of the client 105 to look up the original data for various data.

For instance, when the moving image data is placed on the server 101 and the screen configuration expanding device 103 has the "function of covering the first one frame of the moving image data to the static image data", the present invention can offer a [first one frame image of moving image data] button to the user of the client 105. Accordingly, the user can easily gain access to the moving image data, whenever necessary, while watching the static image data as the aid of the content confirmation without effecting the transfer and display of large amounts of moving image data, which call for a long time.

As described above, the present invention can improve retrieval efficiency when large amounts of data, which need a long time for transfer and display, are retrieved.

In the embodiment described above, it is possible to display a [button for listing a plurality of image data capable of starting reference from a certain page] on the client 105. (Modification 91): The UI setting table 4001 is changed as shown in FIG. 51. In FIG. 51, reference numeral 5201 denotes the UI setting table and reference numeral 5202 denotes the entry. The UI setting table 4001 corresponds to the table obtained by adding the entry 5202 to the UI setting table 4001.

Owing to this modification, the screen configuration expanding device 103 adds the button having the name [list] when the UI name is generated in the UI frame generation processing 3404.

(Modification 92): [List page conversion processing] is added to the data conversion processing 3210.

The term [list page conversion processing] means the processing which generates the list of the thumb nail buttons of all the image data that are looked up by the button for the screen configuration data of an arbitrary page from that page. The detail of this processing will be described later.

When the processing content of the setting table 3801 is the [list page conversion] in the data conversion processing 3210, the screen configuration expanding device 103 executes the list page conversion processing, and when the processing content is [image reduction], it executes the image reduction processing 3707, and executes the configuration description conversion processing 3704 at other times.

In the data conversion processing 3210, the screen configuration expanding device 103 receives the data from the server 101 before each conversion processing and transmits the data to the client 105 after the conversion processing, in the same way as in the seventh embodiment.

(Modification 93): The processing object table 3901 is changed as shown in FIG. 52.

In FIG. 52, reference numeral 5301 denotes the processing object table and reference numerals 5302 and 5303 denote the entry. The processing object table 5301 corresponds to the table that is generated by adding the. entries 5302 and 5303 to the processing object table 3901.

Owing to the addition of the entry 5302, the screen configuration expanding device 103 provides the image reduction function of 1/4 in length and width to the client.

When the client 105 insets [.tiny] into the address of the image data and transmits the command to the screen configuration expanding device 103, the screen configuration expanding device 103 executes the image reduction processing 3707 in the same way as in the (session 7) of the former embodiment but because the parameter at this time is [1/4], it reduces the data received from the server 101 to 1/4 in length and width and transmits it to the client 105.

When [.list] is inserted into the address of the screen configuration data of the command received from the client 105 due to the addition of the entry 5305, the screen configuration expanding device 103 executes the list page conversion processing for the screen configuration data received from the server 101 and then transmits it to the client 105.

The above explains the change point of this embodiment with respect to the former embodiment.

The operation of the screen configuration expanding device 103 when the client 105 transmits the command [GET menu. html] in this embodiment is substantially the same as its operation in the seventh embodiment.

Figure 53:
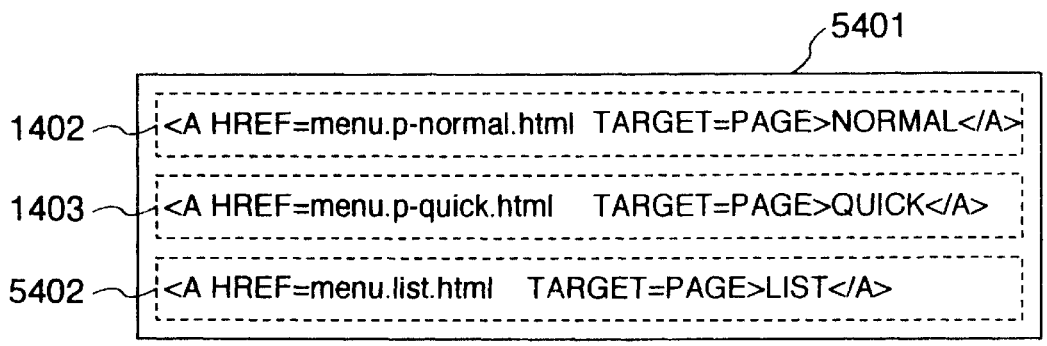
FIG. 53 shows an example of screen configuration data.

The difference of this embodiment from the former embodiment resides in that in the (session 2) of the seventh embodiment, the screen configuration data 1401 is generated for the command [GET menu. ui. html] of the client 105 and is transmitted to the client 105 in the (session 2) of the seventh embodiment whereas in this embodiment, the screen configuration data shown in FIG. 53 is generated.

In FIG. 53, reference numeral 5401 denotes the screen configuration data and reference numeral 5402 denotes the another tag description.

In the UI frame generation processing 3404, the screen configuration expanding device 103 generates the descriptions of the anchor tags, that is, the buttons, in the same number as the number of entries of the UI setting table 5201.

The screen configuration expanding device 103 generates the screen configuration data 5201 of the UI frame by generating the content of the entry 5202 as the anchor tag description 5402 in addition to the case of the former embodiment.

In this session, the client 105 finally receives the screen configuration data 5201.

The subsequent operations are exactly the same as the operations from the (session 3) to the (session 4)in the former embodiment, and the client 105 finally displays the screen 2701.

Here, the operation when the user of the client 105 pushes buttons other than the button 2703 is 5he same way as the state of the screen 1901 in the seventh embodiment.

When the user of the client 105 selects the button 2703 in the screen 1903, the client 105 transmits the command [GET menu. list. html] to the screen configuration expanding device 103.

The time from the transmission of this command till cutoff of the connection between the client 105 and the screen configuration expanding device 103 will be hereinafter called he (session 9).

The operation of the screen configuration expanding device in the (session 9) is substantially the same as the (session 3) in the former embodiment but is different in that it executes the list page conversion processing but not the configuration description conversion processing 3704 for the screen configuration data 501 received from the server 101.

The screen configuration expanding device 103 looks up the entries 5303 of the processing object table and sets the content of the setting table 3801 to [address=menu. html, classification=conversion, processing content=list page conversion, parameter=nil].

Due to this setting, the screen configuration expanding device 103 converts the image configuration data 501 received from the server 101 by the list page conversion processing and sends it to the client 105.

Here, the detail of the list page conversion processing by the screen configuration expanding device 103 in this embodiment will be explained.

Figure 54:
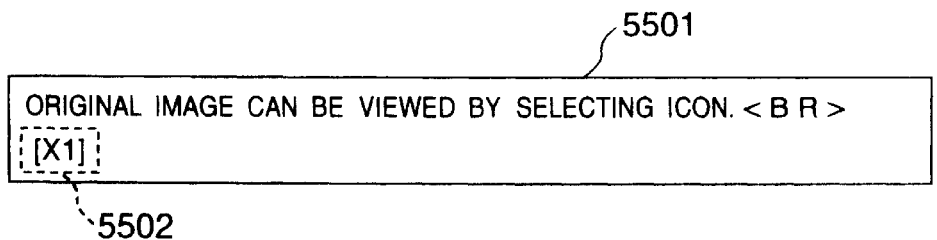
FIG. 54 shows an example of a list page template.

The screen configuration expanding device 103 first reads the template as the original of the screen configuration data of the list page shown in FIG. 54.

In FIG. 54, reference numeral 5501 denotes the template of the image configuration data and reference numeral 5502 denotes the blank column.

Figure 55:
FIG. 55 shows an example of a thumb nail template.

Next, the screen configuration expanding device 103 reads the template as the original of the screen configuration data of the thumb nail button shown in FIG. 55.

In FIG. 55, reference numeral 5601 denotes the template of the screen configuration data and reference numerals 5602 and 5603 denote the blank columns.

When the two blank columns 5602 and 5603 are filled, the template 5601 turns to the anchor tag description of the thumb nail button in the same way as the template 5001 in the former embodiment.

The screen configuration expanding device 103 analyzes the screen configuration data received from the server 101, detects the anchor tag having the data identifier [.gif] for the address designated by [HREF] and executes the following processing for all such anchor tags.

The screen configuration expanding device 103 writes the address of the anchor tag so detected into the blank column

5602, writes the address generated by inserting the expander [.tiny] to the same address into the blank column 5603 and further writes the template 5601 having the buried blanks 5602 and 5603 into the blank column 5502.

The screen configuration expanding device 103 repeats the operation described above and generates the list of the thumb nail buttons of the data to be looked up in the anchor tag for looking up the image of the screen configuration data received from the server 101, that is, the screen configuration data of the list page.

In the (session 9), the screen configuration expanding device 103 receives the screen configuration data 501 received from the server 101.

Figure 56:
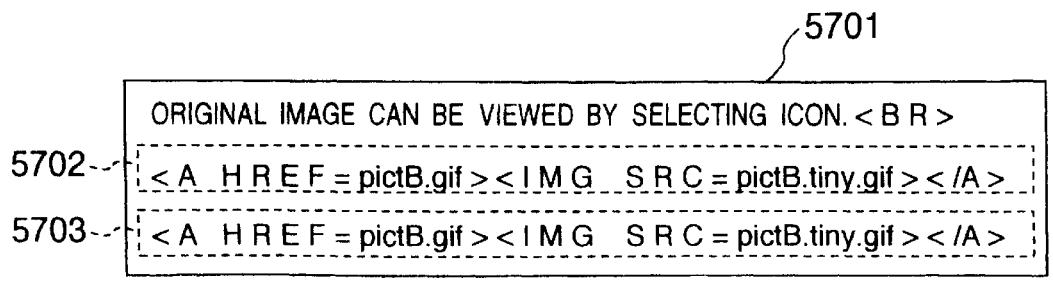
FIG. 56 shows an example of thumb nail button screen configuration data.

Since the screen configuration data 501 contains the anchor tag descriptions 504 and 505 for looking up the image, the screen configuration expanding device 103 converts the screen configuration data 501 to the screen configuration data shown in FIG. 56 by the list page conversion processing described above.

In FIG. 56, reference numeral 5701 denotes the screen configuration data and reference numerals 5702 and 5703 denote the anchor tag descriptions of the thumb nail button.

The screen configuration expanding device 103 transmits the screen configuration data 5701 to the client 105, cuts off the connection with the server 101 and the server 101 and the client 105, and finishes the configuration expanding processing.

The above explains the operation of the screen configuration expanding device 103 in the (session 9).

The client 105 receives the screen configuration data 5701 by the (session 9), analyzes its content, transmits the two commands [GET pictB. tiny. gif] and [GET pictC. tiny. gif], and receives pictB. gif, that is, the image obtained by reducing the image data 702 to 1/4 in length and width, and the image obtained by reducing pictC. gif to 1/4 in length and width as the respective results.

The client 105 displays the screen 2801 on the basis of these received data.

In FIG. 27, reference numeral 2802 denotes the display result of the screen configuration data 5701 and reference numeral 2804 denotes the image generated by reducing the image data 702 to 1/4 in length and width and it is also a button for looking up the image data 702.

Similarly, reference numeral 2805 denotes the image generated by reducing the image data of the address pictC. gif to 1/4 in length and width, and its also a button for looking up pict.C.gif.

The user of the client 105 can look up the respective original images by selecting the buttons 2804 and 2805.

As described above, this embodiment provides the [list] button for watching the list page aligning the reduced images of the image data which can be looked up directly from the page displayed at present.

According to this embodiment, the user of the client 105 can confirm the content of the image directly looked up from an arbitrary page by pushing once the [list] button.

To represent its concrete example, the case where the present invention is not employed, the former embodiment and this embodiment will be compared with one another about the case where the user compares the images that can be looked up by the button from the page to which he first makes access and looks up the original of the image data that meets with his taste.

Here, the total access size of the image data will be calculated by assuming the size of the image data as image 603=4, image 902=1, the original of image looked up by button=16, its 1/2 reduced image in length and width=4 and its reduced image in length and width=1.

First, the operation of the client 105 when the present invention is not employed will be explained.

The client 105 displays the screen 601.

The numerical value in the brackets [ ] represents the access size of the image data by the operation.

(Operation 11): First, [running scene 1] is selected and the image data 702 is looked up [16].

(Operation 12): Return to the screen 601 [4].

(Operation 13): [running scene 2] is selected and the image data is looked up [16].

(Operation 14): Return to the screen [4].

(Operation 15): [running scene 1] is again selected [16].

The total access size of the image data is 16+4+16+4+16=56.

The above is the operation of the client 105 when the present invention is not employed.

Next, the user's operation of the client 105 in the example described above in the former embodiment of the invention will be explained.

The client 105 displays the screen 1901.

(Operation 21): First, [running scene 1] is selected and the image data 1002 is looked up [4].

(Operation 22): Return to the screen 601 [1].

(Operation 23): [running scene 2] is selected and the image data (1/2 reduction in length and width) is looked up [4].

(Operation 24): Return to the screen 601 [1].

(Operation 25): The [NORMAL] button is selected and the screen is switched to 2201 [4].

(Operation 26): [running scene 1] is selected and the image data 702 is looked up [16].

The total access size of the image data is 4+1+4+1+4+16=30.

The above explains the operation of the client 105 in the former embodiment of the present invention.

Finally, the operation of the user of the client 105 in the example of the embodiment described above will be explained.

The client 105 displays the screen 2701.

(Operation 31): First, [list] is selected and the screen is switched to 2801 [8].

(Operation 32): The button 2804 is selected and the image data 702 is looked up [16].

The total access size of the image data is 8+16=30.

The above explains the operation of the client 105 in this embodiment.

The examples given above represent that the number of times of the operations is small in this embodiment and the access size of the image data is also small.

This difference of the result becomes greater when the images that can be looked up from a certain page by the button is greater.

Therefore, this embodiment is extremely effective when the user of the client 105 looks up and selects a plurality of image data.

The functions equivalent to the above can be accomplished by adding the following three modifications without using the frame description.

(Modification 101): The processing object table 3901 is changed as shown in FIG. 57.

In FIG. 57, reference numeral 5801 denotes the processing object table and reference numeral 5802 denotes the entry.

The processing object table 5801 is the one that is generated by removing the entries 3903, 3904 and 3905 and changing the expander of the entry 3907 from [.p-quick] to [nil/.p-quick] to get the entry 5802 for the processing object table 3901.

(Modification 102): The UI frame generation processing 3404 is added to the data conversion processing 3210. More concretely, the screen configuration expanding device 103 executes the UI frame generation processing 3404 between the step 3702 and the step 3707 and couples the screen configuration data generated by the UI frame generation processing 3404 and the screen configuration data converted by the configuration description conversion processing 3704 by inserting the <BR> tag at the step 3705.

(Modification 103): The screen configuration expanding device 103 removes [TARGET=PAGE] from the template 4401 used for the UI frame generation processing.

Since the attribute [TARGET] is not necessary when the frame description is not used, it is removed in this embodiment.

The above explains the modifications in this embodiment for the former embodiment.

Next, the operation of the screen configuration expanding device 103 in this embodiment will be explained.

First, the client 105 transmits the command [GET menu. html] to the screen configuration expanding device 103.

The operations of the screen configuration expanding device 103 at this time are the same as a series of its operations from the (session 3) to the (session 4) in the former embodiment.

The screen configuration expanding device 103 receives the command [GET menu. html] from the client 105 by the command analysis processing 3204, looks up the entry 5802 of the processing object table 5801 and sets the setting table to [address=menu. html, classification=conversion, processing content=configuration description conversion, parameter=.p-quick].

The content of the setting table is similar to that of the (session 3) and the flow of the subsequent processings is fundamentally the same as that of the (session 3), too.

Here, the difference of the processing of the screen configuration expanding device 103 in this embodiment from that of the expanding device 103 in the seventh embodiment lies in the result of the data conversion processing 3210.

Here, the screen configuration expanding device 103 first generates the UI frame in the same way as in the former embodiment, receives the screen configuration data 501 from the server 101, generates the screen configuration data 1801, couples the UI frame, that has been generated already, and the screen configuration data by inserting the <BR> tag, generates the screen configuration data shown in FIG. 58 and transmits it to the client 105.

In FIG. 58, reference numeral 5901 denotes the screen configuration data and reference numerals 5902 and 5903 denote the anchor tag descriptions generated by the screen configuration expanding device 103 by the UI frame generation processing in this embodiment. Reference numeral 5904 denotes the <BR> tag inserted for coupling the screen configuration data of the UI frame and the screen configuration data 1801.

Figure 59:
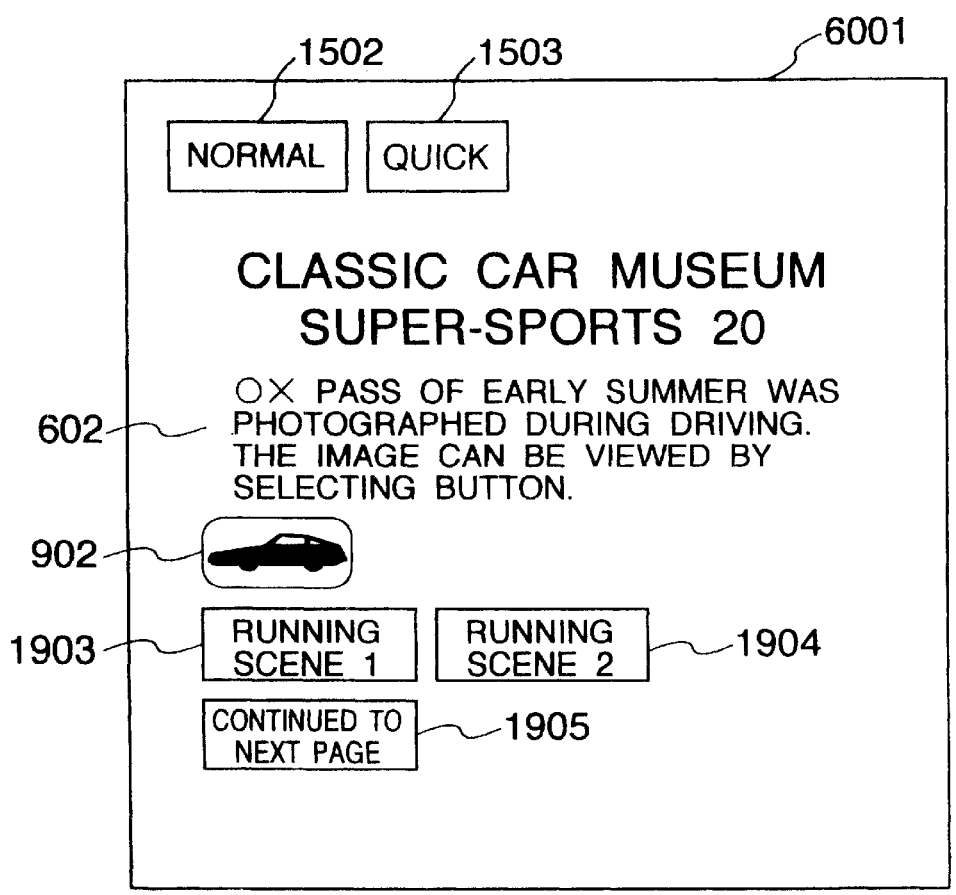
FIG. 59 shows an example of a client screen according to the present invention.

Receiving the screen configuration data, the client 105 further receives the image data 902 and displays the screen shown in FIG. 59.

In FIG. 59, reference numeral 6001 denotes the screen display.

In the screen 6001, the operation when the client 105 selects each button is functionally the same as that of the seventh embodiment, and this embodiment is different in that it does not use the frame description.

The above explains the operation of the screen configuration expanding device 103 in this embodiment.

Since this embodiment does not utilize the frame description, there is the problem that when the content of the page data to be accessed is great and when the page data must be partially viewed by scrolling it on the screen, the button for the mode selection disappears from the screen when scrolled.

On the other hand, the four sessions, in all, are necessary to display all the contents of the new page but in this embodiment, the processing can be completed by the two sessions. Therefore, this embodiment is effective when the cost for establishing and cutting off the connection on the network system is high.

The number of kinds of clients the present invention can utilize becomes greater in that this embodiment does not use the frame description, and versatility can be improved.

The relationship among these embodiments will be explained.

It is possible to change the content of the table for setting the concrete operations of the present invention and add the new data conversion function and the new data generation function 5to the former embodiment, respectively.

As described above, the present invention can easily add new functions by changing the table to be looked up at the time of the operation of the present invention and adding afresh the data conversion processing and the data generation processing.

The functions of the respective embodiments can be easily combined.

For example, the user of the client can look up one thumb nail button or a plurality of thumb nail buttons, and this can be accomplished without using the frame description.

More concretely, the above can be easily accomplished by changing the UI frame processing method so that the display method of the buttons changes between the [QUICK mode] and the [NORMAL mode].

Similarly, when the client 105 has the function of displaying the UI frame on another window, the UI frame generation processing is changed to generate the screen configuration data so that the UI frame is displayed on another window.

Further, the above can be accomplished by changing the content of each table used by the screen configuration expanding device 103 for the processing.

In the information provision systems dispersed on the network, the resent invention can add and display new buttons and new information on the client screen without collapsing original page layout. Particularly when the data conversion is executed, ease-of-use of the users can be improved by concentrated gathering an providing the user interfaces at one lace.

The present invention makes it also possible to easily make access to the original data without changing setting of the client by accomplishing the mode switching function which the user of the client can select.

What is claimed is:

1. A data relaying apparatus connected between a server device and a client device, comprising:

a request processing portion, and a response portion, wherein said request processing portion includes a command analysis portion which analyzes a command, inputted from said client device, and which reads out and stores conversion instruction information when said command contains said conversion instruction information instructing a predetermined data conversion processing, and said request processing portion deletes said conversion instruction information from said command and sends said command to said server device, wherein said response portion receives data requested with said command from said server device, converts said data on the basis of said conversion instruction information corresponding to said command, and sends said converted data to said client device.

2. A data relaying apparatus according to claim 1, wherein said conversion instruction information contains a screen configuration command instructing to divide an area of the screen displayed on said client device into a reception data display area for data received from said server device and an operation area for a screen operation and to display them; and
wherein said data relaying apparatus further comprises:
a first expansion portion for expanding said data on said reception data display area on the basis of said screen configuration command; and
a second expansion portion for expanding operation buttons corresponding to another screen configuration command indicating contents of transformation on data in accordance with said conversion instruction information on said operation area on the basis of said screen configuration command from said client device.

3. A data relaying apparatus according to claim 2, wherein said operation buttons displayed on said operation area includes a normal mode button corresponding to a first screen configuration command of changing a part of text included in said data not to transform image data included in said data, and a click mode button corresponding to a second screen configuration command of changing a part of text included in said data to transform image data included in said data.

4. A data relaying apparatus according to claim 3, wherein said conversion instruction information is preserved for different data referred to by other data.

5. A data relaying apparatus according to claim 1, wherein said conversion instruction information is a deletion instruction command which instructs to delete a part of pixels of image data in a predetermined pattern when said image data is contained in said data.

6. A data relaying apparatus according to claim 1, wherein said conversion instruction information is a conversion instruction command which instructs to convert the size of said image data at a predetermined conversion ratio.

7. A data relaying apparatus according to claim 6, which further comprises:
a data conversion portion for converting the size of said image data at a predetermined conversion ratio on the basis of said conversion instruction command.

8. A data relaying apparatus according to claim 1, wherein said response portion decreases a part of said data received from said server device before sending said data to said client device in accordance with contents of said predetermined data conversion processing.

9. A data relaying apparatus connected to a client device through a first network and to a server device through a second network, comprising:
means for analyzing a command inputted from said client device;
means for checking whether or not a conversion instruction information is included in said command, the conversion instruction information instructing a conversion processing to said command, and reading out and storing said conversion instruction information from said command when said information is contained in said command;
means for transmitting said command from which said conversion instruction information is removed, to said server device;
means for receiving a response command responding to said command after removal of said conversion instruction information, from said server device;
means for generating a conversion command by converting said response command on the basis of said conversion instruction information; and
means for transmitting said conversion command with said conversion instruction information to said client device.

10. A data relaying apparatus according to claim 9, wherein said conversion instruction information is a deletion instruction command for instructing to delete a part of pixels of image data in a predetermined pattern when said image data is contained in said response command.

11. A data relaying apparatus according to claim 10, wherein said deletion instruction command is a command instructing to convert the size of said image data at a specific conversion ratio, and wherein said data relay apparatus further comprises:
means for analyzing said deletion instruction command;
means for converting the size of said image data at said specific conversion ratio; and
means for transmitting said converted data to said client device.

12. A data relaying apparatus according to claim 10, wherein said deletion instruction command instructs to delete the number of pixels of said image data so as to reduce the size of said image data at a conversion ratio of 1/4 or 1/16.

13. A data relaying apparatus according to claim 10, wherein said conversion instruction information contains a screen configuration command instructing to divide a screen displayed on said client device into a reception data display area for displaying data received from said server device and an operations screen area and to display them, and wherein said data relay apparatus further comprises:
means for expanding a response command from said server device and said reception data display area on the basis of said screen configuration command;
means for expanding operation buttons corresponding to said deletion instruction command in accordance with the instruction of said screen configuration command from said client device, in said operations screen area; and
means for transmitting to said client device.

14. A data transmission method of a network system having a data relay apparatus connected to a client device through a first network and to a server device through a second network, comprising the steps of:
analyzing, in said data relay apparatus, a command inputted from said client device, deleting conversion instruction information from said command when said conversion instruction information instructing conversion processing is contained in said command, and transmitting the result to said server device;
transmitting, in said server device receiving said command after removal of said conversion instruction information, a response command responding to said command after removal of said conversion instruction information to said data relay apparatus; and
converting, in said data relay apparatus receiving said response command, said response command and generating a conversion command on the basis of said conversion instruction information, and transmitting said conversion command with said conversion instruction information to said client device.

15. A data transmission method according to claim 14, wherein said conversion instruction information is a deletion instruction command for instructing to delete the number of pixels of image data in a predetermined pattern when said response command contains said image data.

16. A data transmission method according to claim 15, wherein said deletion instruction command is a command instructing to convert the size of said image data at a specific conversion ratio, and wherein, said data relay apparatus analyzes said deletion instruction command and transmits said image data as the data generated by converting the size of said image data at said specific conversion ratio.

17. A data transmission method according to claim 14, wherein said deletion instruction command executes conversion for deleting the number of pixels of said image data so that the size of said image data attains a conversion ratio of 1/4 or 1/16.

18. A data transmission method according to claim 14, wherein said conversion instruction information contains a screen configuration command for instructing to divide the screen displayed on said client device into a reception data display area for displaying data received from said server device and said operations screen area and to display them, and wherein said data relay apparatus expands said response command received from said server device on said reception data display area on the basis of said screen configuration command, expands operation buttons corresponding to said deletion instruction command in accordance with the instruction of said screen configuration demand from said client device, in said operations screen area, and transmits them to said client device.

19. An information storage medium for storing a data conversion function for data relay, for use in a data relay apparatus connected to a client device through a first network and to a server device through a second network, wherein said information storage medium has a program code that can be read and executed by a computer in such a manner as to be loaded into said data relay apparatus, and said code has a function of analyzing a command inputted from said client device; a function of deleting conversion instruction information from a command when said command contains said conversion instruction information instructing the conversion processing, and transmitting said command to said server device; a function of receiving a response command responding to said command after removal of said conversion instruction information, from said server device; a function of generating a conversion command by converting said response command on the basis of said conversion instruction information; and a function of transmitting said conversion command with said conversion instruction information to said client device.

20. An information storage medium for a data conversion function according to claim 19, wherein said code has a function of deleting the number of pixels of image data in a predetermined pattern when said response command contains said image data.

21. An information storage medium for a data conversion function according to claim 20, wherein said conversion instruction information contains a screen configuration command instructing to divide the screen displayed on said client device into a reception data display area for displaying data received from said server device and said operations screen area and to display them, and said code has a function of expanding said response command from said server device in said reception data display area on the basis of said screen configuration command, a function of expanding operation buttons corresponding to said deletion instruction command in said operations screen area in accordance with instructions of said screen configuration command from said client device, and a function of transmitting said expanded information to said client device.

22. An information storage medium for a data conversion function according to claim 19, wherein said information storage medium stores a program code, further having a function of analyzing said deletion instruction command, a function of converting the size of said response data at a specific conversion ratio, and a function of transmitting converted data to said client device.

23. An information storage medium for a data conversion function according to claim 19, wherein, when said response data is image data, said code has a function of converting the size of said image data by deleting the number of pixels of said image data so as to attain a conversion ratio of 1/4 or 1/16.

* * * * *